United States Patent
Hirosawa

(10) Patent No.: US 11,841,515 B2
(45) Date of Patent: Dec. 12, 2023

(54) LENS ARRAY AND DISPLAY DEVICE

(71) Applicant: Japan Display Inc., Tokyo (JP)

(72) Inventor: Jin Hirosawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 146 days.

(21) Appl. No.: 17/488,293

(22) Filed: Sep. 29, 2021

(65) Prior Publication Data

US 2022/0018996 A1    Jan. 20, 2022

Related U.S. Application Data

(63) Continuation of application No. PCT/JP2020/012051, filed on Mar. 18, 2020.

(30) Foreign Application Priority Data

| Mar. 29, 2019 | (JP) | 2019-067798 |
| Mar. 29, 2019 | (JP) | 2019-067799 |
| Mar. 29, 2019 | (JP) | 2019-067800 |

(51) Int. Cl.
*G02B 3/00* (2006.01)
*G02F 1/1335* (2006.01)
*G02B 26/08* (2006.01)

(52) U.S. Cl.
CPC ....... *G02B 3/0043* (2013.01); *G02B 26/0875* (2013.01); *G02F 1/133607* (2021.01)

(58) Field of Classification Search
CPC .............. G02B 3/0043; G02B 26/0875; G02F 1/133607
USPC .......... 359/245, 296, 619, 665, 666
See application file for complete search history.

(56) References Cited

U.S. PATENT DOCUMENTS

| 6,094,294 A | 7/2000 | Yokoyama et al. |
| 2005/0046919 A1 | 3/2005 | Taguchi et al. |
| 2006/0028734 A1* | 2/2006 | Kuiper ................ G02B 26/005 359/676 |
| 2010/0232028 A1* | 9/2010 | Takai .................. G02B 3/0006 359/665 |
| 2010/0232161 A1 | 9/2010 | Aschwanden et al. |
| 2013/0038922 A1* | 2/2013 | Kirita .................. G02B 26/005 359/315 |

FOREIGN PATENT DOCUMENTS

| EP | 2103982 A1 * | 9/2009 | .......... G02B 26/004 |
| JP | 64-55583 A | 3/1989 | |
| JP | 2001-13428 A | 1/2001 | |
| JP | 2002-372727 A | 12/2002 | |
| JP | 2007-272247 A | 10/2007 | |
| JP | 2009-122586 A | 6/2009 | |
| JP | 2010-39365 A | 2/2010 | |

(Continued)

OTHER PUBLICATIONS

International Search Report and Written Opinion dated Jun. 16, 2020, Filed on Mar. 18, 2020, 17 pages including English Translation.

*Primary Examiner* — William Choi
(74) *Attorney, Agent, or Firm* — XSENSUS LLP

(57) ABSTRACT

According to one embodiment, a lens array comprises a plurality of lens elements. Each of the plurality of lens elements comprises a boundary surface of two layers with different refractive indices, and an actuator configured to deform the boundary surface.

5 Claims, 46 Drawing Sheets

(56) References Cited

FOREIGN PATENT DOCUMENTS

| | | |
|---|---|---|
| JP | 2012-520486 A | 9/2012 |
| JP | 2013-182225 A | 9/2013 |
| WO | 97/31283 A1 | 8/1997 |

* cited by examiner

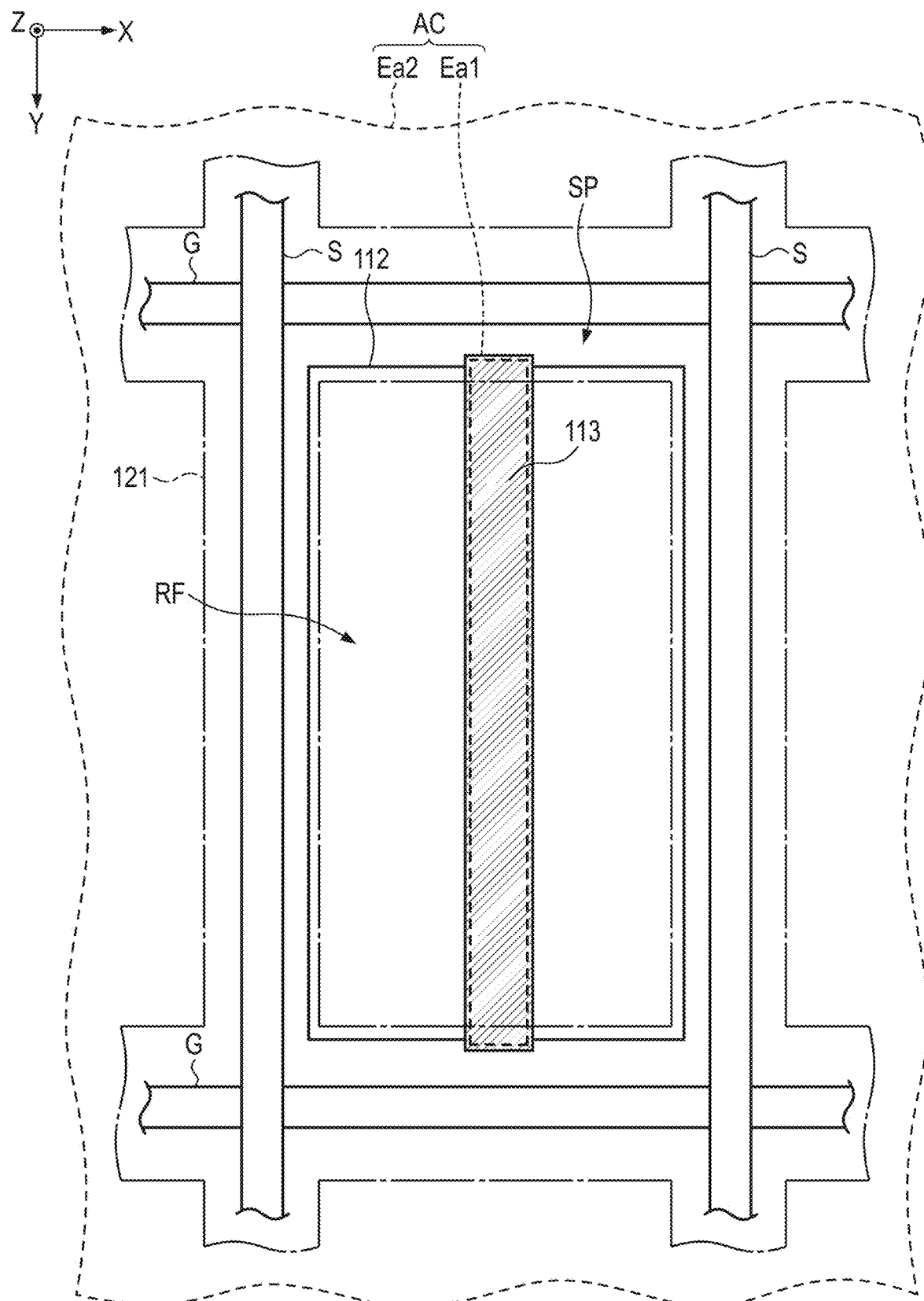
F I G. 22

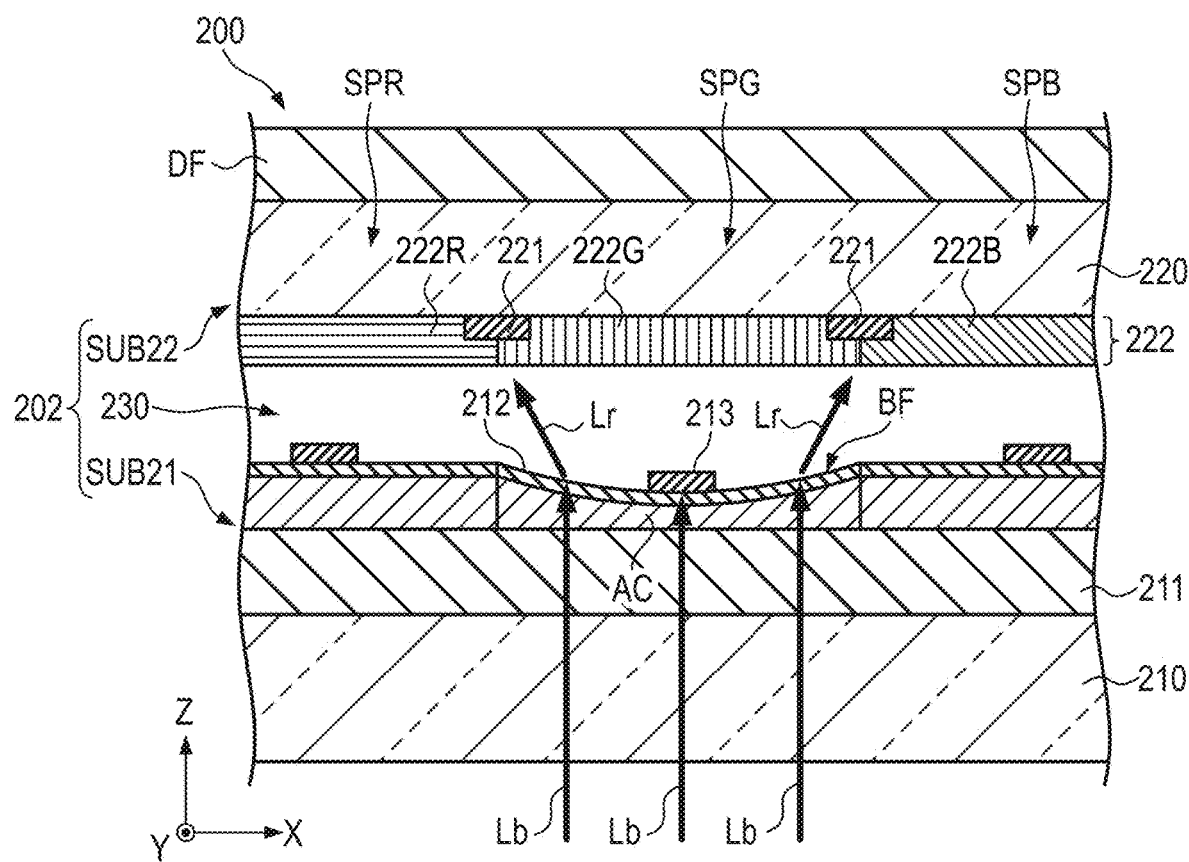
F I G. 26

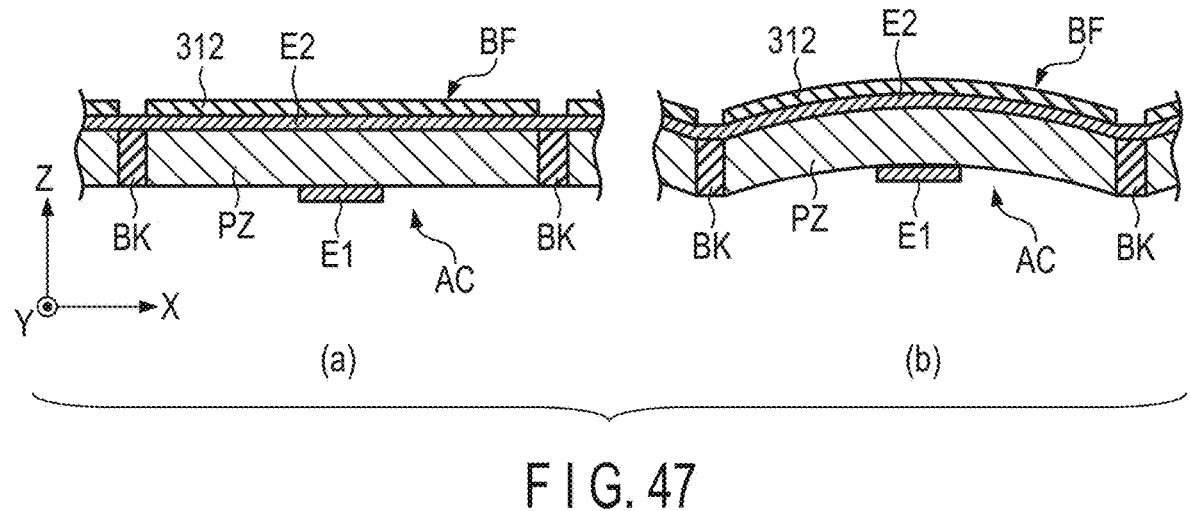
F I G. 47
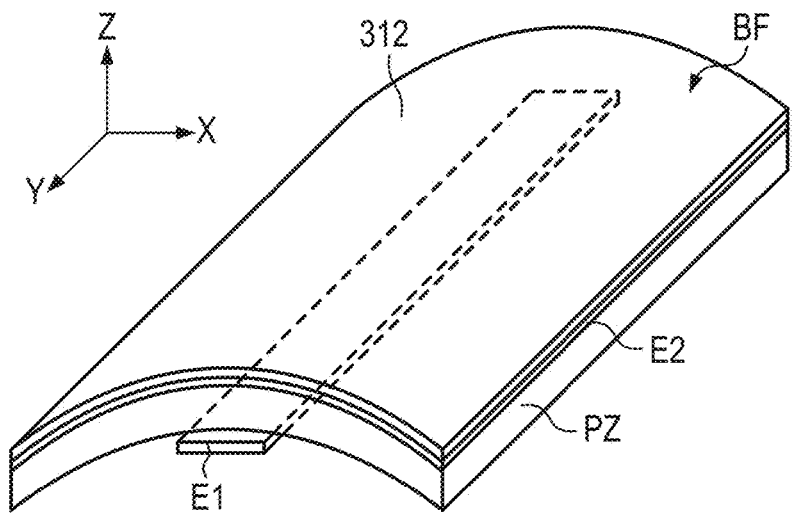
F I G. 48

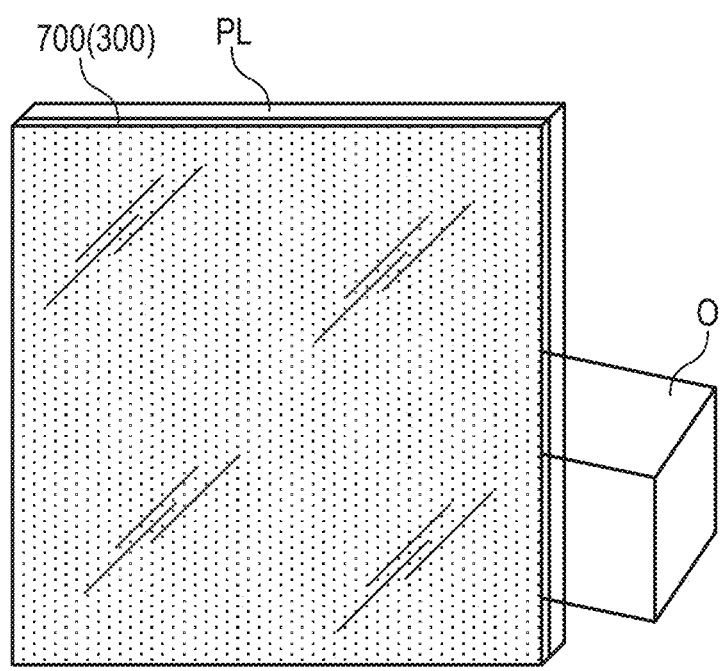
F I G. 71

LENS ARRAY AND DISPLAY DEVICE

CROSS-REFERENCE TO RELATED APPLICATIONS

This application is a Continuation Application of PCT Application No. PCT/JP2020/012051 filed Mar. 18, 2020 and based upon and claiming the benefit of priority from Japanese Patent Applications No. 2019-067798, filed Mar. 29, 2019; No. 2019-067799, filed Mar. 29, 2019; and No. 2019-067800, filed Mar. 29, 2019, the entire contents of all of which are incorporated herein by reference.

FIELD

Embodiments described herein relate generally to lens arrays and display devices.

BACKGROUND

A liquid crystal display device is known in which a liquid crystal layer is interposed between a pair of substrates. For example, in a reflective liquid crystal display device that uses external light for display, a polarizer is disposed above the liquid crystal layer. In a transmissive liquid crystal display device that uses light from a backlight for display, polarizers are disposed on both sides of a pair of substrates. Since these polarizers absorb a part of light, they cause degradation in the brightness of an image.

A reflective display device using electrophoretic elements is also known. This type of display device does not require a polarizer to be disposed. Therefore, the brightness of an image can be increased. However, the response speed is slow when switching pixels on and off.

Furthermore, in the various types of display devices described above, a diffusion film may be disposed on a display surface in order to expand the viewing angle. In order to limit the viewing angle to a specific direction, for example, a viewing angle control film with a number of minute louvers may be disposed on the display surface.

All of these optical films have fixed optical properties such as diffusion and viewing angle limitation, and thus, cannot switch the degree of light diffusion or viewing angle. Therefore, the development of a technology in which the optical properties can be switched according to each usage condition has been desired. Such a technology can be used not only for displays but also in various other ways.

BRIEF DESCRIPTION OF THE DRAWINGS

FIG. 22 is a plan view showing an example of a configuration applicable to a sub-pixel in a tenth embodiment.

FIG. 26 is a schematic cross-sectional view of the display device, showing a state in which a boundary surface is deformed from the shape shown in FIG. 25.

FIG. 47 is a schematic cross-sectional view of an actuator shown in FIG. 46.

FIG. 48 is a schematic perspective view showing an example of the actuator and a high refractive index layer in a case where the boundary surface is in a second shape.

FIG. 71 shows a schematic configuration of the dimming panel according to the fourth application example.

DETAILED DESCRIPTION

Figure 1:
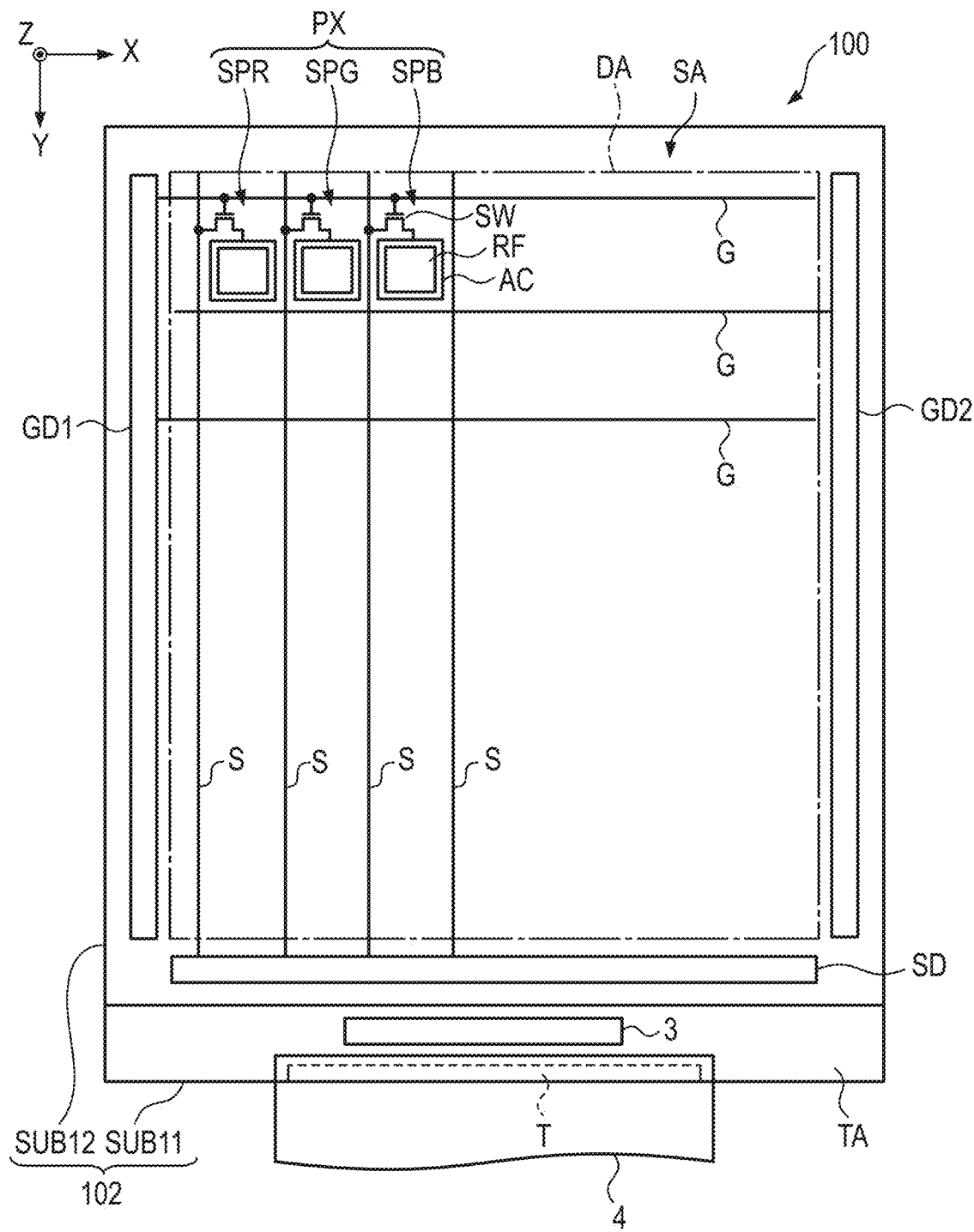
FIG. 1 shows a schematic configuration of a display device according to a first embodiment.

In general, according to one embodiment, a display device comprises a plurality of pixels. Each of the plurality of pixels comprising a reflective surface that reflects light, an actuator that configured to deform the reflective surface, and a non-reflective part that is located in a central part of the pixel in a first direction and is superposed on the reflective surface.

According to another embodiment, a display device comprising a plurality of pixels. Each of the plurality of pixels comprises a high refractive index layer, a low refractive index layer with a lower refractive index than the high refractive index layer, and an actuator configured to deform a boundary surface between the high refractive index layer and the low refractive index layer.

According to one embodiment, a lens array comprises a plurality of lens elements. Each of the plurality of lens elements comprises a boundary surface of two layers with different refractive indices, and an actuator configured to deform the boundary surface.

According to another embodiment, a lens array comprises a first lens element including a first boundary surface of two layers with different refractive indices and a first actuator configured to deform the first boundary surface, and a second lens element including a second boundary surface of two layers with different refractive indices facing the first boundary surface and a second actuator configured to deform the second boundary surface.

According to yet another embodiment, a display device comprises a backlight, a display panel for displaying an image using light from the backlight, and the lens array of C1 above, interposed between the backlight and the display panel.

According to each embodiment, a display device with excellent display quality, or a lens array with switchable optical characteristics can be provided.

One of various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings may be more schematic than in the actual modes, but they are mere examples, and do not limit the interpretation of the present invention. In the drawings, reference numbers of continuously arranged elements equivalent or similar to each other are omitted in some cases. In addition, in the specification and drawings, the same elements as those described in connection with preceding drawings are denoted by like reference numbers, and detailed description thereof is omitted unless necessary.

In the following description, the first to tenth embodiments relating to a reflective display device capable of controlling the shape of a reflective surface in the pixels will first be disclosed with reference to FIGS. 1 to 23.

The 11th to 20th embodiments relating to a transmissive display device capable of controlling the shape of a boundary surface between a high refractive index layer and a low refractive index layer in the pixels will then be disclosed with reference to FIGS. 24 to 42.

Furthermore, the 21st to 30th embodiments relating to a lens array capable of controlling the shape of a boundary surface of two layers with different refractive indices in lens element and the first to fourth application examples of the lens array will be disclosed with reference to FIGS. 43 to 71.

First Embodiment

Figure 2:
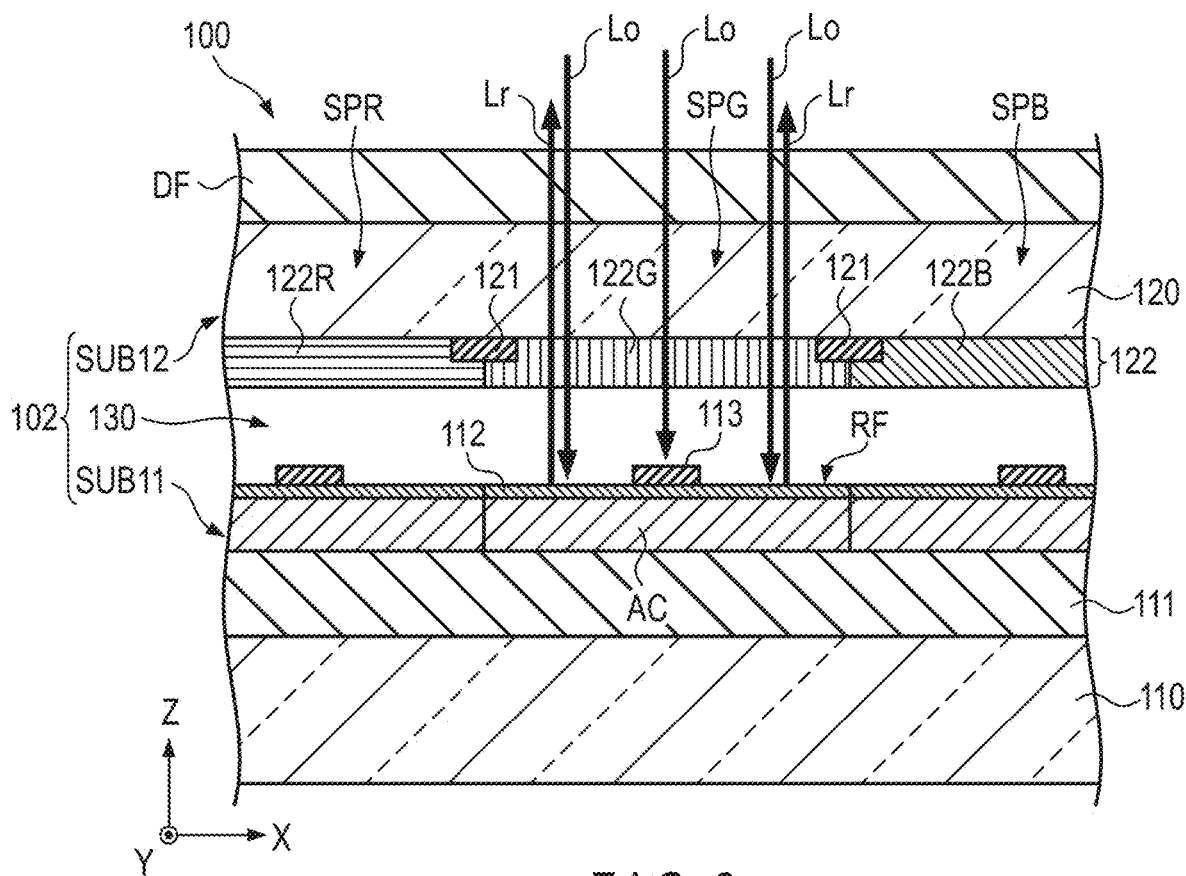
FIG. 2 is a schematic cross-sectional view of the display device according to the first embodiment.
Figure 3:
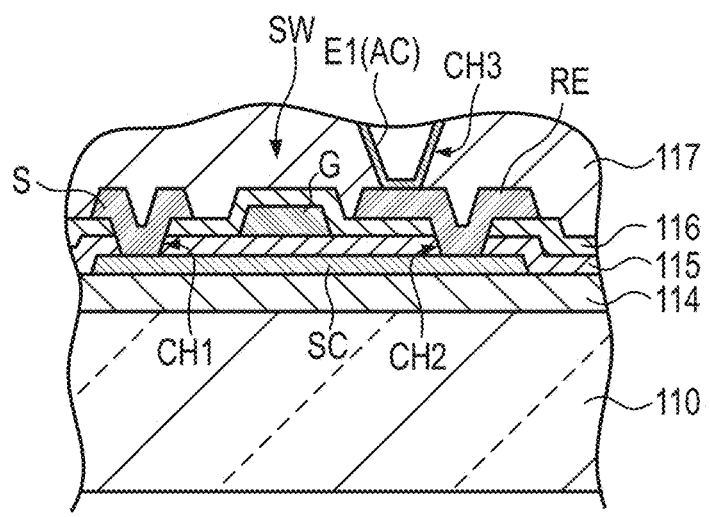
FIG. 3 is a schematic cross-sectional view showing an example of a configuration of a circuit layer shown in FIG. 2.

A basic configuration of a display device 100 according to a first embodiment will first be exemplified with reference to FIGS. 1 to 3.

FIG. 1 shows a schematic configuration of the display device 100 according to the first embodiment. X, Y, and Z directions are defined in the manner illustrated in the drawing. These X, Y, and Z directions are, for example, orthogonal to each other, and may intersect at an angle other than 90 degrees. Hereinafter, a view of the display device 100 in parallel to the Z direction is referred to as a plan view The display device 100 is provided with a display panel 102, a controller 3, and a wiring substrate 4. The display panel 102 comprises a first substrate SUB11 and a second substrate SUB12. The first substrate SUB11 and the second substrate SUB12 face each other in the Z direction.

The first substrate SUB11 includes a terminal area TA that does not face the second substrate SUB12. The terminal area TA includes a terminal T. The wiring substrate 4 is, for example, a flexible circuit board and is connected to the terminal T. Data for image display is supplied to the display panel 102 via the wiring substrate 4. In the example of FIG. 1, the controller 3 is mounted in the terminal area TA. However, the controller 3 may be mounted on other components such as the wiring substrate 4.

The display panel 102 includes a display area DA and a peripheral area SA around the display area DA. The display area DA includes a plurality of pixels PX arranged in a matrix in the X and Y directions. The pixels PX include a plurality of sub-pixels corresponding to different colors, and these sub-pixels enable color display. As an example, in the present embodiment, it is assumed that the pixels PX include a red sub-pixel SPR, a green sub-pixel SPG, and a blue sub-pixel SPB. However, the pixels PX may include sub-pixels of other colors, such as white sub-pixels. The display device 100 may also be configured for monochrome (black and white) display. In this case, each of the sub-pixels in the illustrated configuration functions as a single pixel. In the following description, sub-pixels SPR, SPG, and SPB are simply referred to as sub-pixels SP if they are not specifically distinguished.

The first substrate SUB11 is equipped with a plurality of scanning lines G, a plurality of signal lines S, a first scanning driver GD1, a second scanning driver GD2, and a signal driver SD. The plurality of scanning lines G extend in the X direction in the display area DA and are aligned in the Y direction. The plurality of signal lines S extend in the Y direction in the display area DA and are aligned in the X direction. Each scanning driver GD1, GD2 supplies scanning signals to the plurality of scanning lines G. The signal driver SD supplies video signals to the plurality of signal lines S. The sub-pixel SP corresponds to an area divided by the scanning lines G and signal lines S.

Furthermore, the first substrate SUB11 is equipped with a switching element SW, a reflective surface RF, and an actuator AC, which are located in each sub-pixel SP. The switching element SW is connected to the scanning line G and the signal line S and, when a scanning signal is supplied to the scanning line G, supplies the video signal of the signal line S to the actuator AC. The actuator AC deforms the shape of the reflective surface RF in accordance with the video signal supplied through the switching element SW.

FIG. 2 is a schematic cross-sectional view of the display device 100. The first substrate SUB11 comprises a first insulating substrate 110, a circuit layer 111, an actuator AC, a metal layer 112, and a first light-shielding layer 113. The first light-shielding layer 113 does not contribute to the reflection of light by the metal layer 112 and can be referred to as a non-reflective part. The circuit layer 111 includes the above described scanning line G, signal line S, switching element SW, and a plurality of insulating layers, but is shown in simplified form in FIG. 2.

The first insulating substrate 110 can be formed of glass, for example. The circuit layer 111 is provided on the upper surface of the first insulating substrate 110 (a surface facing the second substrate SUB12). The actuator AC is provided above the circuit layer 111. The metal layer 112 is formed by aluminum or silver, for example, and covers the actuator AC. In the example of FIG. 2, the surface of the metal layer 112 corresponds to the reflective surface RF.

The first light-shielding layer 113 covers a part of the reflective surface RF. In the example of FIG. 2, the first light-shielding layer 113 is provided near the center of each sub-pixel SP in the X direction, but is not limited thereto.

In the example of FIG. 2, the actuators AC of adjacent sub-pixels SP are in contact with each other. The metal layers 112 of the adjacent sub-pixels SP are also in contact with each other. The metal layers 112 of the adjacent sub-pixels SP may be formed integrally and continuously.

The second substrate SUB12 comprises a second insulating substrate 120, a second light-shielding layer 121, and a color filter layer 122. The second insulating substrate 120 can be formed of glass, for example. The second light-shielding layer 121 and the color filter layer 122 are provided on the lower surface of the second insulating substrate 120 (a surface facing the first substrate SUB11).

The second light-shielding layer 121 is superposed on the boundary of the adjacent sub-pixels SP. In other words, the second light-shielding layer 121 is in the form of a grid superposed on the scanning line G and the signal line S shown in FIG. 1. The color filter layer 122 includes a red color filter 122R facing the reflective surface RF of the sub-pixel SPR, a green color filter 122G facing the reflective surface RF of the sub-pixel SPG, and a blue color filter 122B facing the reflective surface RF of the sub-pixel SPB.

An intermediate layer 130 is provided between the first substrate SUB11 and the second substrate SUB12. As an example, the intermediate layer 130 is a space (air, other gas, or vacuum), but may contain a liquid, such as liquid crystal, or a solid substance, such as a transparent resin.

The display panel 102 may further comprise a diffusion layer DF provided on the upper surface of the second insulating substrate 120. For example, the diffusion layer DF may employ a structure that includes, but is not limited to, at least one of a retardation film, a haze glue that is a mixture of base materials and particles with different refractive indices, and a light control film (LCF) that includes a fine columnar structure.

FIG. 3 is a schematic cross-sectional view showing an example of the structure of the circuit layer 111. The circuit layer 111 includes insulating layers 114 to 117, the scanning line G, the signal line S, and the switching element SW.

The insulating layer 114 covers the upper surface of the first insulating substrate 110. The switching element SW includes a semiconductor layer SC disposed on top of the insulating layer 114 and a relay electrode RE. The insulating layer 115 covers the semiconductor layer SC and the insulating layer 114. The scanning line G is disposed on top of the insulating layer 115. The insulating layer 116 covers the scanning line G and the insulating layer 115. The signal line S and the relay electrode RE are disposed on top of the insulating layer 116. The insulating layer 117 covers the signal line S, the relay electrode RE, and the insulating layer 116.

For example, the insulating layers 114 to 116 can be formed of inorganic materials. The insulating layer 117 can be formed of organic materials. The insulating layer 117 may have a greater thickness than the insulating layers 114 to 116 to flatten the unevenness caused by the switching element SW.

The scanning line G faces the semiconductor layer SC through the insulating layer 115. The signal line S is in contact with the semiconductor layer SC through a contact hole CH1 that penetrates the insulating layers 115 and 116. The relay electrode RE is in contact with the semiconductor layer SC through a contact hole CH2 that penetrates the insulating layers 115 and 116. In the example of FIG. 3, a first electrode E1 included in the actuator AC contacts the relay electrode RE through a contact hole CH3 that penetrates the insulating layer 117. The first electrode E1 may be in direct contact with the semiconductor layer SC without going through the relay electrode RE.

[Display Principle]

The display device 100 of the present embodiment is a reflective display device that displays an image by changing the reflectance of external light at the sub-pixel SP according to the shape of the reflective surface RF. Specifically, the reflectance of the sub-pixel SP is controlled by deforming the reflective surface RF with the actuator AC. Hereinafter, a specific example of a display principle of the display device 100 will be explained with reference to FIG. 2 and FIG. 4.

Figure 4:
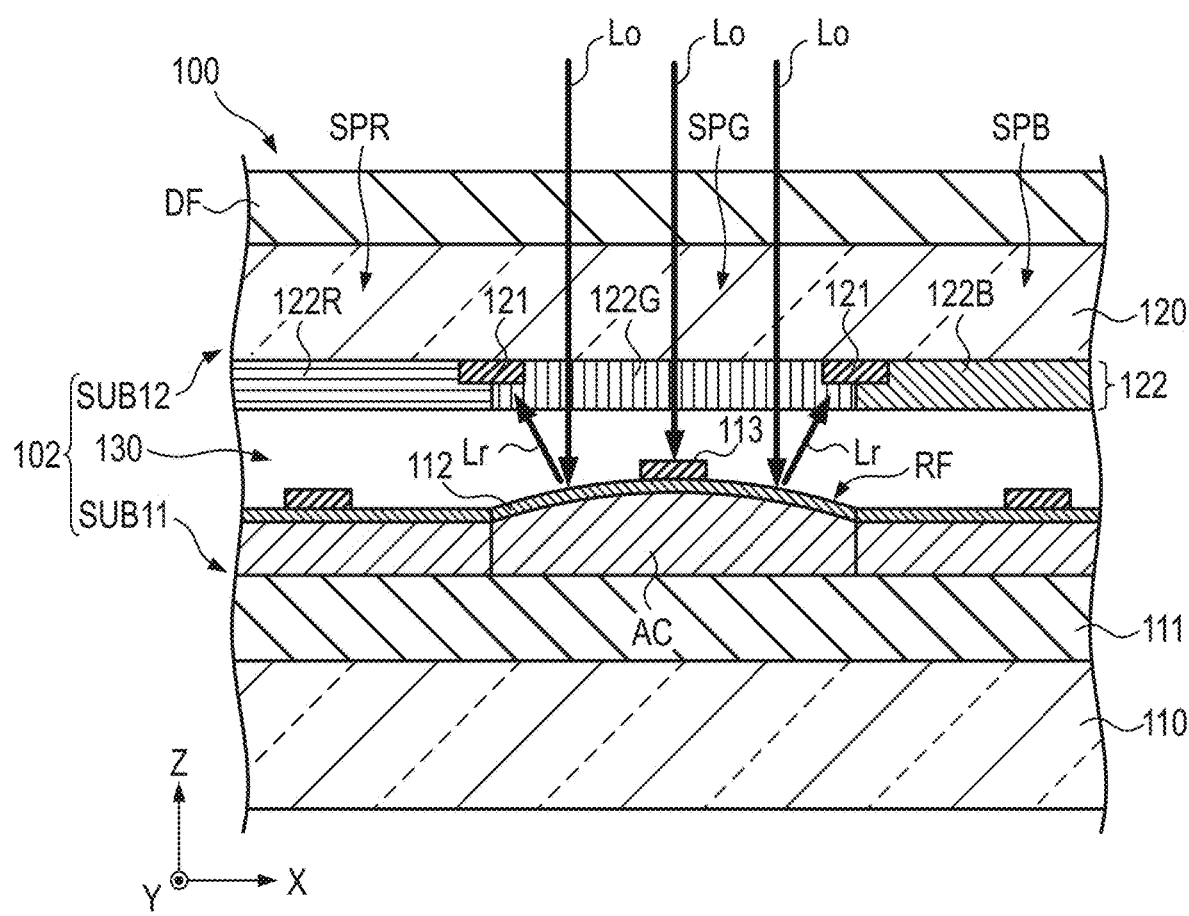
FIG. 4 is a schematic cross-sectional view of the display device, showing a state in which a reflective surface is deformed from the shape shown in FIG. 2.

FIG. 4 is a schematic cross-sectional view of the display device 100, showing the state in which the actuator AC of the sub-pixel SPG deforms the reflective surface RF from the shape shown in FIG. 2. Hereafter, the shape of the reflective surface RF of the sub-pixel SPG in FIG. 2 will be referred to as a first shape, and the shape of the reflective surface RF of the sub-pixel SPG in FIG. 4 will be referred to as a second shape.

The first shape shown in FIG. 2 is a plane parallel to the upper surface (X-Y plane) of the first insulating substrate 110. A part of external light Lo incident on the display panel 102 enters the reflective surface RF through the color filter 122G and is reflected by the reflective surface RF. A reflected light Lr at the reflective surface RF is emitted from the display panel 102 through the color filter 122G again. This causes the sub-pixel SPG to display green. Note that a part of the external light Lo is absorbed by the first light-shielding layer 113.

The second shape shown in FIG. 4 is a convex curved surface with the convex facing away from the first insulating substrate 110 that supports the actuator AC. In this case, on the reflective surface RF, the external light Lo is reflected toward the direction of the adjacent sub-pixels SP. Therefore, most of the reflected light Lr is absorbed by the second light-shielding layer 121. A part of the reflected light Lr may enter the color filters 122R and 122B of the adjacent sub-pixels SPR and SPB. Since the reflected light Lr passes through the green color filter 122G, it has a green wavelength range. When such reflected light Lr is incident on the red and blue color filters 122R and 122B, at least a part of it is absorbed by these color filters 122R and 122B.

In the second shape, the first light-shielding layer 113 is provided at a position corresponding to the top of the reflective surface RF. If there were no first light-shielding layer 113, the reflected light at the top would be emitted from the display panel 102 through the color filter 122G, in the same manner as the reflected light Lr in FIG. 2. However, when the first light-shielding layer 113 is provided, such reflected light Lr is suppressed.

In the above example, FIG. 2 corresponds to a state in which the sub-pixel SPG is on (green display), and FIG. 4 corresponds to a state in which the sub-pixel SPG is off (black display). In other words, compared to a first reflectance of the sub-pixel SPG when the reflective surface RF is in the first shape, a second reflectance of the sub-pixel SPG when the reflective surface RF is in the second shape is smaller.

From the viewpoint of increasing the contrast of the image, it is preferable that the second reflectance is sufficiently smaller than the first reflectance. In other words, it is preferable that the second shape is a shape in which as much of the reflected light Lr as possible is directed to and absorbed by the second light-shielding layer 121. It is also preferable that the first light-shielding layer 113 has a size that sufficiently covers an area that can generate the reflected light Lr that is not directed to the second light-shielding layer 121 in the reflective surface RF of the second shape. However, from the viewpoint of increasing the area of the reflective surface RF and enhancing the brightness of the image, the first light-shielding layer 113 may be made as small as possible.

Here, the curvature of the first shape is defined as a first curvature, and the curvature of the second shape is defined as a second curvature. In the present embodiment, the second curvature is larger than the first curvature. In a case where the first shape is a flat surface as shown in FIG. 2, the first curvature is zero. However, the first curvature does not necessarily have to be zero. That is, the first shape may be a more gently curved surface than the second shape.

The curvature of the first and second shapes may change depending on the position. In this case, the first curvature can be defined as the average or maximum value of the curvature at each position of the first shape. Similarly, the second curvature can be defined as the average or maximum value of the curvature at each position of the second shape.

As shown in FIG. 4, if an intermediate layer 130, which, for example, is a space, is provided between the first substrate SUB11 and the second substrate SUB12, the upper part of the reflective surface RF is opened, thus facilitating the change in the shape of the reflective surface RF.

The method of controlling the reflectance was explained above using sub-pixel SPG as an example, but the same method can be applied to sub-pixels SPR and SPB. The gradation expression by the pixel PX can be achieved by changing the reflective surface RF of the sub-pixels SPR, SPG, and SPB between the first and second shapes, as well as by controlling the time to maintain the first (or second) shape. For example, if the time to keep the reflective surface RF of sub-pixel SPG in the first shape is longer than the time to keep each reflective surface RF of the sub-pixels SPR and SPB in the first shape, colors with strong green components and weak red and blue components can be displayed.

The gradation expression can also be achieved by changing the curvature of the reflective surface RF in multiple steps. For example, if the reflective surface RF of sub-pixel SPG is in the first shape, and the reflective surface RF of sub-pixels SPR and SPB is in a shape with less curvature than the second shape and more curvature than the first shape, colors with strong green components and weak red and blue components can be displayed.

By controlling the reflectance of the sub-pixels SPR, SPG, and SPB in each pixel PX according to image data, an image corresponding to the image data can be displayed in the display area DA. When a diffusion layer DF is provided, the reflected light Lr is diffused, so that the viewing angle dependence of the image can be suppressed, which, as a result, improves the display quality.

As another example, the shape of the reflective surface RF can be switched at high speed without using the diffusion layer DF. In other words, if the reflective surface RF of the sub-pixel SP to be turned on is switched between the first and second shapes multiple times in displaying an image of one frame, reflected light Lr can be generated to be headed in various directions. As a result, the viewing angle dependence of the image is suppressed as in the case of using the diffusion layer DF. Without the diffusion layer DF, it is possible to obtain a display area DA that looks like a mirrored surface capable of reflecting an object in front of it when all sub-pixels SP are turned off.

[Actuator AC]

As the actuator AC, various elements capable of deforming the reflective surface RF into the first and second shapes can be used. Hereinafter, as an example, an actuator AC using a piezoelectric element (piezoelectric film) that deforms in response to applying a voltage is assumed, and a specific structure of the sub-pixel SP is disclosed.

Figure 5:
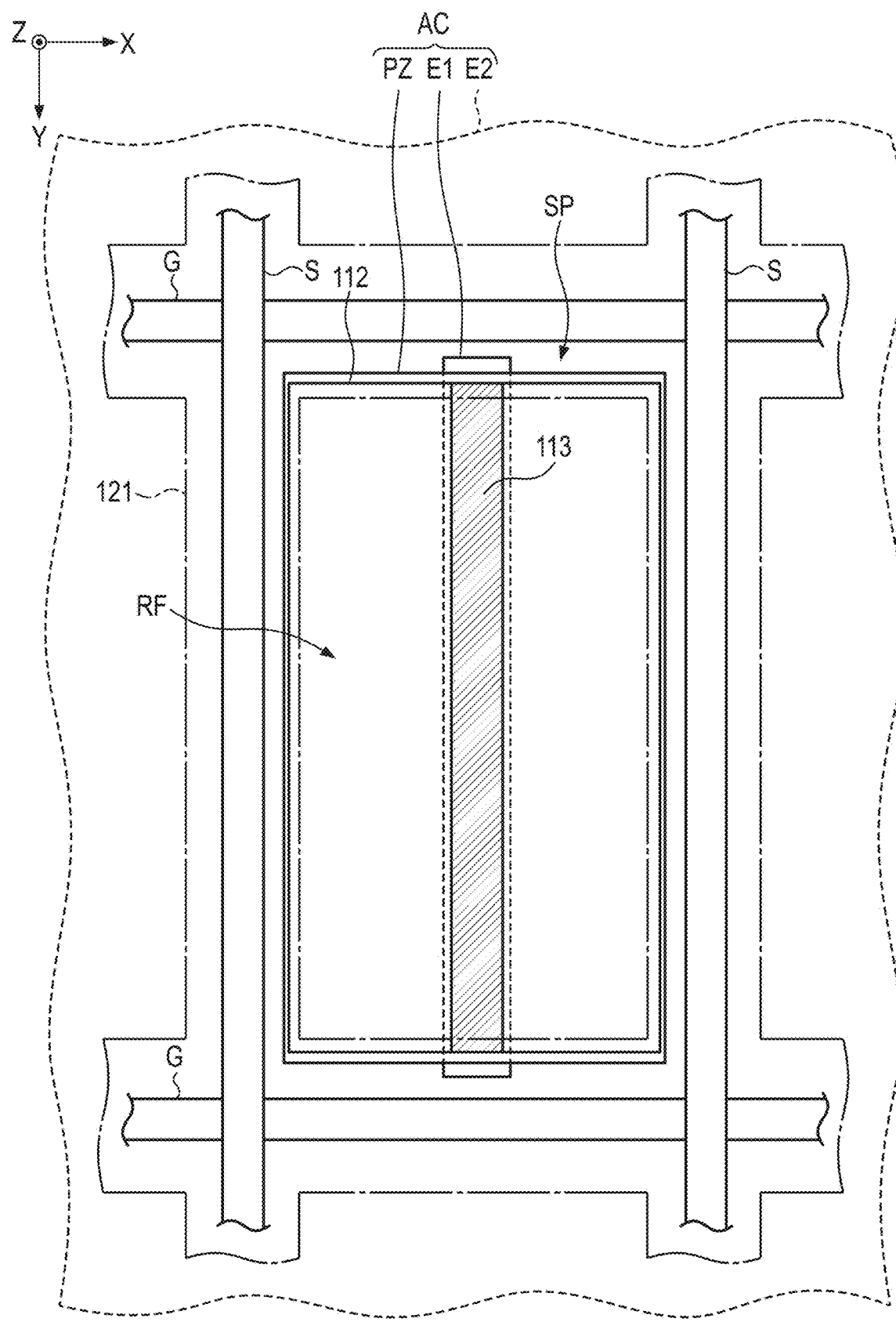
FIG. 5 is a plan view showing an example of a structure applicable to a sub-pixel in the first embodiment.

FIG. 5 is a plan view showing an example of a structure that can be applied to the sub-pixel SP. The second light-shielding layer 121 is superposed on the scanning line G and signal line S, and is open at the sub-pixel SP. The actuator AC comprises a piezoelectric element PZ, a first electrode E1, and a second electrode E2.

In the example of FIG. 5, the piezoelectric element PZ is disposed in the area enclosed by two scanning lines G and two signal lines S. Furthermore, the piezoelectric element PZ is separated from each scanning line G and each signal line S. However, the piezoelectric element PZ may also be superposed on at least one of each scanning line G and each signal line S.

The metal layer 112 is superposed on the piezoelectric element PZ. In the same manner as the piezoelectric element PZ, the metal layer 112 is separated from each scanning line G and each signal line S, but may also be superposed on at least one of them.

The periphery of the piezoelectric element PZ and the metal layer 112 is superposed on the second light-shielding layer 121. However, at least a part of the periphery of the piezoelectric element PZ and the metal layer 112 may not be superposed on the second light-shielding layer 121.

The first electrode E1 has a linear shape that is superposed on a central part of the sub-pixel SP in the X direction and extends longitudinally in the Y direction. The second electrode E2, for example, has a shape extending over a plurality of sub-pixels SP and is superposed on the first electrode E1. The second electrode E2 may be divided for each sub-pixel SP. The first light-shielding layer 113 has a linear shape that is superposed on the first electrode E1 and extends longitudinally in the Y direction. The first and second electrodes E1 and E2 can be formed of transparent conductive materials such as indium tin oxide (ITO) or metallic materials.

Figure 6:
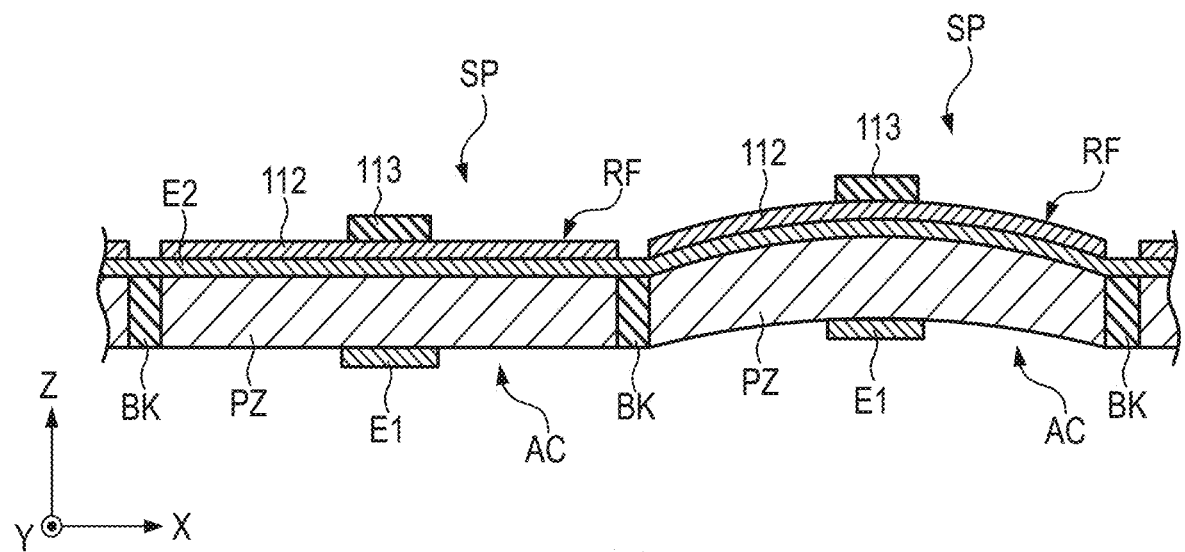
FIG. 6 is a schematic cross-sectional view of an actuator shown in FIG. 5.

FIG. 6 is a schematic cross-sectional view of the actuator AC along the X-Z plane. The first electrode E1 is in contact with the lower surface of the piezoelectric element PZ (the surface on the first insulating substrate 110 side). The second electrode E2 is in contact with the upper surface of the piezoelectric element PZ (the surface on the second substrate SUB12 side) and is continuously provided over a plurality of sub-pixels SP. The metal layer 112 is in contact with the upper surface of the second electrode E2. The first light-shielding layer 113 is in contact with the reflective surface RF.

In the example of FIG. 6, a gap is provided between the piezoelectric elements PZ of the adjacent sub-pixels SP. In this gap, for example, a bank BK formed of an insulating material is disposed. As an example, the bank BK is shaped to enclose the entire perimeter of the piezoelectric element PZ. In the example of FIG. 6, a gap is also provided between the metal layers 112 of adjacent sub-pixels SP. The metal layers 112 of adjacent sub-pixels SP may be in contact with each other as shown in FIGS. 2 and 4. Similarly, the piezoelectric elements PZ of adjacent sub-pixels SP may be in contact with each other.

As also shown in FIG. 3, the first electrode E1 is electrically connected to the relay electrode RE. Therefore, the voltage of the video signal supplied to the signal line S is applied to the first electrode E1 via the switching element SW. A common voltage is applied to the second electrode E2.

In the sub-pixel SP shown on the left side in FIG. 6, no potential difference is formed between the first and second electrodes E1 and E2. In this case, the piezoelectric element PZ is flat and the reflective surface RF becomes the first shape shown in FIG. 2.

On the other hand, in the sub-pixel SP shown on the right side in FIG. 6, a potential difference is formed between the first and second electrodes E1 and E2. In this case, the piezoelectric element PZ is curved and, accordingly, the reflective surface RF becomes the second shape shown in FIG. 4.

As another example, the piezoelectric element PZ may be curved when no potential difference is formed between the first and second electrodes E1 and E2, and may be flat when the said potential difference is formed.

In the example of FIG. 6, since a gap (bank BK) is provided between adjacent piezoelectric elements PZ, the force associated with the deformation of one piezoelectric element PZ is not easily transferred to the adjacent piezoelectric element PZ. Similarly, since a gap is provided between adjacent metal layers 112, the force associated with the deformation of one metal layer 112 is not easily transferred to the adjacent metal layer 112. As a result, the interaction of actuators AC in adjacent sub-pixels SP can be suppressed, thereby allowing the display quality to improve. Furthermore, it is possible to suppress the destruction of the metal layer 112, etc., caused by the operation of the actuator AC at the boundary of sub-pixels SP.

The actuator AC can be made, for example, by applying a material to be the base of the piezoelectric element PZ by spin coating or slit coating on the first electrode E1 and the circuit layer 111, and crystallizing it by annealing. The second electrode E2 is then formed thereon, and the piezoelectric element PZ is polarized by applying a predetermined square wave voltage between the first and second electrodes E1 and E2. For example, polyvinylidene fluoride (PVDF) or vinylidene fluoride-trifluoroethylene copolymer (VDF/TrFE) can be used as the material for the piezoelectric element PZ. The formation method of the actuator AC and the material of the piezoelectric element PZ are not limited to the examples given above.

Figure 7:
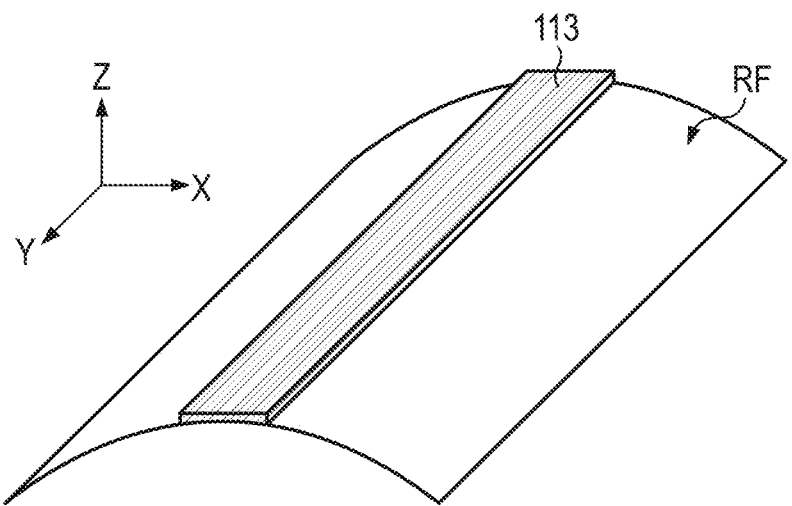
FIG. 7 is a schematic perspective view showing an example of a reflective surface of a second shape in the first embodiment.

FIG. 7 is a schematic perspective view showing an example of the reflective surface RF of the second shape. When the first electrode E1 is provided as in the example of FIG. 5, the piezoelectric element PZ is deformed into a shape that extends uniformly in the Y direction in, for example, the cross-sectional shape shown in FIG. 6. Therefore, as shown in FIG. 7, the reflective surface RF also deforms into a similar shape (second shape) with the piezoelectric element PZ. The first light-shielding layer 113 continuously covers the top of the reflective surface RF of the second shape in the Y direction.

For example, the reflective surface RF of the second shape shown in FIG. 7 can be regarded as a shape corresponding to a part of a cylindrical surface. However, in the reflective surface RF of the second shape, the curvature of the cross-sectional shape along the X-Z plane may differ depending on the position in the Y direction.

In FIGS. 5 and 6, an example of providing the metal layer 112 and the second electrode E2 separately was shown. However, the metal layer 112 and the second electrode E2 may be a single layer having the functions of both.

Figure 8:
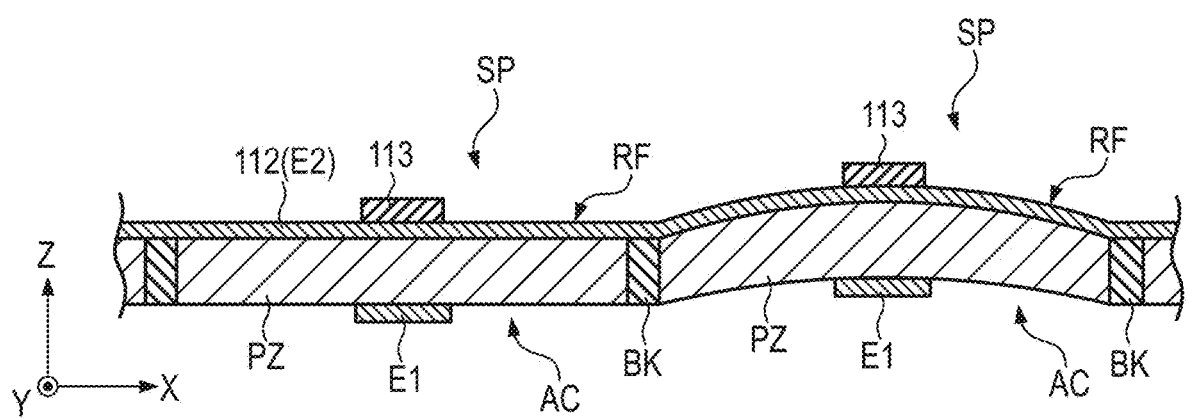
FIG. 8 is a schematic cross-sectional view showing a configuration in which a metal layer also functions as a second electrode.

FIG. 8 shows a schematic cross-sectional view of a configuration in which the metal layer 112 also functions as the second electrode E2. In this example, the metal layer 112 continuously covers the upper surface of the piezoelectric element PZ. A common voltage is applied to the metal layer 112. In this way, when the metal layer 112 also functions as the second electrode E2, the manufacturing process can be simplified and the thickness of the display panel 102 can be reduced.

As described above, in the display device 100 of the present embodiment, each of the plurality of sub-pixels SP is provided with a reflective surface RF and an actuator AC that deforms the reflective surface RF. Furthermore, by controlling the reflectance of the sub-pixel SPs with the shape of the reflective surface RF, an image is displayed in the display area DA. With this display principle, there is no need to dispose a polarizer superposed on the display area DA as in, for example, conventional reflective liquid crystal display devices. Therefore, it is possible to efficiently use external light to obtain a high-luminance image.

In addition, an actuator AC using a piezoelectric element PZ can switch the shape of the reflective surface RF at high speed. Therefore, an image with a superior response speed can be obtained compared to, for example, a liquid crystal display device or a display device using an electrophoresis element.

Furthermore, a first light-shielding layer 113 is disposed at the top of the reflective surface RF of the second shape with low reflectance. Since this first light-shielding layer 113 can shade the area where external light Lo cannot be reflected toward the second light-shielding layer 121, the luminance (reflectance) of the sub-pixel SP whose reflective surface RF is in the second shape can be made sufficiently low. As a result, the contrast of the image is improved.

The configuration of the display device 100 is not limited to the examples described with reference to FIGS. 1 to 8. Other embodiments that can be applied to the display device 100 are disclosed below. In each embodiment, the differences from the first embodiment are mainly explained. For configurations not specifically mentioned in each embodiment, the configurations disclosed in the first embodiment or other embodiments can be applied.

Second Embodiment

Figure 9:
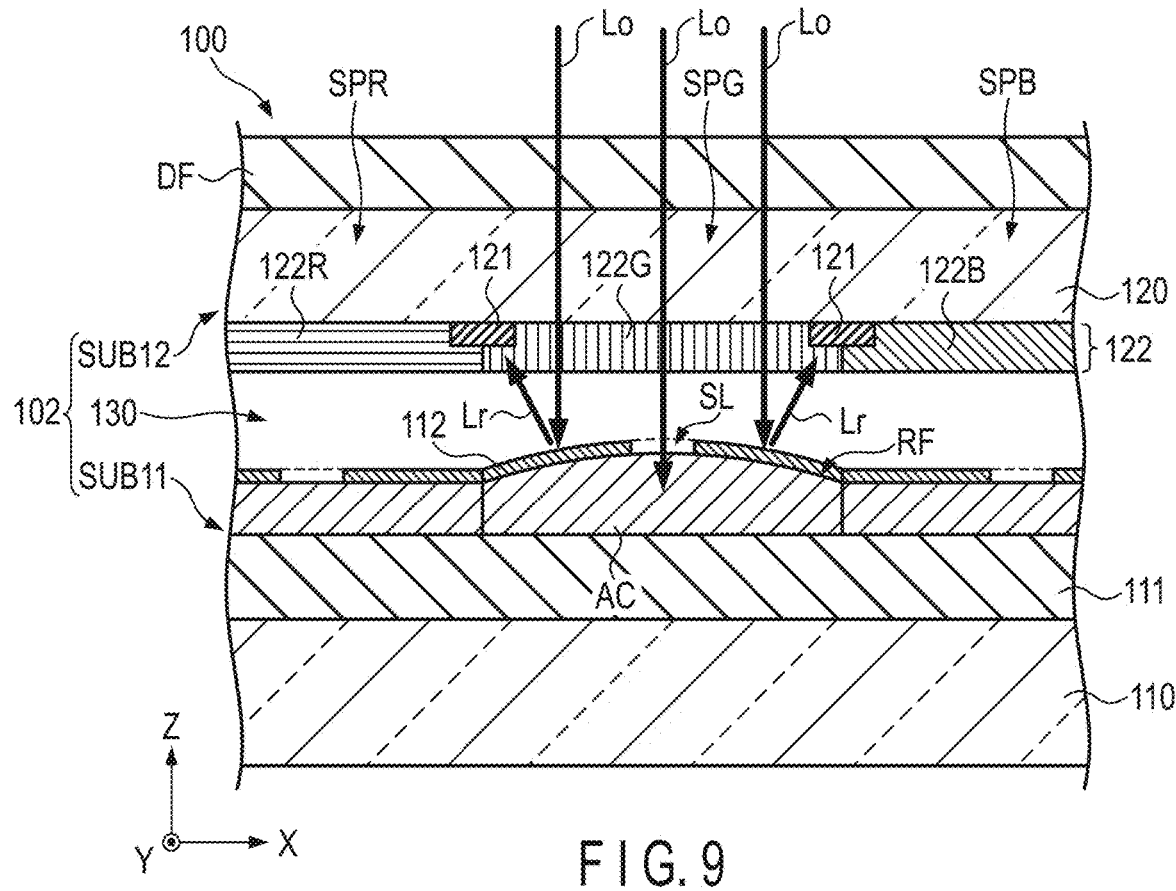
FIG. 9 is a schematic cross-sectional view of a display device according to a second embodiment.

FIG. 9 is a schematic cross-sectional view of a display device 100 according to a second embodiment, showing a state in which a reflective surface RF is deformed into a second shape as in FIG. 4. The display device 100 shown in FIG. 9 differs from the first embodiment in that a first light-shielding layer 113 is not provided and a metal layer 112 has a slit SL.

The slit SL can be provided, for example, in the same area (the top of the reflective surface RF in the second shape) as the first light-shielding layer 113 shown in the plan view of FIG. 5. In this case, the reflective surface RF is separated into two parts by the slit SL. As another example, the slit SL can be shaped to be enclosed by the reflective surface RF. In this case, the slit SL can be referred to as an opening. Furthermore, the slit SL does not contribute to the reflection of light by the metal layer 112 as in the case of the first light-shielding layer 113, and can be referred to as a non-reflective part.

In the case where the slit SL is provided in the manner of the present embodiment, external light Lo incident on an area corresponding to the top of the reflective surface RF of the second shape shown by a dashed line in FIG. 9 is not reflected and is incident on an actuator AC. The external light Lo incident on the actuator AC is absorbed, for example, by the actuator AC, a circuit layer 111, or a first insulating substrate 110, or is transmitted through them. Therefore, even in the configuration of the present embodiment, the reflection of the external light Lo at the top of the reflective surface RF in the second shape can be suppressed.

Third Embodiment

Figure 10:
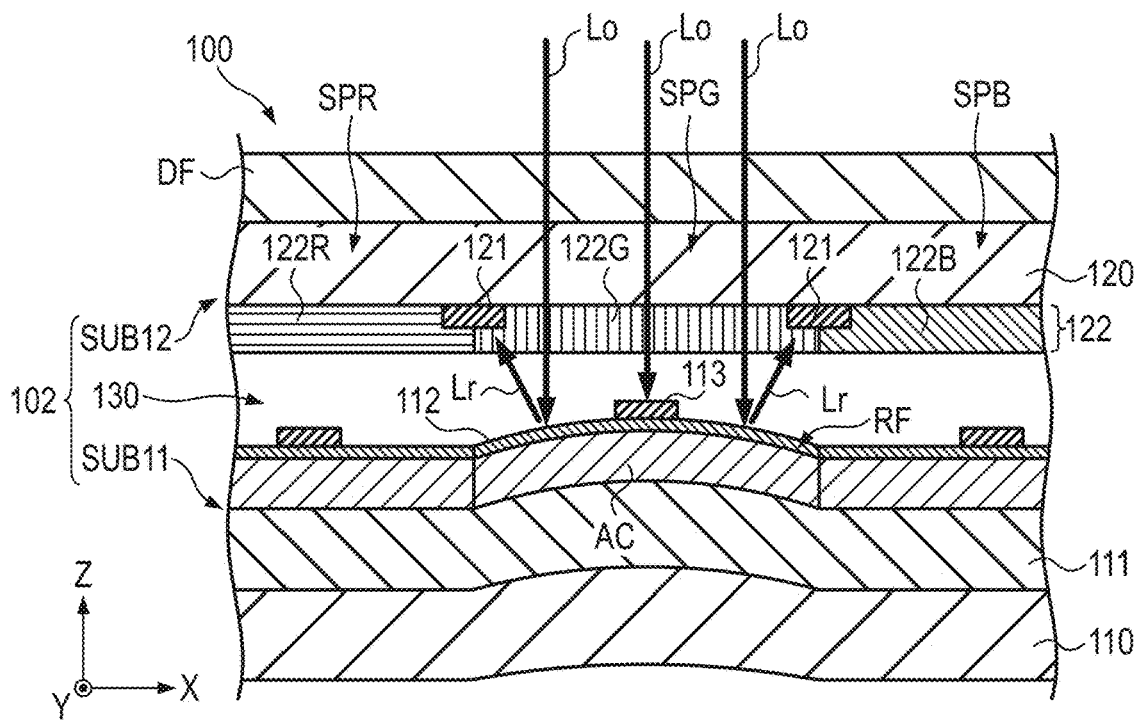
FIG. 10 is a schematic cross-sectional view of a display device according to a third embodiment.

FIG. 10 is a schematic cross-sectional view of a display device 100 according to a third embodiment, showing a state in which a reflective surface RF is deformed into a second shape as in FIG. 4. The display device 100 shown in FIG. 10 differs from the first embodiment in that a first insulating substrate 110 and a second insulating substrate 120 are flexible. For example, a resin material such as polyimide can be used as the material of the first insulating substrate 110 and the second insulating substrate 120.

In the example of FIG. 10, along with the deformation of an actuator AC, a circuit layer 111 and the first insulating substrate 110 are deformed. However, the deformation of the actuator AC does not have to cause deformation of the circuit layer 111 and the first insulating substrate 110.

With the configuration of the present embodiment, a flexible display panel 102 and display device 100 that can be bent into any shape can be realized. Furthermore, in the case where the deformation of the actuator AC causes the first insulating substrate 110 to deform as in the example of FIG. 10, the actuator AC can be easily deformed. Accordingly, it is possible to increase the amount of deformation of the reflective surface RF and increase the curvature of the second shape.

Fourth Embodiment

Figure 11:
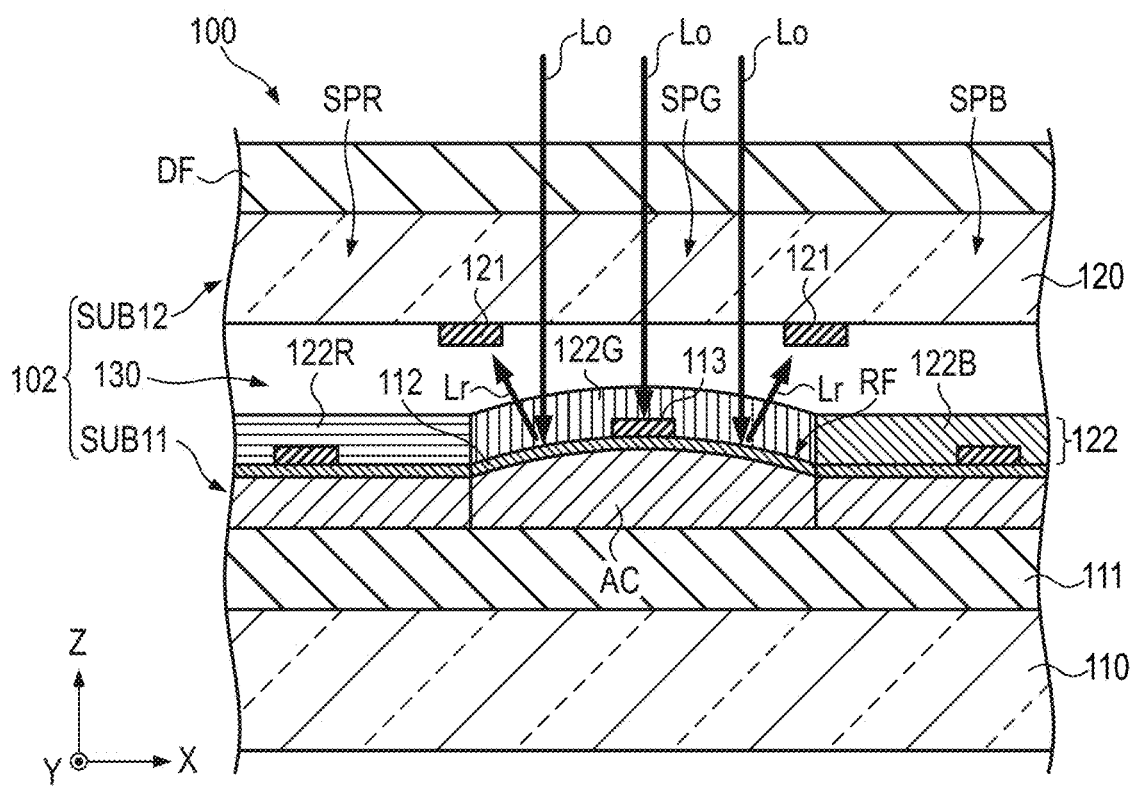
FIG. 11 is a schematic cross-sectional view of a display device according to a fourth embodiment.

FIG. 11 is a schematic cross-sectional view of a display device 100 according to a fourth embodiment, showing a state in which a reflective surface RF is deformed into a second shape as in FIG. 4. The display device 100 shown in FIG. 11 differs from the first embodiment in that a color filter layer 122 is disposed on a first substrate SUB11.

In the example of FIG. 11, the color filter layer 122 covers the first light-shielding layer 113 and the reflective surface RF. Even with this configuration, color display by reflected light Lr is possible as in the first embodiment. In addition, since the reflective surface RF, an actuator AC, and the color filter layer 122 are provided on the first substrate SUB11, the misalignment of these elements is suppressed, and the display quality can be further improved.

Fifth Embodiment

Figure 12:
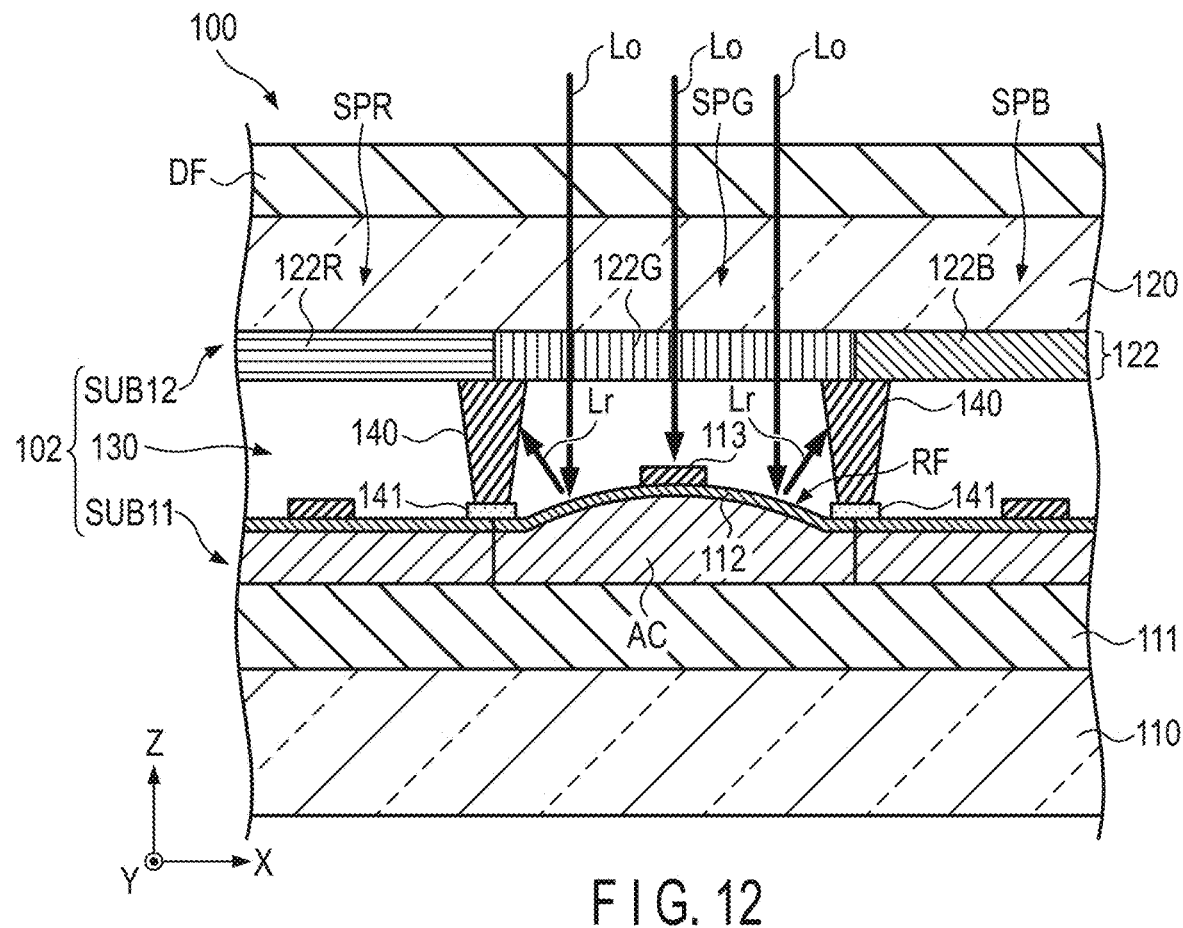
FIG. 12 is a schematic cross-sectional view of a display device according to a fifth embodiment.

FIG. 12 is a schematic cross-sectional view of a display device 100 according to a fifth embodiment, showing a state in which a reflective surface RF is deformed into a second shape as in FIG. 4. The display device 100 shown in FIG. 12 differs from the first embodiment in that a light-shielding spacer 140 is disposed at the boundary of adjacent sub-pixels SP.

For example, the spacer 140 extends from a second substrate SUB12 to a first substrate SUB11 in an intermediate layer 130 between the first substrate SUB11 and the second substrate SUB12. As another example, the spacer 140 may extend from the first substrate SUB11 to the second substrate SUB12.

In the example of FIG. 12, the distal end of the spacer 140 is bonded to a metal layer 112 by an adhesive layer 141. However, the distal end of the spacer 140 may contact the first substrate SUB11 without the adhesive layer 141. Alternatively, there may be a gap between the distal end of the spacer 140 and the first substrate SUB11.

Instead of the second light-shielding layer 121 shown in FIG. 4, the spacer 140 absorbs reflected light Lr from the reflective surface RF of the second shape. Although the second light-shielding layer 121 is omitted in the example of FIG. 12, the display device 100 may comprise the second light-shielding layer 121 together with the spacer 140.

Figure 13:
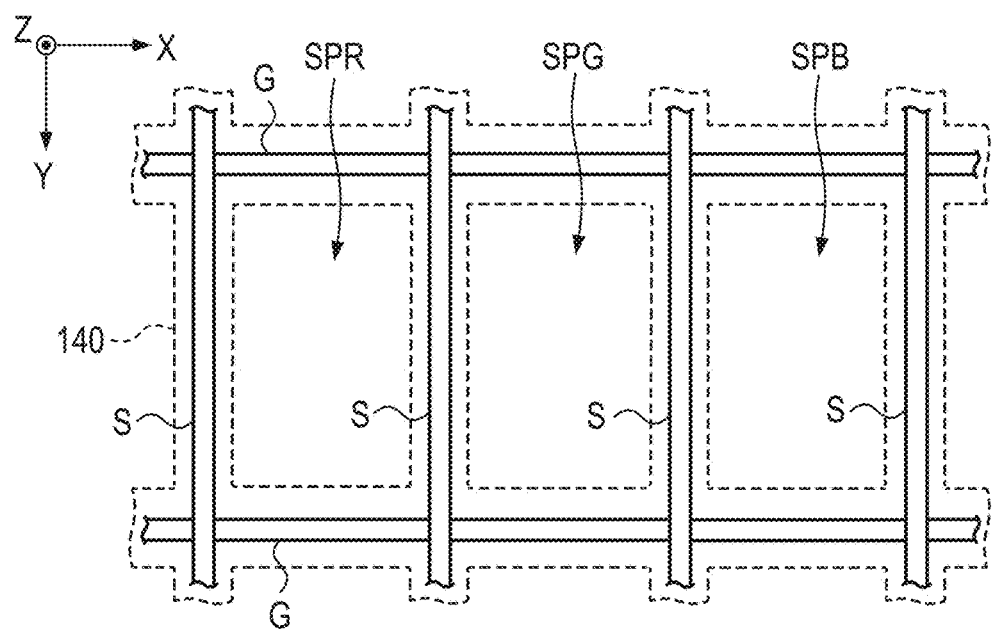
FIG. 13 is a schematic plan view showing an example of a shape of a spacer shown in FIG. 12.

FIG. 13 is a schematic plan view showing an example of the shape of the spacer 140. As shown in this drawing, the spacer 140 may be a grid shape superposed on a scanning line G and a signal line S. As another example, the spacer 140 may be superposed on the signal line S and extend in a straight line in a Y direction.

Even in the case of where the reflected light Lr is absorbed by the spacer 140 as in the present embodiment, the same display principle as in the first embodiment can be realized. Furthermore, since most of the reflected light Lr from one sub-pixel SP to an adjacent sub-pixel SP is blocked by the spacer 140, the display quality can be improved.

Also, in the structure of FIG. 12, the reflective surface RF is held by the spacer 140. In this case, deformation of the reflective surface RF and actuator AC in one sub-pixel SP is less likely to affect the reflective surface RF and actuator AC in other sub-pixels SP. If the spacers 140 are lattice-shaped, as in the example of FIG. 13, such an effect is enhanced.

Sixth Embodiment

Figure 14:
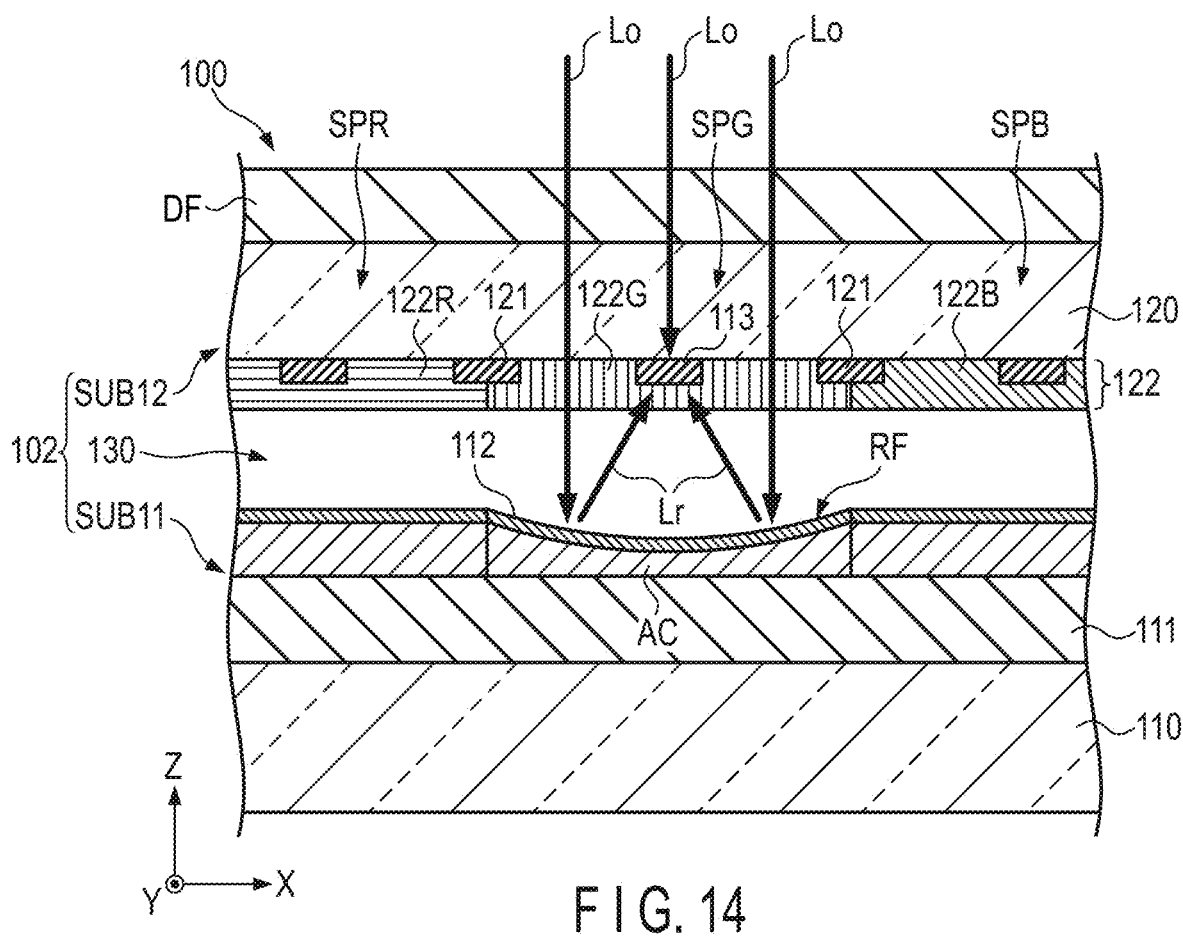
FIG. 14 is a schematic cross-sectional view of a display device according to a sixth embodiment.

FIG. 14 is a schematic cross-sectional view of a display device 100 according to a sixth embodiment, showing a state in which a reflective surface RF is deformed into a second shape as in FIG. 4. While the second shape in FIG. 4 is a convex curved surface with the convex facing away from a first insulating substrate 110, the second shape in FIG. 14 is a concave curved surface concaved toward the first insulating substrate 110.

A second substrate SUB12 is provided with a first light-shielding layer 113. For example, as shown in the drawing, the first light-shielding layer 113 may be located in the same layer as a second light-shielding layer 121, or may be located in another layer. The first light-shielding layer 113 faces the bottom of the concave curved reflective surface RF. Instead of the first light-shielding layer 113, a metal layer 112 may be provided with a slit or opening at a position at the bottom of the reflective surface RF.

On the concave curved reflective surface RF, reflected light Lr heads toward the vicinity of the center of a sub-pixel SP in an X direction. Most of such reflected light Lr is absorbed by the first light-shielding layer 113 in the second substrate SUB12. In addition, external light Lo heading to the bottom of the reflective surface RF is also absorbed by the first light-shielding layer 113.

Figure 15:
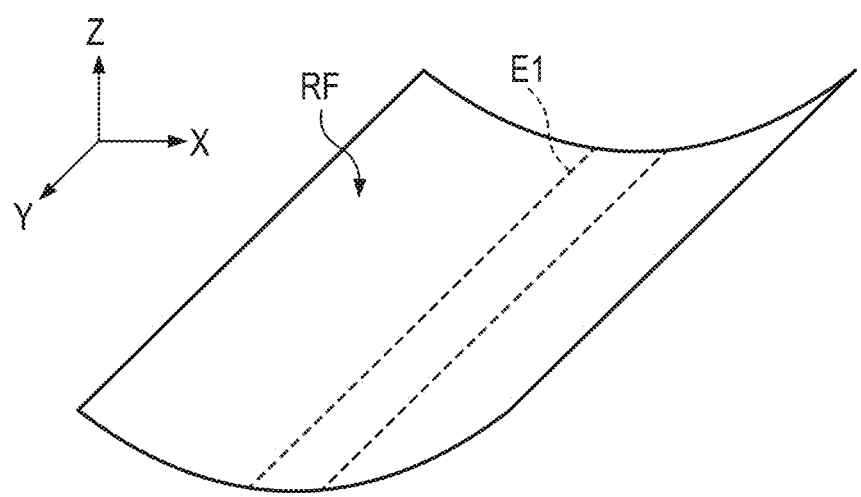
FIG. 15 is a schematic perspective view showing an example of a reflective surface of a second shape according to the sixth embodiment.

FIG. 15 is a schematic diagram of an example of the reflective surface RF in the second shape. For example, in the case where an actuator AC is structured using a piezoelectric element PZ, a first electrode E1, and a second electrode E2 as shown in FIG. 5, the piezoelectric element PZ is, for example, deformed into a shape that extends uniformly in a Y direction in the cross-sectional shape shown in FIG. 14. Therefore, as shown in FIG. 15, the reflective surface RF also deforms into the same shape (second shape) as the piezoelectric element PZ. In this case, the first electrode E1 is superposed on the bottom of the reflective surface RF.

Even with the configuration of the present embodiment, the same display principle as that of the first embodiment can be realized. The second shape of the reflective surface RF may be concave as in the present embodiment in the display devices 100 of the second to fifth embodiments, as well as in the display devices 100 of the embodiments described below.

Seventh Embodiment

Figure 16:
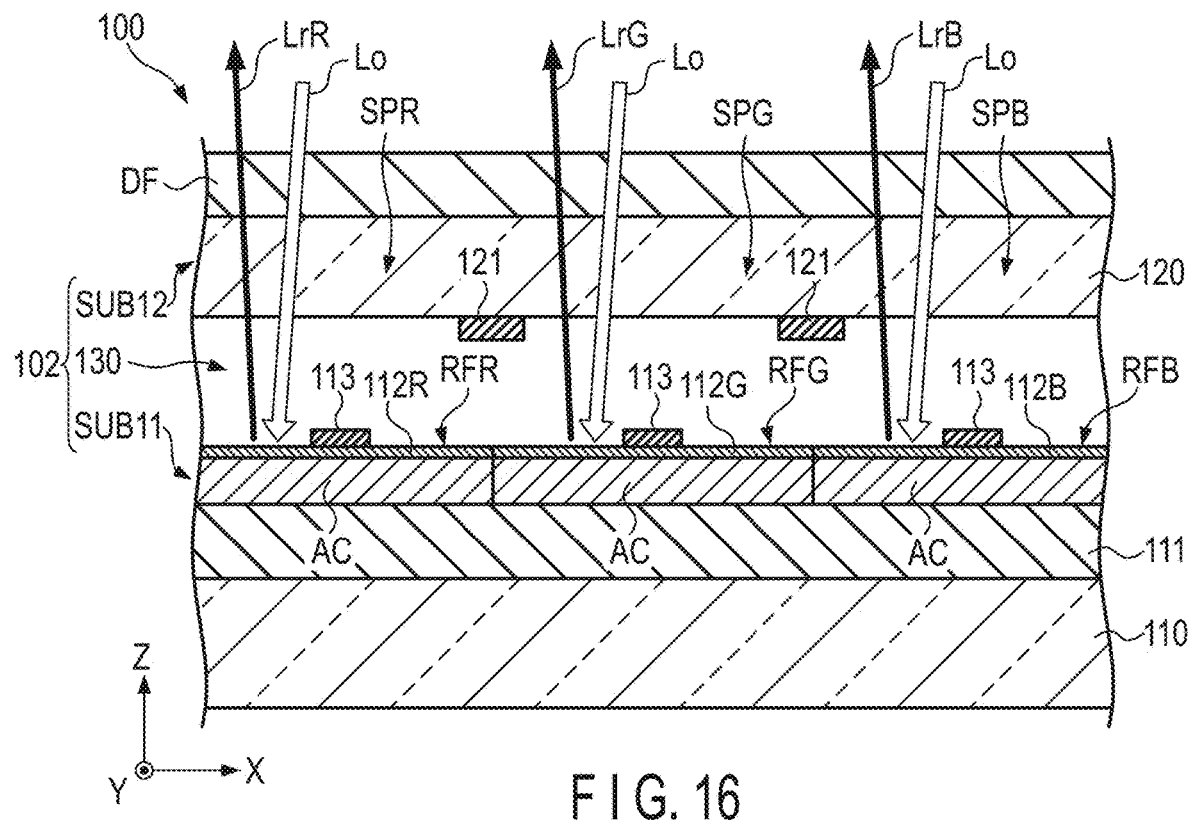
FIG. 16 is a schematic cross-sectional view of a display device according to a seventh embodiment.

FIG. 16 is a schematic cross-sectional view of a display device 1 according to a seventh embodiment. In the present embodiment, a display device 100 is not provided with a color filter layer 122. Instead, a metal layer 112 has the function of reflecting light of a specific color. Hereinafter, the metal layer 112 and a reflective surface RF in a red sub-pixel SPR are referred to as a metal layer 112R and a reflective surface RFR, respectively; the metal layer 112 and the reflective surface RF in a green sub-pixel SPG are referred to as a metal layer 112G and a reflective surface RFG, respectively; and the metal layer 112 and the reflective surface RF in a blue sub-pixel SPB are referred to as a metal layer 112B and a reflective surface RFB, respectively.

The reflective surface RFR reflects, for example, light in a red wavelength range included in an external light Lo, which is natural light. The reflective surface RFG reflects light in a green wavelength range included in the external light Lo. The reflective surface RFB reflects light in a blue wavelength range included in the external light Lo. Therefore, a reflected light LrR by the reflective surface RFR has a red wavelength range, the reflected light LrG by the reflective surface RFG has a green wavelength range, and the reflected light LrB by the reflective surface RFB has a blue wavelength range.

Figure 17:
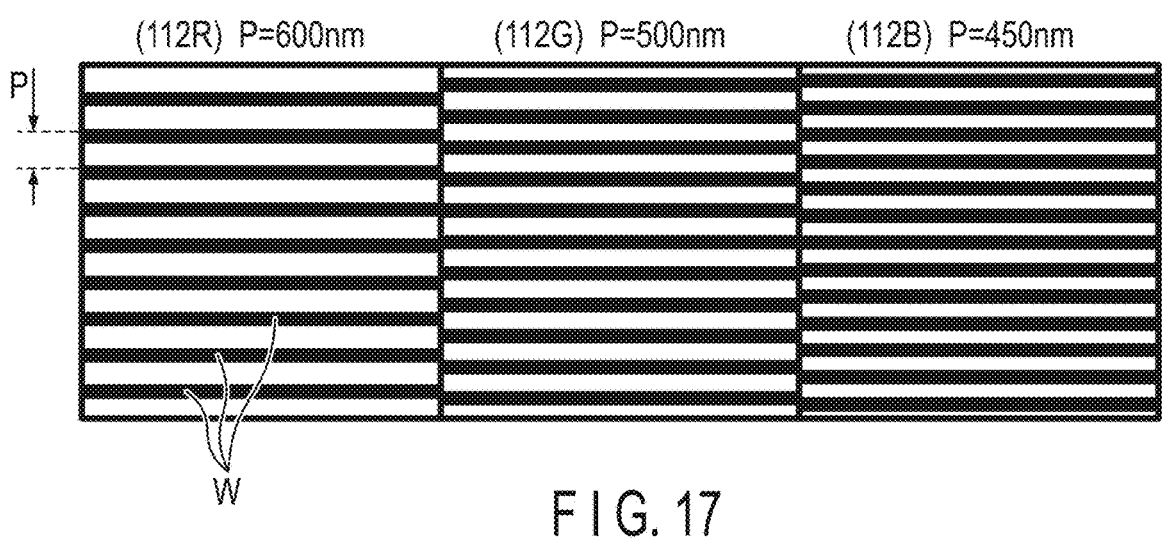
FIG. 17 is a plan view showing a schematic configuration of a metal layer shown in FIG. 16.

FIG. 17 is a plan view showing a schematic configuration of the metal layers 112R, 112G, and 112B. The reflective surfaces RFR, RFG, and RFB with the above-mentioned reflective capability can be realized, for example, by applying surface prismatic resonance. That is, by using a plurality of fine wires W to configure the metal layers 112R, 112G, and 112B, and lining them up with an array period P included in the wavelength range of visible light, visible light of a wavelength corresponding to said period P can be reflected.

For example, if the array period P of the metal layer 112R is set to 600 nm, the reflective surface RFR can produce reflected light in the red wavelength range. If the array period P of the metal layer 112G is set to 500 nm, the reflective surface RFG can produce reflected light in the green wavelength range. If the array period P of the metal layer 112B is set to 450 nm, the reflective surface RFB can produce reflected light in the blue wavelength range. The array period P in the metal layers 112R, 112G, and 112B is not limited to these values.

With the configuration of the present embodiment, the color filter layer 122 can be omitted. Furthermore, since the metal layer 112 is used to generate the reflected light of each color, there is no need to add a separate layer. Therefore, it is possible to make the display device 100 thinner.

Eighth Embodiment

A second shape of a reflective surface RF is not limited to that shown in FIG. 7. In the present embodiment, other examples of the second shape are disclosed.

Figure 18:
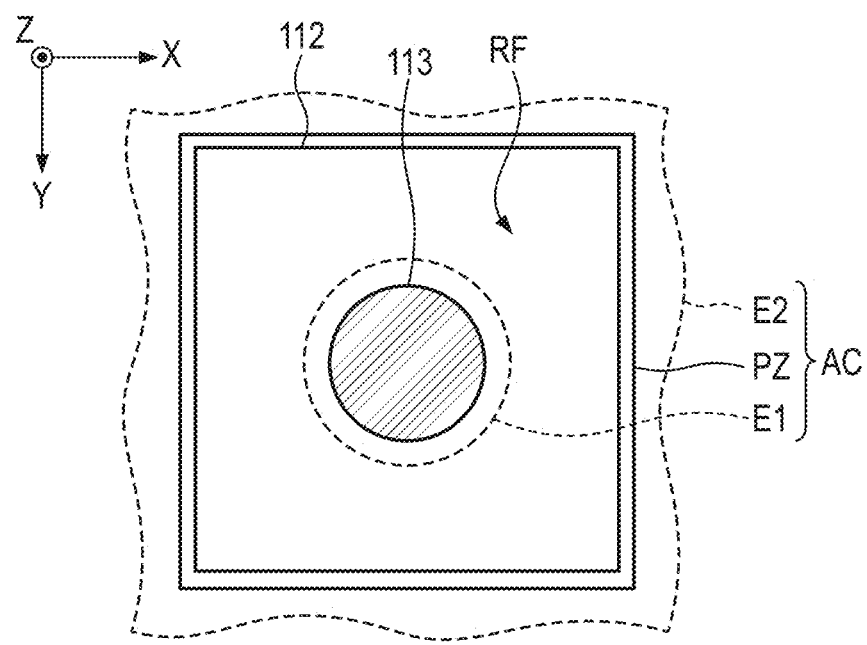
FIG. 18 is a schematic plan view of an actuator in an eighth embodiment.

FIG. 18 is a schematic plan view of an actuator AC in an eighth embodiment. This actuator AC comprises a piezoelectric element PZ, a first electrode E1, and a second electrode E2 as in the first embodiment. The first electrode E1, piezoelectric element PZ, and second electrode E2 are stacked in this order in a Z direction. A metal layer 112 including a reflective surface RF is disposed on top of the second electrode E2, and a first light-shielding layer 113 is further disposed on top of the metal layer 112. The metal layer 112 and the second electrode E2 may be a single layer having both functions.

In the present embodiment, the first electrode E1 is a regular circle superposed near the center of the piezoelectric element PZ. Similarly, the first light-shielding layer 113 is a regular circle superposed on the first electrode E1. Note that the first electrode E1 and the first light-shielding layer 113 may be other shapes such as oval or polygonal.

Figure 19:
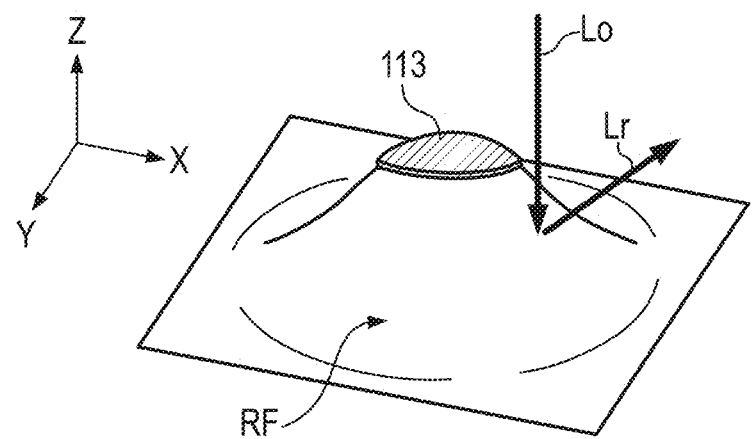
FIG. 19 is a schematic perspective view showing an example of a reflective surface of a second shape in the eighth embodiment.

FIG. 19 is a schematic perspective view showing an example of a reflective surface RF in a second shape in the present embodiment. In the present embodiment, when a potential difference is formed between the first and second electrodes E1 and E2, the reflective surface RF deforms into a convex curved surface that rises toward the vicinity of the center. The first light-shielding layer 113 covers the top of such a reflective surface RF in the second shape.

Most of an external light Lo incident on the reflective surface RF of the second shape is reflected by the raised inclined surface. This reflected light Lr heads in the direction of an adjacent sub-pixel SP and is absorbed by the second light-shielding layer 121 or spacer 140 described above. A first shape of the reflective surface RF when no potential difference is formed between the first and second electrodes E1 and E2 is, for example, a flat surface, or may be a curved surface that is more gently curved than the second shape.

Even with the configuration of the present embodiment, the same display principle as in the first embodiment can be realized. The reflective surface RF of the second shape may be a concave curved surface that is depressed toward the vicinity of the center.

Ninth Embodiment

The configuration of an actuator AC is not limited to that using a piezoelectric element PZ. In the present embodiment, other examples of the actuator AC are disclosed.

Figure 20:
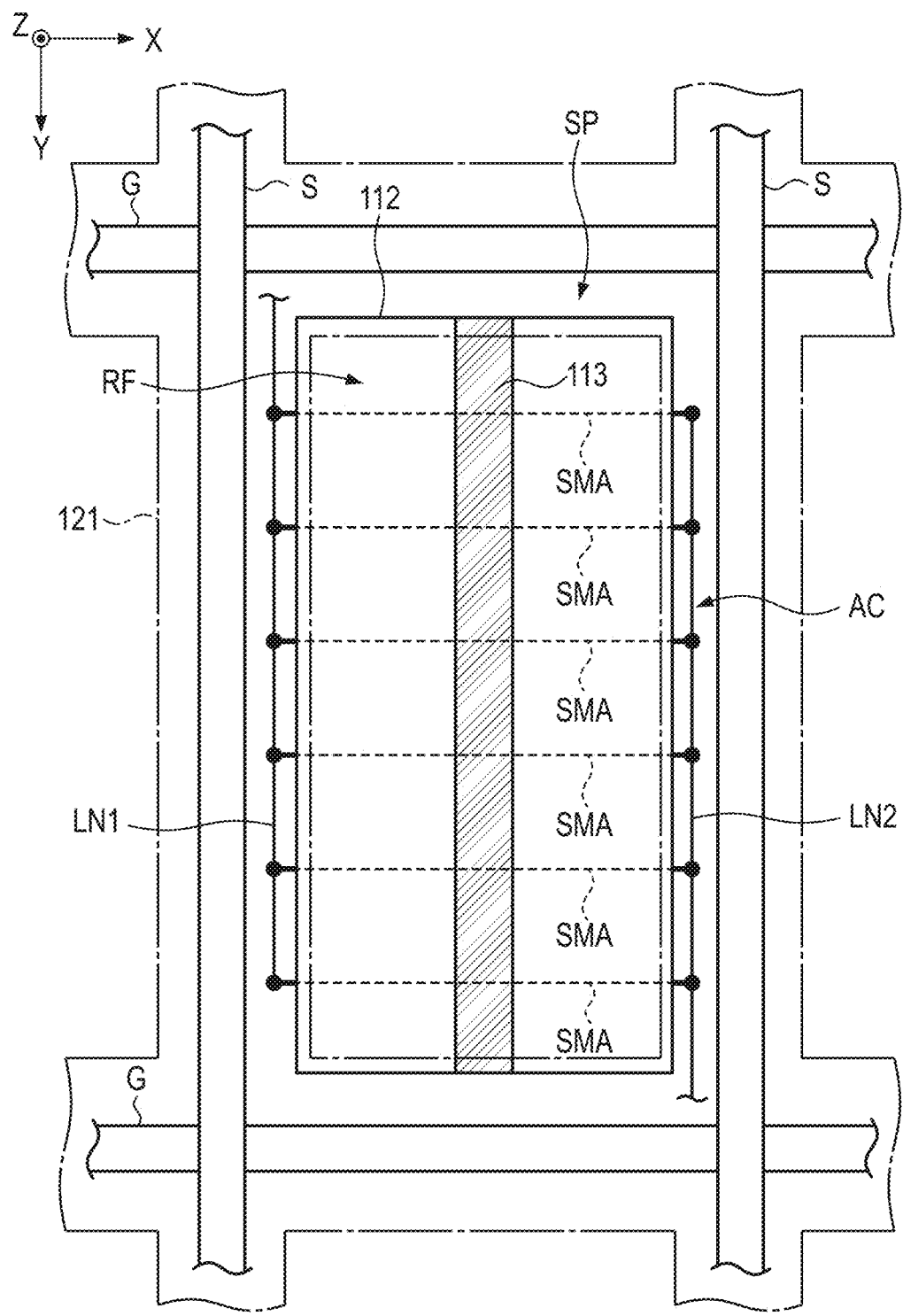
FIG. 20 is a plan view showing an example of a configuration applicable to a sub-pixel in a ninth embodiment.

FIG. 20 is a plan view showing an example of a configuration that can be applied to a sub-pixel SP in the present embodiment. The shapes of a scanning line G, a signal line S, a metal layer 112, a first light-shielding layer 113, and a second light-shielding layer 121 are the same as those in the example of FIG. 5. In the present embodiment, the actuator AC comprises a plurality of shape memory alloys SMA, a first line LN1, and a second line LN2.

The plurality of shape memory alloys SMA are all in the form of lines extending in the X direction and aligned in the Y direction. One end of each shape memory alloy SMA is connected to the first line LN1, and the other end is connected to the second line LN2. The first line LN1 is electrically connected to the switching element SW described above. The second line LN2 is connected to a wiring substrate 4, for example, via the terminal T described above.

The metal layer 112 is superposed on the plurality of shape memory alloys SMA. The first light-shielding layer 113 intersects the plurality of shape memory alloys SMA. Although six shape memory alloys SMA are shown in FIG. 20, the actuator AC may comprise a larger or smaller number of shape memory alloys SMA.

Figure 21:
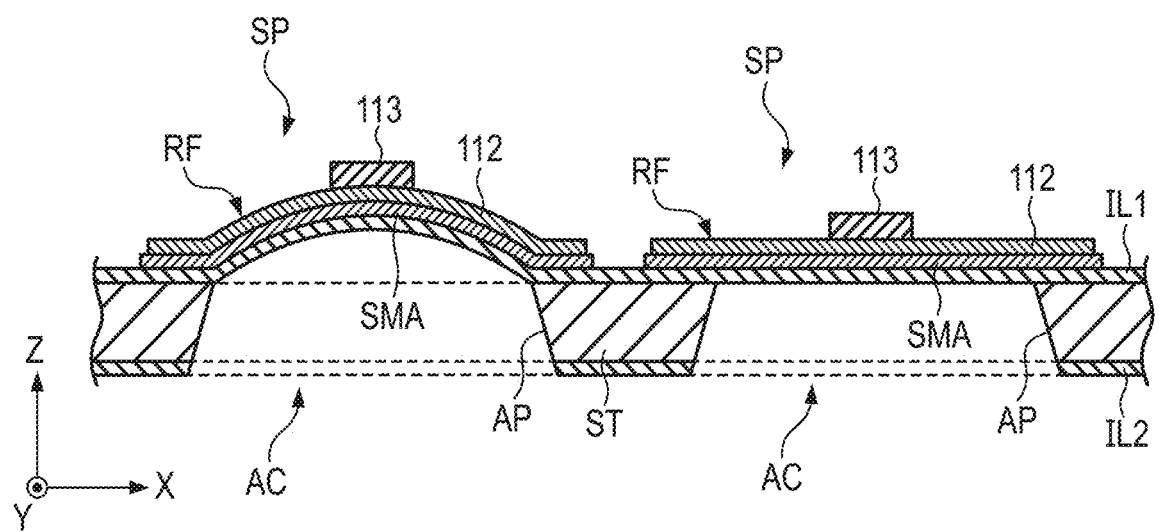
FIG. 21 is a schematic cross-sectional view of an actuator in the ninth embodiment.

FIG. 21 is a schematic cross-sectional view of the actuator AC along an X-Z plane. In addition to the plurality of shape memory alloys SMA, the actuator AC further comprises a support substrate ST, a first insulating layer IL1, and a second insulating layer IL2. The support substrate ST is, for example, a Si substrate and has a size that superposes on an entire display area DA. The first insulating layer IL1 and the second insulating layer IL2 are, for example, both $SiO_2$ films and cover the upper and bottom surfaces of the support substrate ST, respectively. The shape memory alloy SMA is disposed on top of the first insulating layer IL1. The metal layer 112 covers the shape memory alloy SMA. The first light-shielding layer 113 is disposed on top of the metal layer 112.

The support substrate ST has an opening AP in each sub-pixel SP. The planar shape of the opening AP is, for example, a rectangular shape similar to the planar shape of the metal layer 112, but is not limited to this example. Each shape memory alloy SMA intersects the opening AP.

The shape memory alloy SMA is, for example, a Ti—Ni shape memory alloy, which has the property of recovering its shape when heated to a high temperature region above the above specified temperature, even in a case where it is deformed in a low temperature region below the specified temperature.

For example, when the actuator AC is at a low temperature, about room temperature, the shape memory alloy SMA rises convexly, as in the sub-pixel SP shown to the left in FIG. 21. Accordingly, the reflective surface RF also becomes a convex curved surface (i.e., a second shape).

When an electric current is supplied to the shape memory alloy SMA through the switching element SW and the first line LN1, the shape memory alloy SMA is heated up by Joule heat. At this time, the shape memory alloy SMA recovers its shape and becomes flat, as in the sub-pixel SP shown to the right in FIG. 21. Accordingly, the reflective surface RF also becomes flat or more gently curved than the second shape (i.e., a first shape).

When the shape memory alloy SMA is at a low temperature again, bias force caused by the difference in thermal expansion coefficients of the shape memory alloy SMA, the first insulating layer IL1, and the support substrate ST causes the shape memory alloy SMA to deform convexly. Specifically, in the case where the shape memory alloy SMA is Ti—Ni, the support substrate ST is Si, and the first insulating layer IL1 is SiO2, the thermal expansion coefficient becomes larger in the order of Ti—Ni, Si, and SiO2. Therefore, when transitioning from the high temperature region to the low temperature region, the thermal contraction of the first insulating layer IL1 is smaller than that of the support substrate ST, etc., and the bias force of the first insulating layer IL1 causes the shape memory alloy SMA to rise at a position corresponding to the opening AP.

Even with the configuration of the present embodiment, a curved reflective surface RF in the second shape can be obtained as in FIG. 7. For example, a reflective surface RF raised toward the vicinity of the center as in FIG. 19 may be realized by making the shape memory alloy SMA into a film shape, instead of a linear shape, covering the opening AP.

Tenth Embodiment

In the present embodiment, an electrostatic actuator is disclosed as yet another example of an actuator AC.

FIG. 22 is a plan view showing an example of a configuration that can be applied to a sub-pixel SP in the present embodiment. The shapes of a scanning line G, a signal line S, a metal layer 112, a first light-shielding layer 113, and a second light-shielding layer 121 are the same as those in the example of FIG. 5. In the present embodiment, the actuator AC comprises a first electrode Ea1 and a second electrode Ea2.

The first electrode Ea1 has a linear shape that is superposed on a central part of the sub-pixel SP in an X direction and extends longitudinally in a Y direction. The second electrode Ea2, for example, has a shape extending over a plurality of sub-pixels SP and is superposed on the first electrode Ea1. The second electrode Ea2 may be divided for each sub-pixel SP. The first light-shielding layer 113 has a linear shape that is superimposed on the first electrode Ea1 and extends longitudinally in the Y direction. The first and second electrodes Ea1 and Ea2 can be formed of, for example, transparent conductive materials such as ITO.

Figure 23:
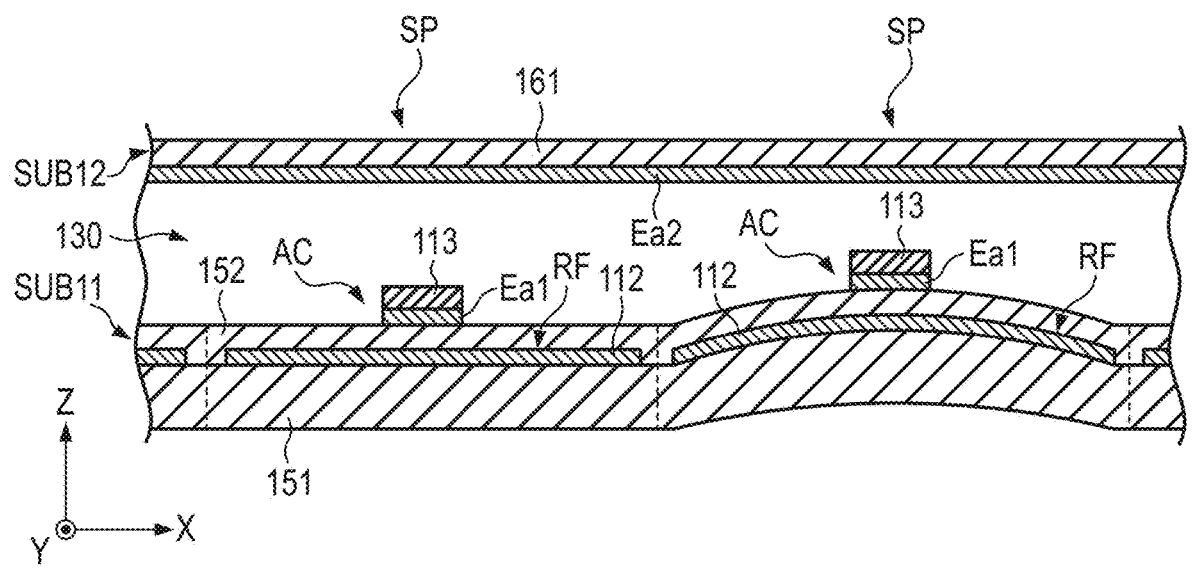
FIG. 23 is a schematic cross-sectional view of an actuator in the tenth embodiment.

FIG. 23 is a schematic cross-sectional view of the actuator AC along an X-Z plane. The first electrode Ea1 is disposed on a first substrate SUB11. The second electrode Ea2 is disposed on a second substrate SUB12. The first electrode Ea1 and the second electrode Ea2 face each other through an intermediate layer 130.

In the example of FIG. 23, the first substrate SUB11 is further provided with insulating layers 151 and 152. The insulating layer 151 is disposed, for example, on the circuit layer 111 described above. The metal layer 112 is disposed on top of the insulating layer 151 and is covered by the insulating layer 152. The first electrode Ea1 is disposed on top of the insulating layer 152 and is covered by the first light-shielding layer 113. In the example of FIG. 23, a gap is provided between the metal layers 112 of adjacent sub-pixels SP. As another example, the metal layers 112 of adjacent sub-pixels SP may be continuous.

The second substrate SUB12 is further provided with an insulating layer 161. The insulating layer 161 is disposed, for example, under the color filter layer 122 described above. The second electrode Ea2 covers the lower surface of the insulating layer 161. In the example of FIG. 23, the second electrode Ea2 is in contact with the intermediate layer 130, but the second electrode Ea2 may be covered by another insulating layer.

The first electrode Ea1 is electrically connected to the relay electrode RE shown in FIG. 3. Therefore, a voltage of a video signal supplied to a signal line S is applied to the first electrode Ea1 via a switching element SW. A common voltage of 0 V is applied to the second electrode Ea2.

In the sub-pixel SP shown on the left side in FIG. 23, no potential difference is formed between the first and second electrodes Ea1 and Ea2. In other words, the voltage of the first electrode Ea1 is 0 V, which is the same as the common voltage. In this case, the metal layer 112 and insulating layers 151 and 152 are flat, and the reflective surface RF is also a flat first shape.

On the other hand, in the sub-pixel SP shown on the right side in FIG. 23, a potential difference is formed between the first and second electrodes Ea1 and Ea2. For example, the voltage of the first electrode Ea1 is a few V. In this case, the electrostatic attraction (Coulomb force) attracts the first electrode Ea1 to the second electrode Ea2. Therefore, the metal layer 112 is curved together with the insulating layers 151 and 152, and the reflective surface RF becomes a convex second shape accordingly.

Even with the configuration of the present embodiment, the reflective surface RF in the curved second shape can be obtained in the same manner as in FIG. 7. For example, by making the first electrode Ea1 a circle superposed near the center of the sub-pixel SP, a reflective surface RF raised toward the vicinity of the center may be realized in the same manner as in FIG. 19. Also, a strong voltage of, for example, about 10 V may be applied to the first and second electrodes Ea1 and Ea2 to realize a concave reflective surface RF as in FIG. 15 by electrostatic repulsion between these electrodes.

11th Embodiment

In an 11th embodiment, a transmissive display device 200 is disclosed in which the shape of a boundary surface between high and low refractive index layers of a pixel can be controlled. Elements identical or similar to those of the above-mentioned embodiments are given the same symbols, and descriptions thereof may be omitted.

Figure 24:
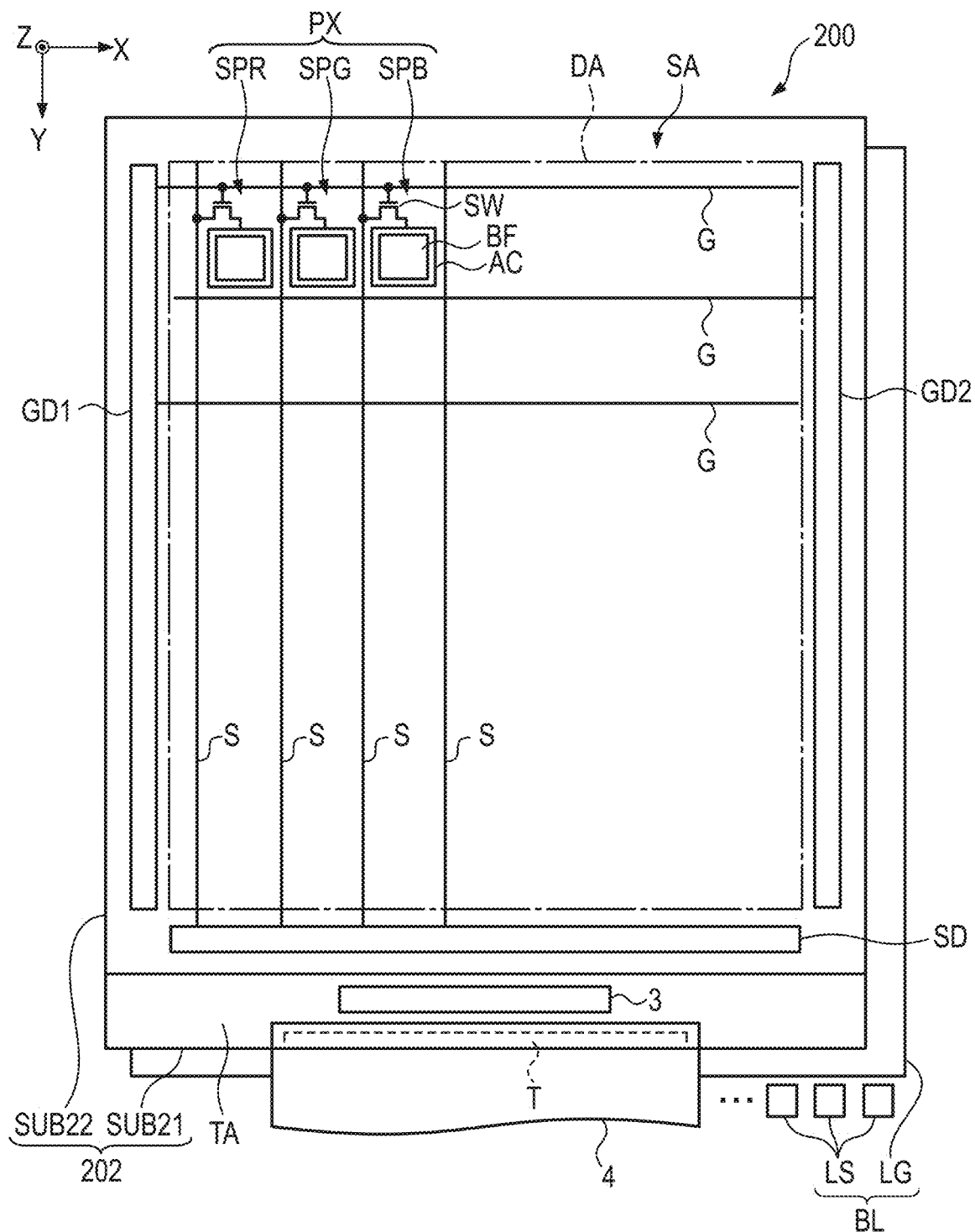
FIG. 24 shows a schematic configuration of a display device according to an 11th embodiment.
Figure 25:
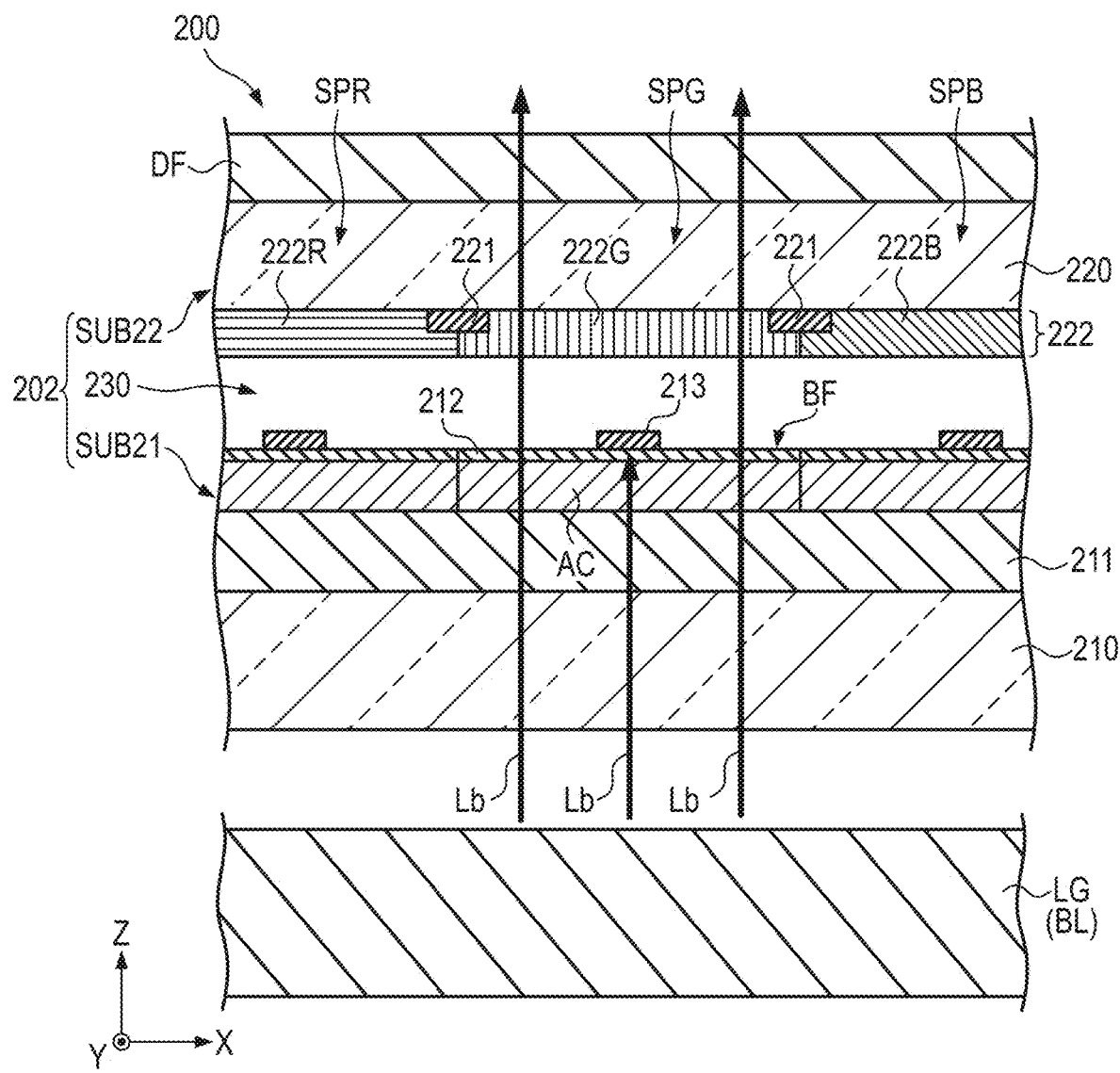
FIG. 25 is a schematic cross-sectional view of the display device according to the 11th embodiment.

First, a basic configuration of the display device 200 according to the 11th embodiment is exemplified with reference to FIGS. 24 and 25.

FIG. 24 shows a schematic configuration of the display device 200 according to the present embodiment. In the same manner as in the first to tenth embodiments described above, X, Y, and Z directions are defined. Hereinafter, a view of the display device 200 in parallel to the Z direction is referred to as a plan view.

The display device 200 is provided with a display panel 202, a controller 3, a wiring substrate 4, and a backlight BL. The display panel 202 comprises a first substrate SUB21 and a second substrate SUB22. The first substrate SUB21 and the second substrate SUB22 are facing each other in the Z direction. The first substrate SUB21 includes a terminal area TA that does not face the second substrate SUB22.

Similar to the display panel 102 shown in FIG. 1, the display panel 202 comprises a display area DA, a peripheral area SA, a plurality of pixels PX, a plurality of scanning lines G, a plurality of signal lines S, a first scanning driver GD1, a second scanning driver GD2, and a signal driver SD.

Furthermore, the first substrate SUB21 is provided with a switching element SW disposed in each sub-pixel SP, a boundary surface BF of a high refractive index layer 212 and a low refractive index layer 230 to be described later, and an actuator AC. The switching element SW is connected to the scanning line G and the signal line S. When a scanning signal is supplied to the scanning line G, a video signal of the signal line S is supplied to the actuator AC. The actuator AC deforms the shape of the boundary surface BF in accordance with the video signal supplied through the switching element SW.

The backlight BL is provided with a light guide LG and a plurality of light sources LS. The light guide LG faces the back surface of the first substrate SUB21. The plurality of light sources LS are aligned along the sides of the light guide LG and irradiate light on the sides. The plurality of light sources LS may, for example, include light emitting elements that emit red, green, or blue light, or may be configured by light emitting elements that emit light of a specific color (e.g., white). Light from each light source LS propagates through the interior of the light guide LG and is emitted from the surface of the light guide LG facing the first substrate SUB21 toward the first substrate SUB21.

FIG. 25 is a schematic cross-sectional view of the display device 200. A low refractive index layer 230 is provided between the first substrate SUB21 and the second substrate SUB22. As an example, the low refractive index layer 230 is a space (air, other gas, or vacuum), but it may contain a liquid, such as liquid crystal, or a solid, such as transparent resin.

The first substrate SUB21 comprises a first insulating substrate 210, a circuit layer 211, an actuator AC, a high refractive index layer 212, and a first light-shielding layer 213. The circuit layer 211 includes the scanning line G, the signal line S, the switching element SW, and the plurality of insulating layers described above; however, in FIG. 25, the circuit layer 211 is simplified. A structure similar to that of FIG. 3 can be applied to the circuit layer 211.

The first insulating substrate 210 can be formed of glass, for example. The circuit layer 211 is provided on the upper surface of the first insulating substrate 210 (a surface facing the second substrate SUB22). The actuator AC is translucent and is provided above the circuit layer 211. The high refractive index layer 212 is formed, for example, by a transparent resin material and covers the actuator AC. The high refractive index layer 212 has a higher refractive index than the low refractive index layer 230.

In the example of FIG. 25, the surface of the high refractive index layer 212 (the interface between the high refractive index layer 212 and the low refractive index layer 230) corresponds to the boundary surface BF. The first light-shielding layer 213 covers a part of the boundary surface BF. In the example of FIG. 25, the first light-shielding layer 213 is provided near the center of each sub-pixel SP in the X direction, but is not limited thereto.

In the example of FIG. 25, the actuators AC of adjacent sub-pixels SP are in contact with each other. The high refractive index layers 212 of the adjacent sub-pixels SP are also in contact with each other. The high refractive index layers 212 of the adjacent sub-pixels SP may be formed integrally and continuously.

The second substrate SUB22 comprises a second insulating substrate 220, a second light-shielding layer 221, and a color filter layer 222. The second insulating substrate 220 can be formed of glass, for example. The second light-shielding layer 221 and the color filter layer 222 are provided on the lower surface of the second insulating substrate 220 (a surface facing the first substrate SUB21).

The second light-shielding layer 221 is superposed on the boundary of the adjacent sub-pixels SP. In other words, the second light-shielding layer 221 is in the form of a grid superposed on the scanning line G and the signal line S shown in FIG. 24. The color filter layer 222 includes a red color filter 222R facing the boundary surface BF of a sub-pixel SPR, a green color filter 222G facing the boundary surface BF of a sub-pixel SPG, and a blue color filter 222B facing the boundary surface BF of a sub-pixel SPB.

The light guide LG of the backlight BL faces the first insulating substrate 210. Light Lb emitted from the light guide LG is incident on the first insulating substrate 210. An optical sheet such as a prism sheet may be interposed between the light guide LG and the first insulating substrate 210. As in the example of FIG. 2, the display panel 202 may be further provided with a diffusion layer DF provided on the upper surface of the second insulating substrate 220.

[Display Principle]

The display device 200 of the present embodiment is a transmissive display device that displays an image by changing the transmittance of light Lb from the backlight BL for each sub-pixel SP. Specifically, the transmittance of the sub-pixels SP is controlled by deforming the boundary surface BF with the actuator AC. A specific example of the display principle of the display device 200 will be explained with reference to FIGS. 25 and 26.

FIG. 26 is a schematic cross-sectional view of the display device 200, showing a state in which the actuator AC of the sub-pixel SPG deforms the boundary surface BF from the shape shown in FIG. 25.

Hereinafter, the shape of the boundary surface BF of the sub-pixel SPG in FIG. 25 is referred to as a first shape, and the shape of the boundary surface BF of the sub-pixel SPG in FIG. 26 is referred to as a second shape.

The first shape shown in FIG. 25 is a plane parallel to the upper surface (X-Y plane) of the first insulating substrate 210. The light Lb from the backlight BL is, for example, diffused light having an intensity peak in the Z direction or collimated light substantially parallel to the Z direction. The light Lb is incident on the boundary surface BF through the first insulating substrate 210, the circuit layer 211, and the actuator AC. Since the boundary surface BF of the first shape is a flat surface, light Lb is either not refracted at the boundary surface BF or is slightly refracted at the boundary surface BF if light Lb is slightly tilted with respect to the Z direction, and is emitted to the low refractive index layer 230. The light Lb then passes through the color filter 222G and the second insulating substrate 220, is diffused in the diffusion layer DF, and is emitted from the display panel 202. This causes the sub-pixel SPG to display green. A part of the light Lb is absorbed by the first light-shielding layer 213.

The second shape shown in FIG. 26 is a concave curved surface concaved toward the first insulating substrate 210 that supports the actuator AC. In this case, since the low refractive index layer 230 has a lower refractive index than the high refractive index layer 212, light Lb is refracted toward the direction of an adjacent sub-pixel SP at the boundary surface BF. Most of this refracted light Lr is absorbed by the second light-shielding layer 221.

In the second shape, the first light-shielding layer 213 is provided at the position corresponding to the bottom of the boundary surface BF. If there were no first light-shielding layer 213, light Lb incident at this bottom would not be refracted or would be slightly refracted and emitted from the display panel 202 through the color filter 222G. However, if the first light-shielding layer 213 is provided, such transmitted light is suppressed.

At least a part of the light Lb may be totally reflected at the boundary surface BF of the second shape. For example, by making the difference in refractive indices between the high refractive index layer 212 and the low refractive index layer 230 sufficiently large or by steepening the inclination of the area of the boundary surface BF of the second shape that is not covered by the first light-shielding layer 213, most of the light Lb may be incident on the boundary surface BF at an angle greater than a critical angle.

In the above example, FIG. 25 corresponds to a state in which the sub-pixel SPG is on (green display), and FIG. 26 corresponds to a state in which the sub-pixel SPG is off (black display). In other words, compared to a first transmittance of the sub-pixel SPG in the case where the boundary surface BF is in the first shape, a second transmittance of the sub-pixel SPG in the case where the boundary surface BF is in the second shape is smaller.

From the viewpoint of increasing the contrast of an image, it is preferable that the second transmittance is sufficiently smaller than the first transmittance. In other words, it is preferable that the second shape is a shape in which as much of the refracted light Lr as possible is directed to the second light-shielding layer 221 and absorbed by the second light-shielding layer 221. It is also preferable that the first light-shielding layer 213 has a size that sufficiently covers an area in the boundary surface BF of the second shape that may generate refracted light Lr that is not directed to the second light-shielding layer 221 and an area where light Lb may pass through the boundary surface BF without being refracted. However, from the viewpoint of increasing the area of the boundary surface BF to enhance the brightness of the image, the first light-shielding layer 213 may be made as small as possible.

Here, the curvature of the first shape is defined as a first curvature, and the curvature of the second shape is defined as a second curvature. In the present embodiment, the second curvature is larger than the first curvature. In a case where the first shape is a flat surface as shown in FIG. 25, the first curvature is zero. However, the first curvature does not necessarily have to be zero. That is, the first shape may be a more gently curved surface than the second shape.

The curvature of the first and second shapes may change depending on the position. In this case, the first curvature can be defined as the average or maximum value of the curvature at each position of the first shape. Similarly, the second curvature can be defined as the average or maximum value of the curvature at each position of the second shape.

The method of controlling the transmittance has been explained above using the sub-pixel SPG as an example, but the same method can be applied to the sub-pixels SPR and SPB. The gradation expression by pixel PX can be achieved by changing the boundary surface BF of sub-pixels SPR, SPG, and SPB between the first and second shapes, as well as by controlling the time to maintain the first (or second) shape. For example, if the time to keep the boundary surface BF of the sub-pixel SPG in the first shape is longer than the time to keep the boundary surface BF of each of the sub-pixels SPR and SPB in the first shape, colors with strong green components and weak red and blue components can be displayed.

The gradation expression can also be achieved by changing the curvature of the boundary surface BF in multiple steps. For example, if the boundary surface BF of the sub-pixel SPG is in the first shape, and the boundary surface BF of the sub-pixels SPR and SPB is in a shape with less curvature than the second shape and more curvature than the first shape, colors with strong green components and weak red and blue components can be displayed.

By controlling the transmittance of the sub-pixels SPR, SPG, and SPB in each pixel PX according to the image data, an image corresponding to the image data can be displayed in the display area DA. In the case where a diffusion layer DF is provided, the light transmitted through the sub-pixels SPR, SPG, and SPB is diffused, so that the viewing angle dependence of the image can be suppressed, and as a result, the display quality can be improved.

As another example, the shape of the boundary surface BF can be switched at high speed without using the diffusion layer DF. In other words, if the boundary surface BF of the sub-pixel SP to be turned on is switched between the first and second shapes multiple times in displaying an image of one frame, refracted light going in various directions will be generated. As a result, the viewing angle dependence of the image is suppressed as in the case of using a diffusion layer DF.

[Actuator AC]

As the actuator AC, various elements capable of deforming the boundary surface BF into the first and second shapes can be used. As an example, an actuator AC using a piezoelectric element (piezoelectric film) that deforms in response to the application of a voltage is assumed, and a specific structure of the sub-pixel SP is disclosed below.

Figure 27:
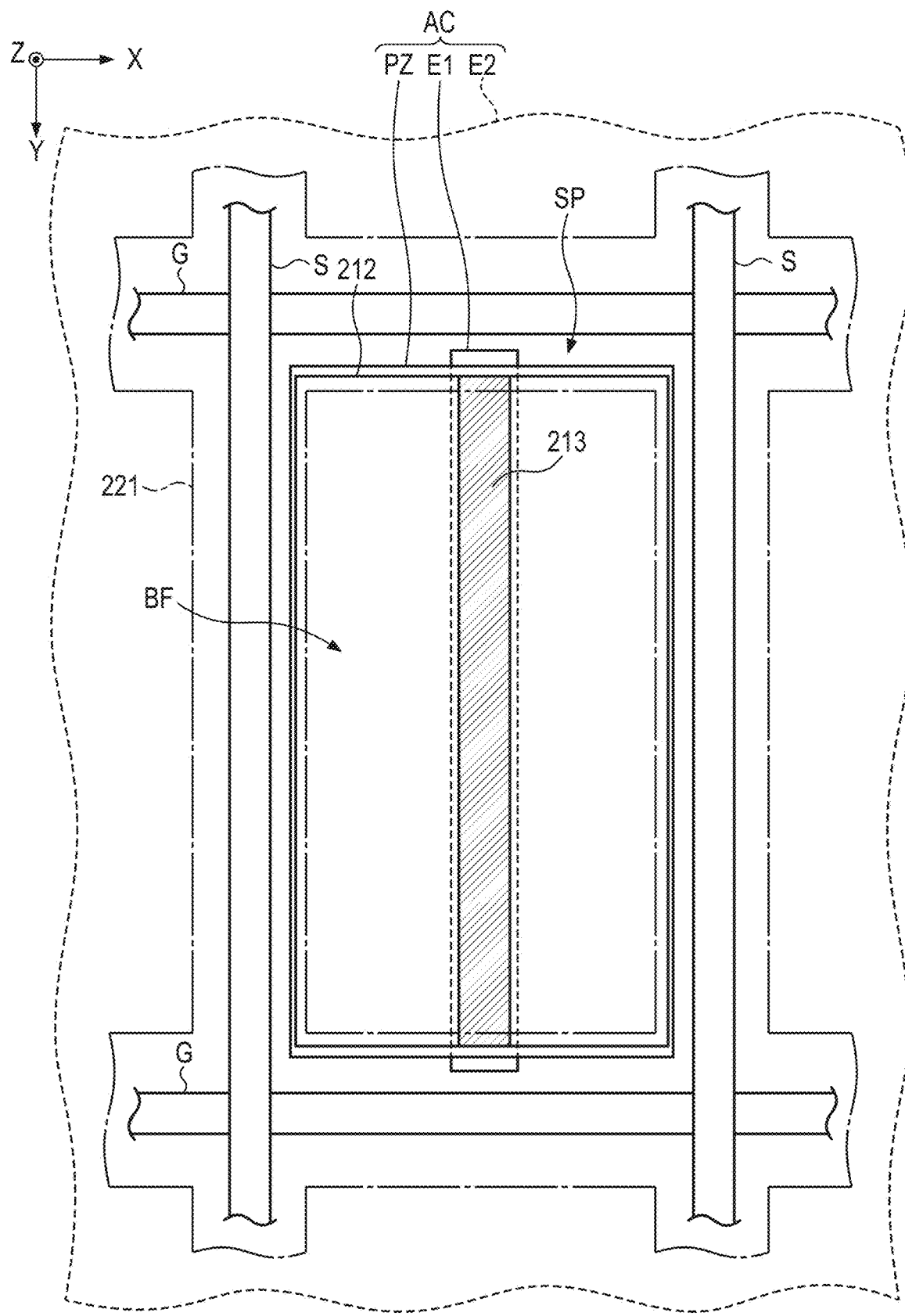
FIG. 27 is a plan view showing an example of a structure applicable to a sub-pixel in the 11th embodiment.

FIG. 27 is a plan view showing an example of a structure that can be applied to the sub-pixel SP. The second light-shielding layer 221 is superposed on the scanning line G and signal line S, and is open in the sub-pixel SP. The actuator AC, as in the example of FIG. 5, comprises a translucent piezoelectric element PZ, a first electrode E1 to which a voltage of a video signal supplied to the signal line S is applied via a switching element SW, and a second electrode E2 to which a common voltage is applied.

The shapes of the piezoelectric element PZ, the first electrode E1 and the second electrode E2 are the same as in the example of FIG. 5. The high refractive index layer 212 is superposed on the piezoelectric element PZ. In the same manner as the piezoelectric element PZ, the high refractive index layer 212 is separated from each scanning line G and each signal line S, but may be superposed on at least one of these.

The periphery of the piezoelectric element PZ and the high refractive index layer 212 is superposed on the second light-shielding layer 221. However, at least a part of the periphery of the piezoelectric element PZ and the high refractive index layer 212 may not be superposed on the second light-shielding layer 221. The first light-shielding layer 213 has a linear shape that is superposed on the first electrode E1 and extends longitudinally in a Y direction.

Figure 28:
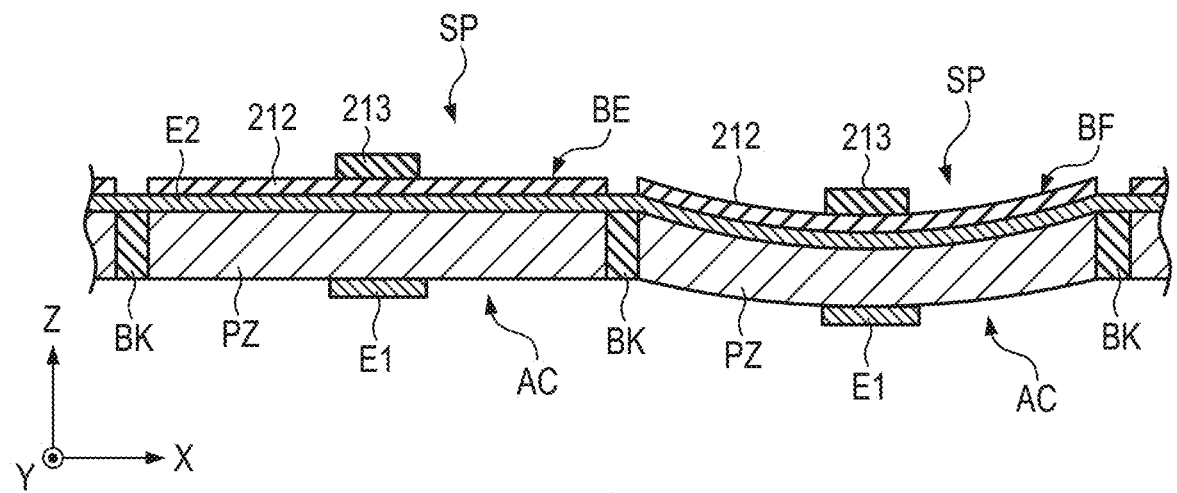
FIG. 28 is a schematic cross-sectional view of an actuator shown in FIG. 27.

FIG. 28 is a schematic cross-sectional view of the actuator AC along an X-Z plane. The first electrode E1 is in contact with the lower surface of the piezoelectric element PZ (a surface on the first insulating substrate 210 side). The second electrode E2 is in contact with the upper surface of the piezoelectric element PZ (a surface on the second substrate SUB22 side) and is continuously provided over a plurality of sub-pixels SP. The high refractive index layer 212 is in contact with the upper surface of the second electrode E2. The first light-shielding layer 213 is in contact with the boundary surface BF.

In the example of FIG. 28, a gap is provided between the piezoelectric elements PZ of adjacent sub-pixels SP. In this gap, a bank BK is disposed as in the example of FIG. 6. As an example, the bank BK is shaped to enclose the entire perimeter of the piezoelectric element PZ. In the example of FIG. 28, a gap is also provided between the high refractive index layers 212 of the adjacent sub-pixels SP. The high refractive index layers 212 of the adjacent sub-pixels SP may be in contact with each other as shown in FIGS. 25 and 26. Similarly, the piezoelectric elements PZ of the adjacent sub-pixels SP may be in contact with each other.

In the sub-pixel SP shown on the left side in FIG. 28, no potential difference is formed between the first and second electrodes E1 and E2. In this case, the piezoelectric element PZ is flat and the boundary surface BF is in the first shape shown in FIG. 25.

On the other hand, in the sub-pixel SP shown on the right side of FIG. 28, a potential difference is formed between the first and second electrodes E1 and E2. In this case, the piezoelectric element PZ is curved, and, accordingly, the boundary surface BF becomes the second shape shown in FIG. 26.

As another example, the piezoelectric PZ may be curved when no potential difference is formed between the first and second electrodes E1 and E2, and the piezoelectric PZ may be flat when the said potential difference is formed.

In the example of FIG. 28, a gap is provided between adjacent high refractive index layers 212, so that the force associated with the deformation of one high refractive index layer 212 is not easily transferred to the adjacent high refractive index layer 212. As a result, the interaction of actuators AC in adjacent sub-pixels SP can be suppressed, thereby allowing the display quality to be improved. Furthermore, it is possible to suppress the destruction of the high refractive index layer 212, etc., caused by the operation of the actuator AC at the boundary of sub-pixels SP.

Figure 29:
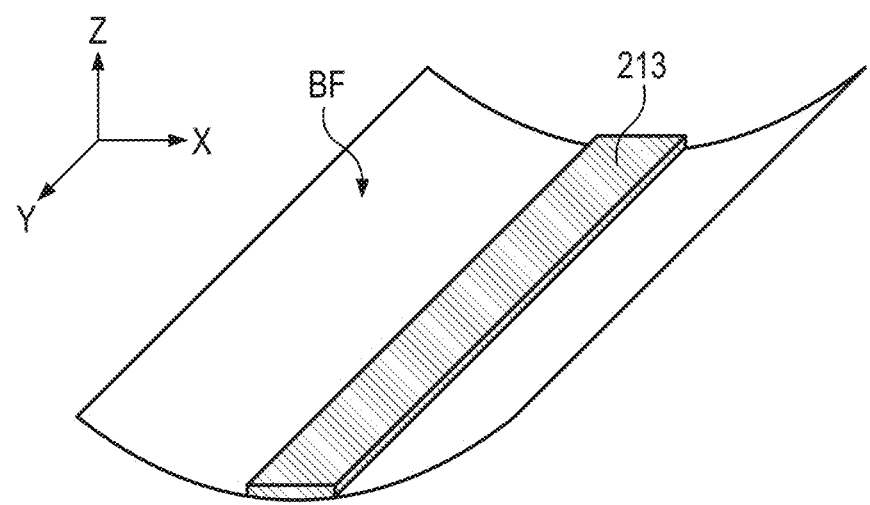
FIG. 29 is a schematic perspective view showing an example of a boundary surface of a second shape in the 11th embodiment.

FIG. 29 is a schematic perspective view showing an example of the boundary surface BF in the second shape. In the case where the first electrode E1 is provided as in the example of FIG. 27, the piezoelectric element PZ is deformed into a shape that extends uniformly in the Y direction in, for example, the cross-sectional shape shown in FIG. 28. Therefore, as shown in FIG. 29, the boundary surface BF also deforms into a similar shape (second shape) along with the piezoelectric element PZ. The first light-shielding layer 213 continuously covers the bottom of the boundary surface BF of the second shape in the Y direction.

For example, the boundary surface BF in the second shape shown in FIG. 29 can be regarded as a shape corresponding to a part of a cylindrical surface. However, in the boundary surface BF of the second shape, the curvature of the cross-sectional shape along the X-Z plane may differ depending on the position in the Y direction.

As explained above, in the display device 200 according to the present embodiment, each of the plurality of sub-pixels SP is provided with a boundary surface BF and an actuator AC that deforms the boundary surface BF. By controlling the transmittance of the sub-pixels SP with the shape of the boundary surface BF, an image is displayed in the display area DA. With this display principle, there is no need to dispose polarizers on both sides of the display panel 202 as in, for example, conventional transmissive liquid crystal display devices. Therefore, light from the backlight BL can be efficiently utilized to obtain an image with high luminance. Alternatively, due to high light-utilization efficiency, power consumption of the backlight BL can be reduced.

In addition, an actuator AC using a piezoelectric element PZ can switch the shape of the boundary surface BF at high speed. Therefore, it is possible to obtain an image with a superior response speed than, for example, a liquid crystal display device or a display device using an electrophoresis element.

On the boundary surface BF of the second shape, the first light-shielding layer 213 is disposed at the bottom part. Since this first light-shielding layer 213 can shade the area where light from the backlight BL cannot be refracted toward the second light-shielding layer 221, the luminance (transmittance) of the sub-pixel SP whose boundary surface BF is in the second shape can be made sufficiently low. As a result, the contrast of the image is improved.

The configuration of the display device 200 is not limited to the examples described in FIGS. 24 to 29. Other embodiments that can be applied to the display device 200 will be disclosed below. In each embodiment, differences from the 11th embodiment are mainly explained. For configurations not specifically mentioned in each embodiment, the configurations disclosed in the 11th embodiment or other embodiments can be applied.

12th Embodiment

Figure 30:
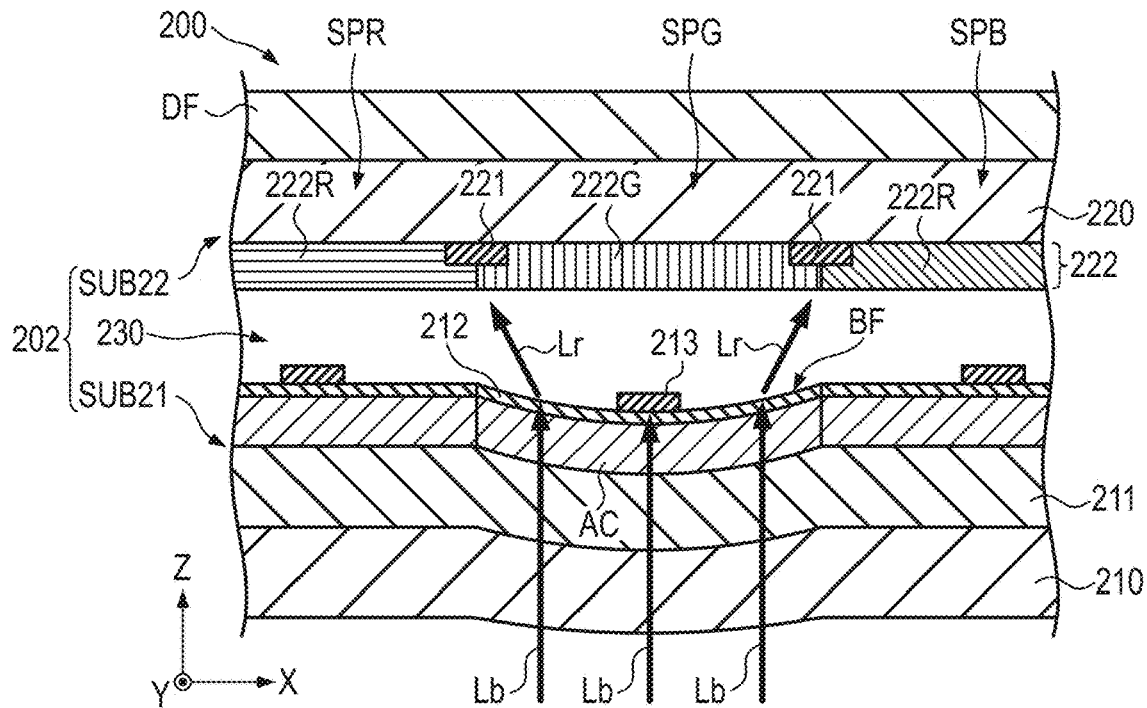
FIG. 30 is a schematic cross-sectional view of a display device according to a 12th embodiment.

FIG. 30 is a schematic cross-sectional view of a display device 200 according to a 12th embodiment, showing a state in which a boundary surface BF is deformed into a second shape as in FIG. 26. The display device 200 shown in FIG. 30 differs from the 11th embodiment in that a first insulating substrate 210 and a second insulating substrate 220 are flexible. For example, a resin material such as polyimide can be used as a material for the first insulating substrate 210 and the second insulating substrate 220.

In the example of FIG. 30, a circuit layer 211 and a first insulating substrate 210 are also slightly deformed along with the deformation of an actuator AC. However, the deformation of the actuator AC does not have to cause deformation of the circuit layer 211 and the first insulating substrate 210.

With the configuration of the present embodiment, a flexible display panel 202 and display device 200 that can be bent into any shape can be realized. Furthermore, in the case where the deformation of the actuator AC causes the first insulating substrate 210 to deform as in the example of FIG. 30, the actuator AC can be easily deformed. Accordingly, it is possible to increase the amount of deformation of the boundary surface BF and increase the curvature of the second shape.

13th Embodiment

Figure 31:
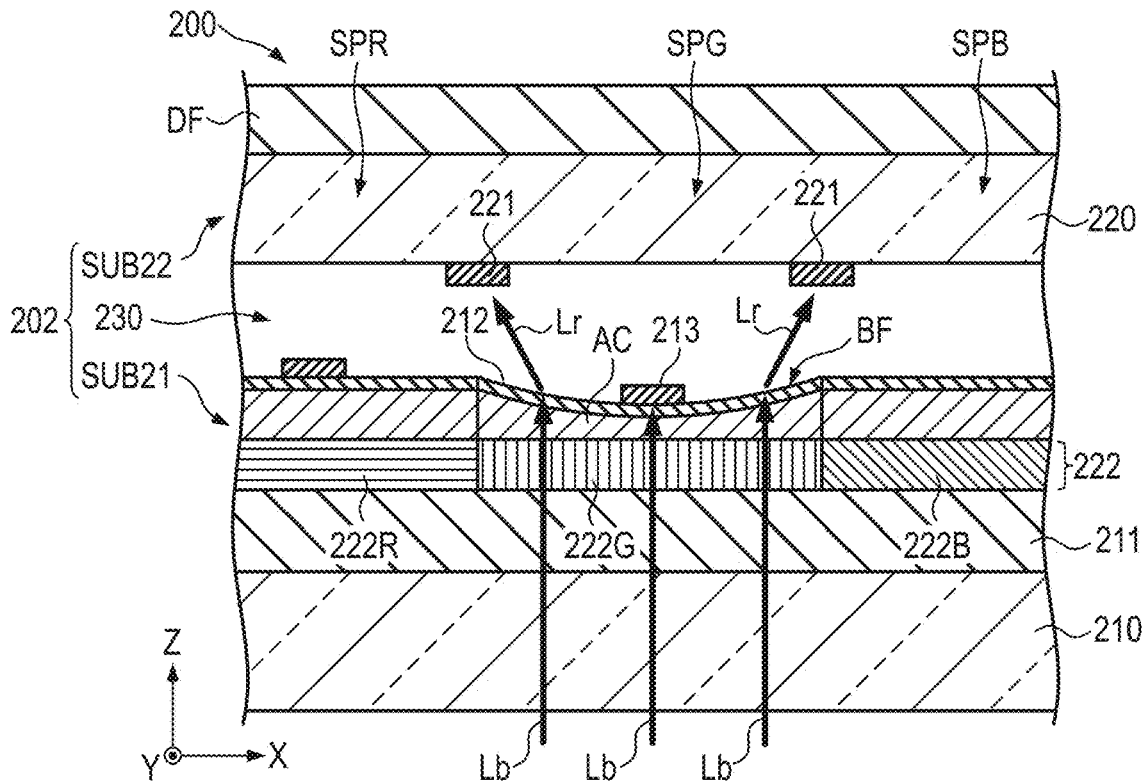
FIG. 31 is a schematic cross-sectional view of a display device according to a 13th embodiment.

FIG. 31 is a schematic cross-sectional view of a display device 200 according to a 13th embodiment, showing a state in which a boundary surface BF is deformed into a second shape as in FIG. 26. The display device 200 shown in FIG. 31 differs from the 11th embodiment in that a color filter layer 222 is disposed on a first substrate SUB21.

In the example of FIG. 31, the color filter layer 222 is interposed between a circuit layer 211 and an actuator AC. Even with this configuration, a color display similar to that of the 11th embodiment is possible. In addition, since the boundary surface BF, the actuator AC, and the color filter layer 222 are provided on the first substrate SUB21, the misalignment of these elements is suppressed, and the display quality can be further improved.

14th Embodiment

Figure 32:
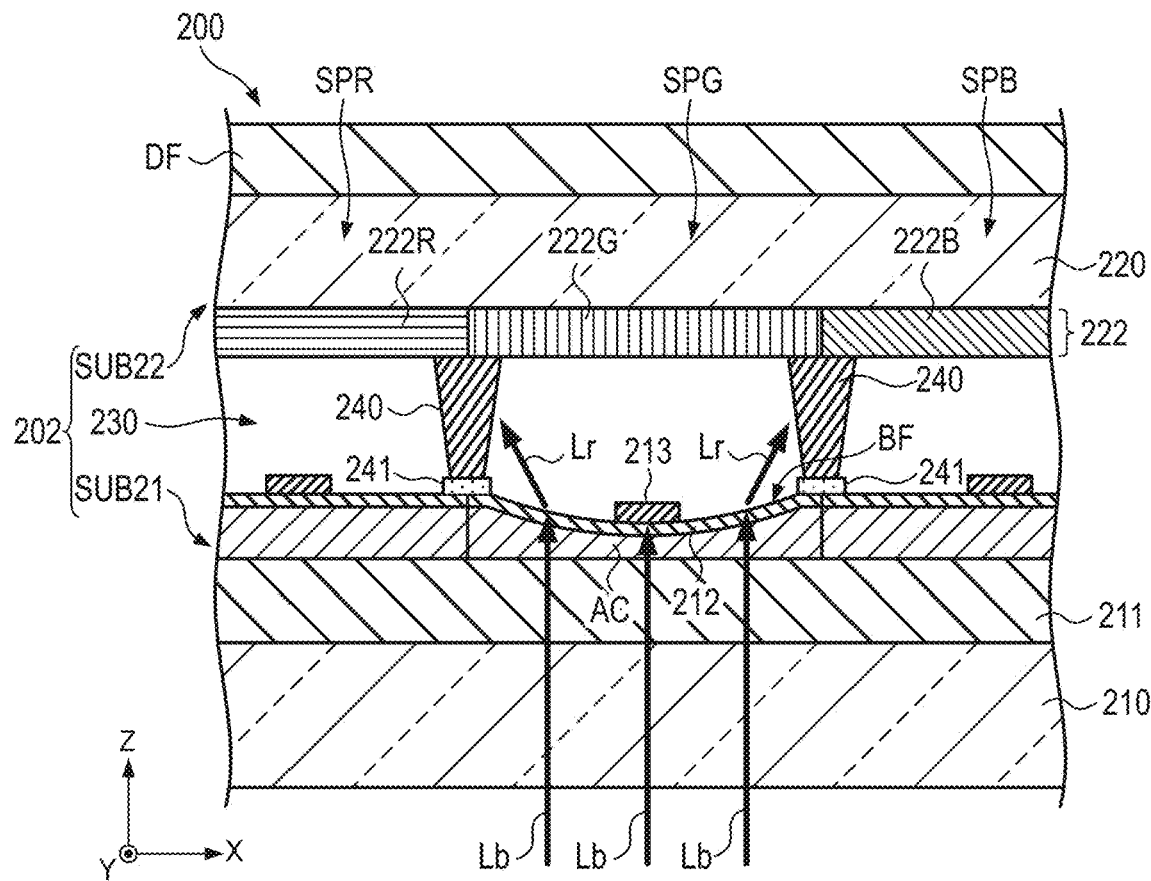
FIG. 32 is a schematic cross-sectional view of a display device according to a 14th embodiment.

FIG. 32 is a schematic cross-sectional view of a display device 200 according to a 14th embodiment, showing a boundary surface BF deformed into a second shape as in FIG. 26. The display device 200 shown in FIG. 32 differs from the 11th embodiment in that a light-shielding spacer 240 is disposed at the boundary of adjacent sub-pixels SP.

The spacer 240 extends from a second substrate SUB22 to a first substrate SUB21, for example, in a low refractive index layer 230 between the first substrate SUB21 and the second substrate SUB22. As another example, the spacer 240 may extend from the first substrate SUB21 toward the second substrate SUB22.

In the example of FIG. 32, the distal end of the spacer 240 is bonded to a high refractive index layer 212 by an adhesive layer 241. However, the distal end of the spacer 240 may be in contact with the first substrate SUB21 without the adhesive layer 241. Alternatively, there may be a gap between the distal end of the spacer 240 and the first substrate SUB21.

The spacer 240 absorbs a refracted light Lr by the boundary surface BF of the second shape instead of the second light-shielding layer 221 shown in FIG. 26. Although a second light-shielding layer 221 is omitted in the example of FIG. 32, the display device 200 may comprise the second light-shielding layer 221 together with the spacer 240.

Figure 33:
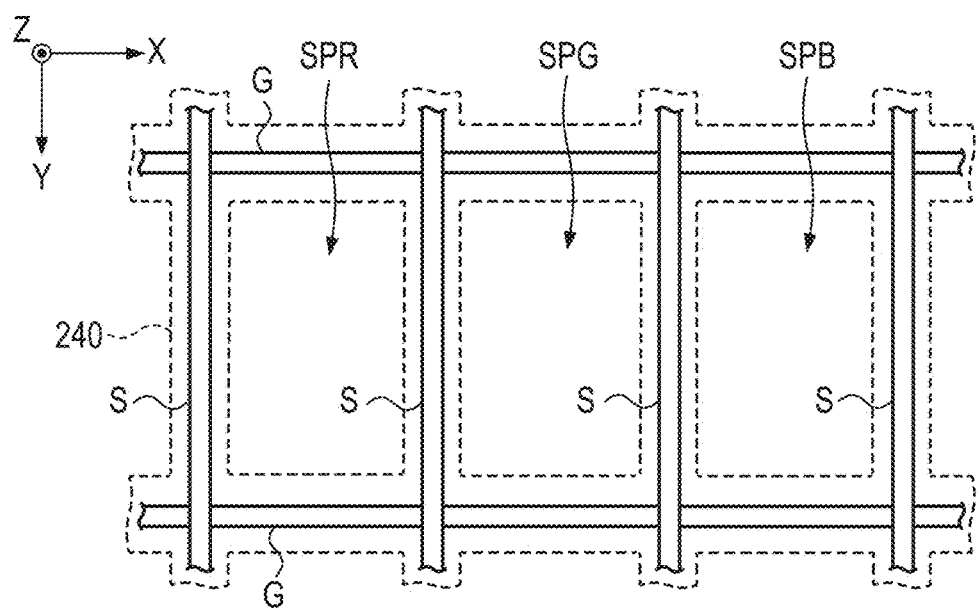
FIG. 33 is a schematic plan view showing an example of a shape of a spacer shown in FIG. 32.

FIG. 33 is a schematic plan view showing an example of the shape of the spacer 240. As shown in this drawing, the spacer 240 may be a grid shape superposed on a scanning line G and a signal line S. As another example, the spacer 240 may extend in a straight line in a Y direction superposed on the signal line S.

Even when refracted light Lr is absorbed by the spacer 240 as in the present embodiment, the same display principle as in the 11th embodiment can be realized. Furthermore, since most of the refracted light Lr from one sub-pixel SP to an adjacent sub-pixel SP is blocked by the spacer 240, the display quality can be improved.

Also, in the structure of FIG. 32, the boundary surface BF is held by the spacer 240. In this case, the deformation of the boundary surface BF and actuator AC in one sub-pixel SP is less likely to affect the boundary surface BF and actuator AC in other sub-pixels SP. If the spacers are lattice-shaped, as in the example of FIG. 33, such an effect is enhanced.

15th Embodiment

Figure 34:
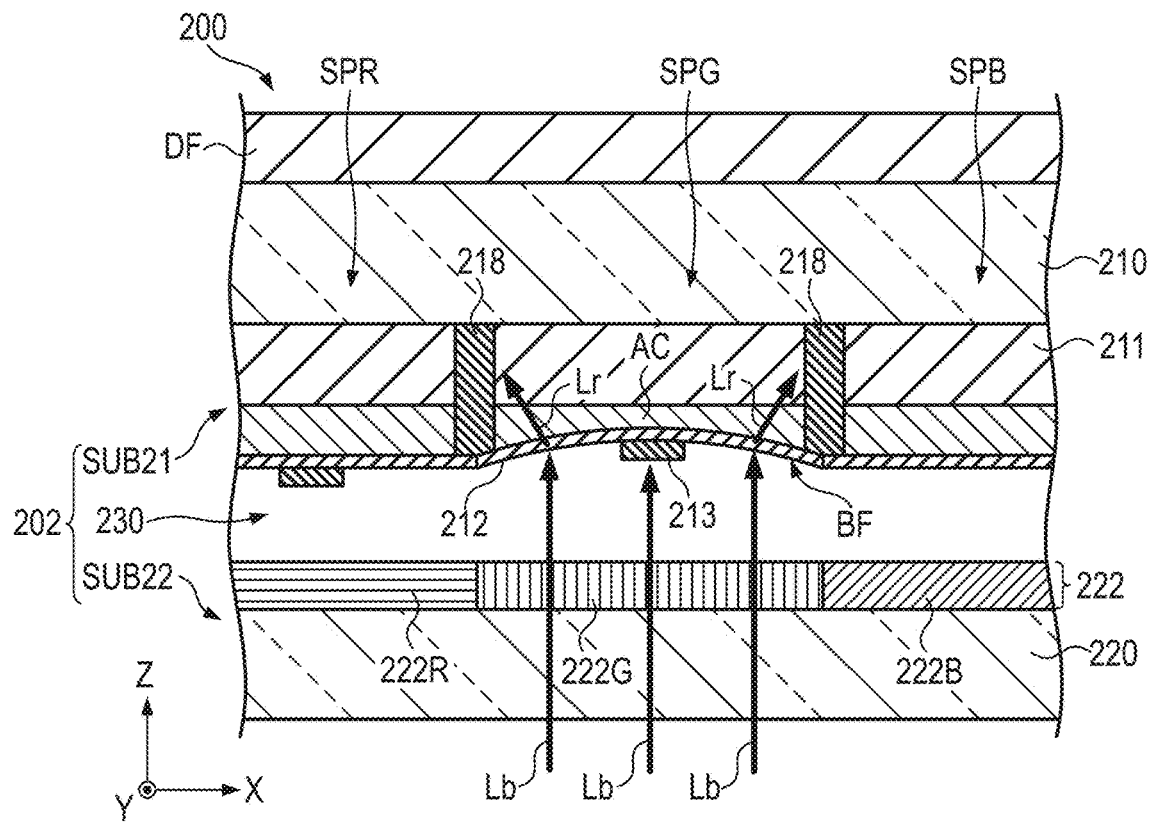
FIG. 34 is a schematic cross-sectional view of a display device according to a 15th embodiment.

FIG. 34 is a schematic cross-sectional view of a display device 200 according to a 15th embodiment, showing a state in which a boundary surface BF is deformed into a second shape as in FIG. 26. The display device 200 shown in FIG. 34 differs from the 11th embodiment in that the positions of a first substrate SUB21 and a second substrate SUB22 are swapped.

In the present embodiment, light Lb from a backlight BL is incident on the second substrate SUB22 and passes through a color filter layer 222 before reaching the boundary surface BF. In the illustrated example, the first substrate SUB21 is provided with a second light-shielding layer 218. The second light-shielding layer 218 is superposed on a boundary of adjacent sub-pixels SP. For example, in a plan view, the second light-shielding layer 218 is a lattice shape superposed on a scanning line G and a signal line S, as in the second light-shielding layer 221 shown in FIG. 27. In the example of FIG. 34, the second light-shielding layer 218 is provided from a first insulating substrate 210 to a high refractive index layer 212.

At the boundary surface BF of the second shape, light Lb is refracted in a direction of an adjacent sub-pixel SP. Much of this refracted light Lr is absorbed by the second light-shielding layer 218. Therefore, even with the configuration of the present embodiment, the same display principle as that of the 11th embodiment can be realized. Also, in the present embodiment, since the boundary surface BF, an actuator AC, and the second light-shielding layer 218 are provided on the first substrate SUB21, the misalignment of these elements is suppressed, and the display quality can be further improved.

16th Embodiment

From the viewpoint of preventing color mixing of adjacent sub-pixels SP and suitably controlling the refraction of light by a boundary surface BF of a second shape, it is preferable that the light incident on the boundary surface BF is parallel to a Z direction. Such light may be realized, for example, by the structure of a backlight BL, or by the structure of a display panel 202. In the present embodiment, a configuration in which light substantially parallel to the Z direction is generated by the structure of the display panel 202 is exemplified.

Figure 35:
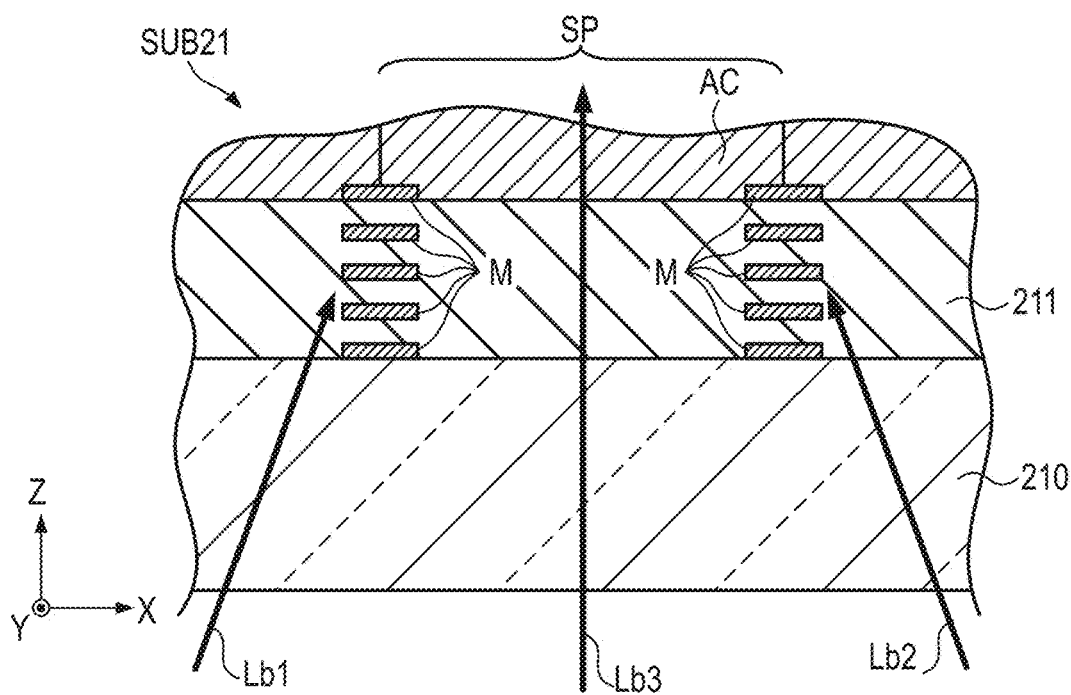
FIG. 35 is a schematic cross-sectional view of a display device according to a 16th embodiment.

FIG. 35 is a schematic cross-sectional view of a display device 200 according to a 16th embodiment, in which a part of a first substrate SUB21 is shown enlarged. In the example of FIG. 35, a plurality of metal layers M are stacked at the boundaries of sub-pixels SP. These metal layers M are interposed between a first insulating substrate 210 and an actuator AC. The metal layers M may also be disposed, for example, on a bottom surface of the first insulating substrate 210.

The plurality of metal layers M may include, for example, scanning lines G and signal lines S, or a line disposed on the same layer as the scanning lines G and signal lines S. In addition, insulating layers 114 to 117 shown in FIG. 3 or other insulating layers may be interposed between adjacent metal layers M in the Z direction.

A part of the light emitted from the backlight BL and traveling in a direction inclined to the Z direction, such as light Lb1 and Lb2 in FIG. 35, is blocked by one of the plural metal layers M. On the other hand, light that is parallel to the Z direction or light with a small inclination relative to the Z direction, such as light Lb3 in FIG. 35, is incident on the actuator AC and the boundary surface BF above it without being blocked by the metal layer M. Thus, with the configuration of the present embodiment, light that is substantially parallel to the Z direction can be generated by blocking light that is tilted with respect to the Z direction.

If light tilted with respect to the Z direction is incident on the boundary surface BF of the second shape, its tilt may be increased by refraction at the boundary surface BF and pass through the color filter of an adjacent sub-pixel SP. In this case, color mixing of sub-pixels SP of different colors may occur. Also, depending on the angle of the light incident on the boundary surface BF, even if the boundary surface BF is in the second shape, the light refracted at the boundary surface BF may pass through the color filter of the sub-pixel SP having the boundary surface BF. In this case, luminance may not decrease sufficiently in the sub-pixel SP that should be turned off, and the contrast of an image may decrease. The configuration of the present embodiment is capable of suppressing these problems.

17th Embodiment

Figure 36:
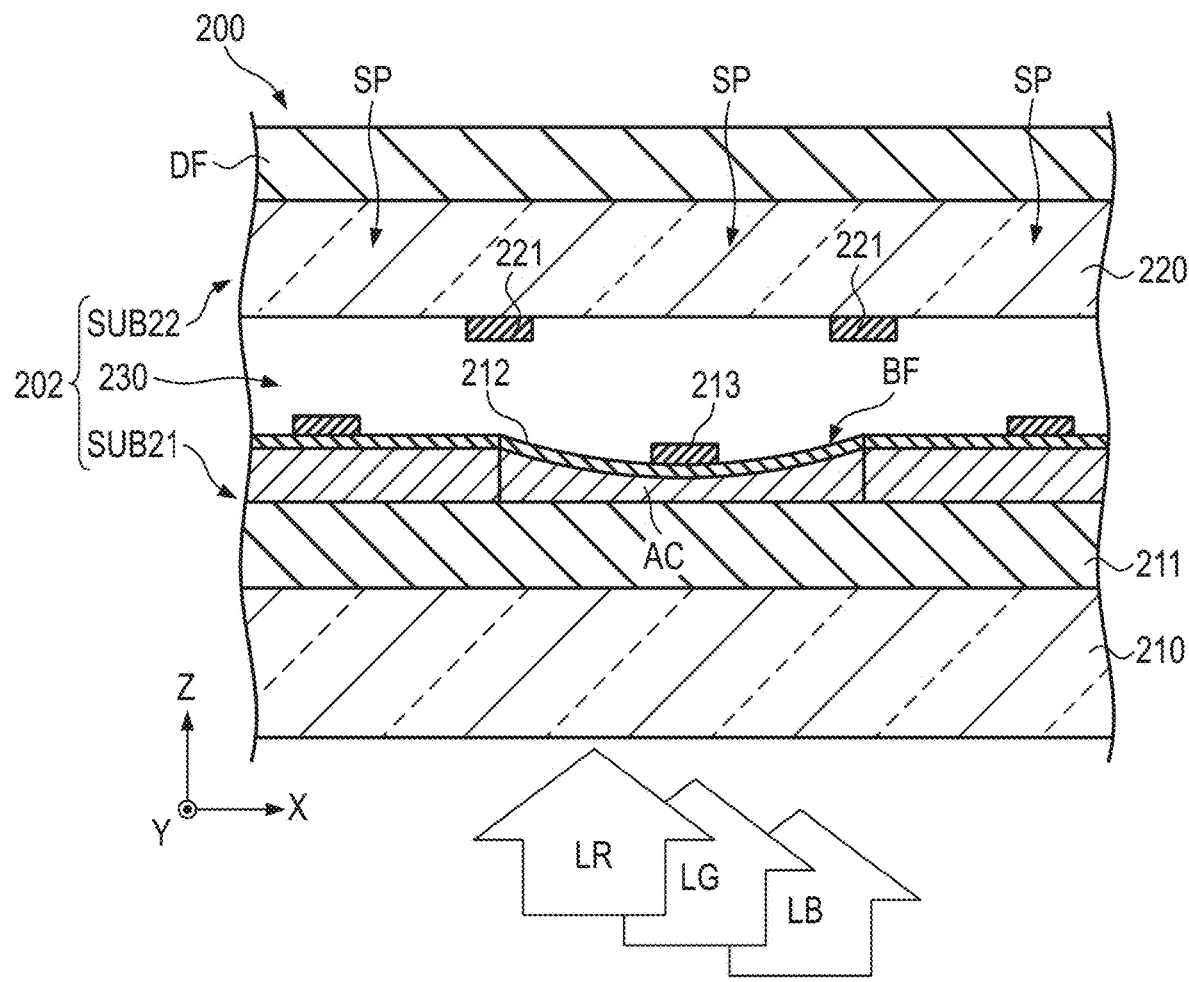
FIG. 36 is a schematic cross-sectional view of a display device according to a 17th embodiment.

FIG. 36 is a schematic cross-sectional view of a display device 200 according to a 17th embodiment, showing a state in which a boundary surface BF is deformed into a second shape as in FIG. 26. The display device 200 shown in FIG. 36 differs from the 11th embodiment in that it is not provided with a color filter layer 222.

Even with such a configuration, color display is possible by driving the display device 200 in, for example, a field sequential system. In this system, one frame period includes a plurality of subframe periods (fields). The plurality of light sources LS shown in FIG. 24 include a light emitting element that emits red light LR, a light emitting element that emits green light LG, and a light emitting element that emits blue light LB.

One frame period in an image display includes red, green, and blue subframe periods. In the red subframe period, the red light emitting element is turned on, and a video signal corresponding to red image data is supplied to an actuator AC of each sub-pixel SP. As a result, each sub-pixel SP is irradiated with red light LR, and a red image is displayed in a display area DA.

In the green subframe period, the green light emitting element is turned on, and a video signal corresponding to green image data is supplied to the actuator AC of each sub-pixel SP. As a result, each sub-pixel SP is irradiated with green light LG, and a green image is displayed in the display area DA.

In the blue subframe period, the blue light emitting element is turned on, and a video signal corresponding to blue image data is supplied to the actuator AC of each sub-pixel SP. As a result, each sub-pixel SP is irradiated with blue light LB, and a blue image is displayed in the display area DA.

The red, green, and blue images displayed in a time-division manner as above are combined with each other to be visually recognized by an observer as a multi-color display image. As described above, the display device 200 using the actuator AC has a superior response speed. Therefore, in the case of displaying images of each color in a time-division manner as in the present embodiment, it is possible to shorten the cycle of the subframe period to improve the display quality of the images.

18th Embodiment

A second shape of a boundary surface BF is not limited to that shown in FIG. 29. In the present embodiment, other examples of the second shape are disclosed.

Figure 37:
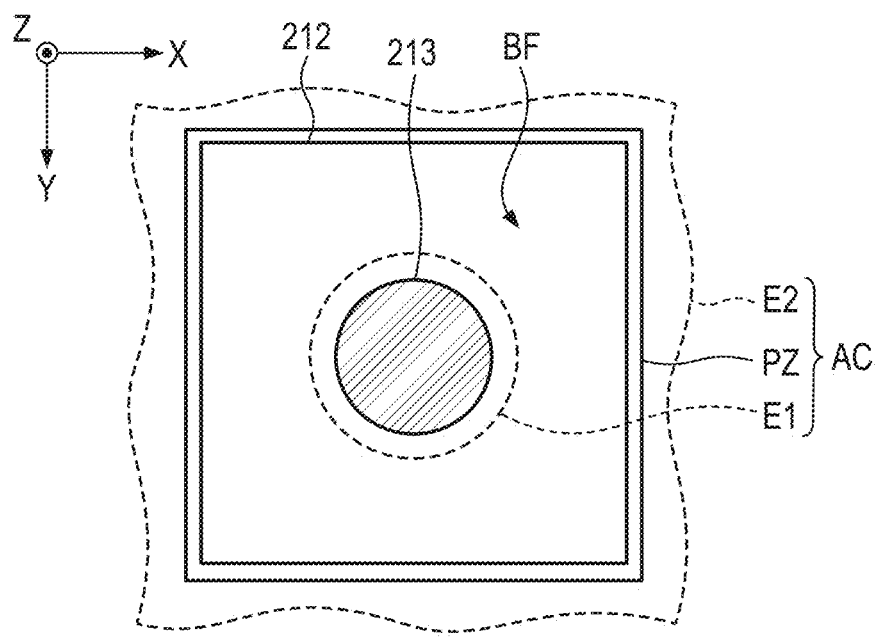
FIG. 37 is a schematic plan view of an actuator in an 18th embodiment.

FIG. 37 is a schematic plan view of an actuator AC in an 18th embodiment. As in the 11th embodiment, this actuator AC comprises a piezoelectric element PZ, a first electrode E1, and a second electrode E2. The first electrode E1, the piezoelectric element PZ, and the second electrode E2 are stacked in this order in a Z direction. A high refractive index layer 212 having the boundary surface BF is disposed on top of the second electrode E2, and a first light-shielding layer 213 is further disposed on top of the high refractive index layer 212.

In the present embodiment, the first electrode E1 is a regular circle superposed near the center of the piezoelectric element PZ. Similarly, the first light-shielding layer 213 is a regular circle superposed on the first electrode E1. Note that the first electrode E1 and the first light-shielding layer 213 may be other shapes such as oval or polygonal.

Figure 38:
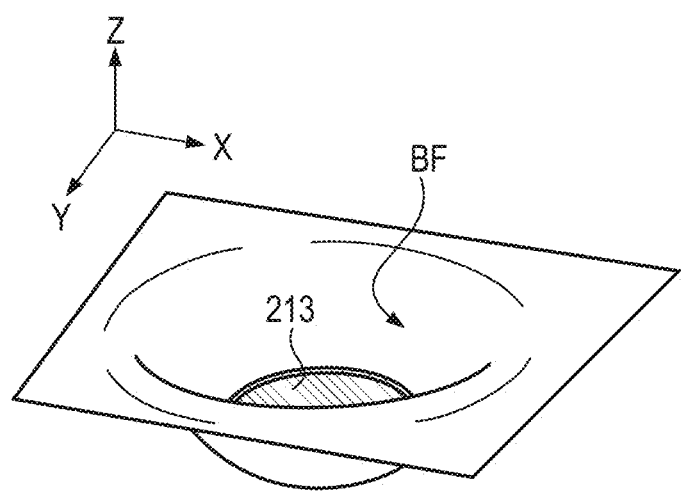
FIG. 38 is a schematic perspective view showing an example of a boundary surface of a second shape in the 18th embodiment.

FIG. 38 is a schematic perspective view showing an example of the boundary surface BF of the second shape in the present embodiment. In the present embodiment, when a potential difference is formed between the first and second electrodes E1 and E2, the boundary surface BF deforms into a concave curved surface that descends toward the vicinity of the center. The first light-shielding layer 213 covers the bottom of such a boundary surface BF of the second shape.

Most of the light from a backlight BL incident on the boundary surface BF of the second shape is refracted by the descending inclined surface. The light refracted in this manner heads in the direction of an adjacent sub-pixel SP and is absorbed by a second light-shielding layer 221 or a spacer 240 described above. A first shape of the boundary surface BF when no potential difference is formed between the first and second electrodes E1 and E2 is, for example, a flat surface, or may be a curved surface that is more gently curved than the second shape.

Even with the configuration of the present embodiment, the same display principle as that of the first embodiment can be realized.

19th Embodiment

The configuration of an actuator AC is not limited to using a piezoelectric element PZ. In the present embodiment, other examples of the actuator AC are disclosed.

Figure 39:
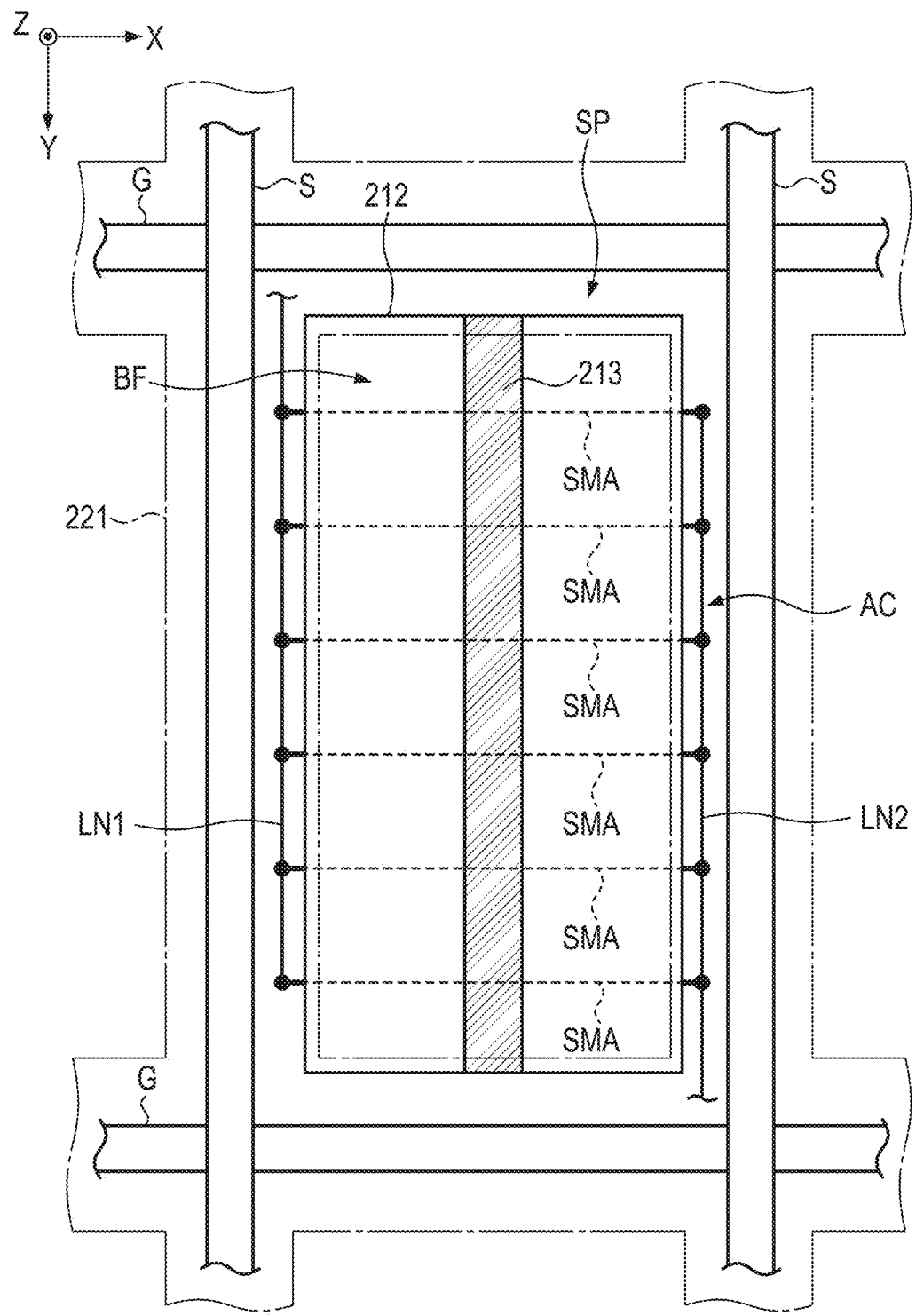
FIG. 39 is a plan view showing an example of a configuration applicable to a sub-pixel in a 19th embodiment.

FIG. 39 is a plan view showing an example of a configuration that can be applied to a sub-pixel SP in the present embodiment. The shapes of a scanning line G, a signal line S, a high refractive index layer 212, a first light-shielding layer 213, and a second light-shielding layer 221 are the same as those in the example in FIG. 27. In the present embodiment, the actuator AC has a plurality of shape memory alloys SMA, a first line LN1, and a second line LN2, as in the example of FIG. 20. The high refractive index layer 212 is superposed on the plurality of shape memory alloys SMA. The first light-shielding layer 213 intersects the plurality of shape memory alloys SMA.

Figure 40:
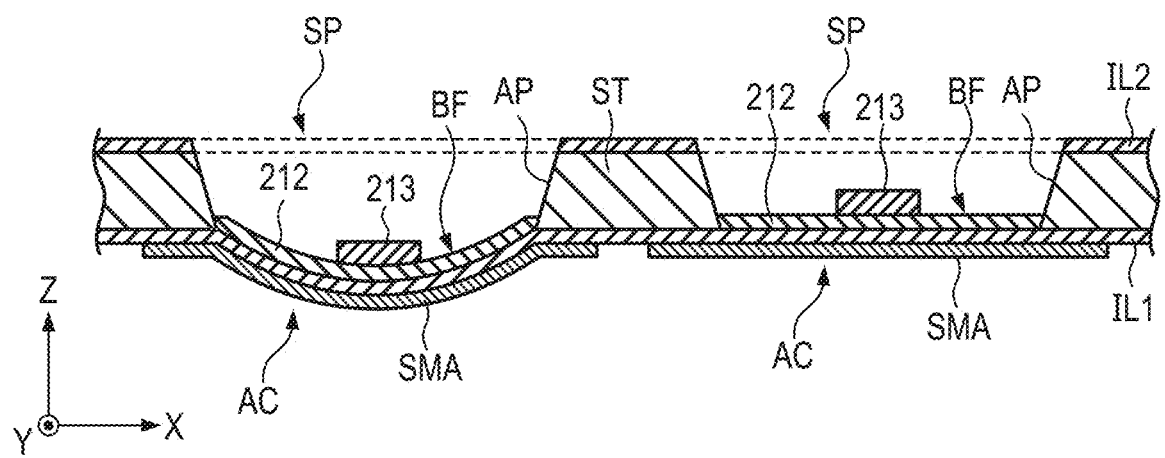
FIG. 40 is a schematic cross-sectional view of an actuator in the 19th embodiment.

FIG. 40 is a schematic cross-sectional view of the actuator AC along an X-Z plane. Similar to the example in FIG. 21, the actuator AC comprises a support substrate ST, a first insulating layer IL1, and a second insulating layer IL2. In FIG. 40, the first insulating layer IL1 covers the lower surface of the support substrate ST, and the second insulating layer IL2 covers the upper surface of the support substrate ST. The shape memory alloy SMA is disposed under the first insulating layer IL1.

The high refractive index layer 212 covers the first insulating layer IL1 inside an opening AP of the support substrate ST. The first light-shielding layer 213 is disposed on top of the high refractive index layer 212. The planar shape of the opening AP is, for example, a rectangular shape similar to the planar shape of the high refractive index layer 212, but is not limited thereto. Each shape memory alloy SMA intersects the opening AP.

For example, when the actuator AC is at a low temperature, about room temperature, the shape memory alloy SMA is concavely depressed as in the manner of a sub-pixel SP shown to the left in FIG. 40. Accordingly, a boundary surface BF also becomes a concave curved surface (i.e., a second shape).

When an electric current is supplied to the shape memory alloy SMA through a switching element SW and the first line LN1, the shape memory alloy SMA is heated up by Joule heat. At this time, the shape memory alloy SMA recovers its shape and becomes flat, as in the manner of a sub-pixel SP shown to the right in FIG. 40. Accordingly, the boundary surface BF also becomes flat or more gently curved than the second shape (i.e., a first shape).

When the shape memory alloy SMA is at a low temperature again, the shape memory alloy SMA deforms concavely due to the bias force caused by the difference in thermal expansion coefficients of the shape memory alloy SMA, the first insulating layer IL1, and the support substrate ST.

Even with the configuration of the present embodiment, a boundary surface BF of the second shape curved in the same manner as that in FIG. 29 can be obtained. For example, the shape memory alloy SMA may be made in the form of a film covering the opening AP instead of a line, to realize a boundary surface BF that descends toward the vicinity of the center as in FIG. 38.

20th Embodiment

In the present embodiment, as yet another example of an actuator AC, an electrostatic actuator is disclosed.

Figure 41:
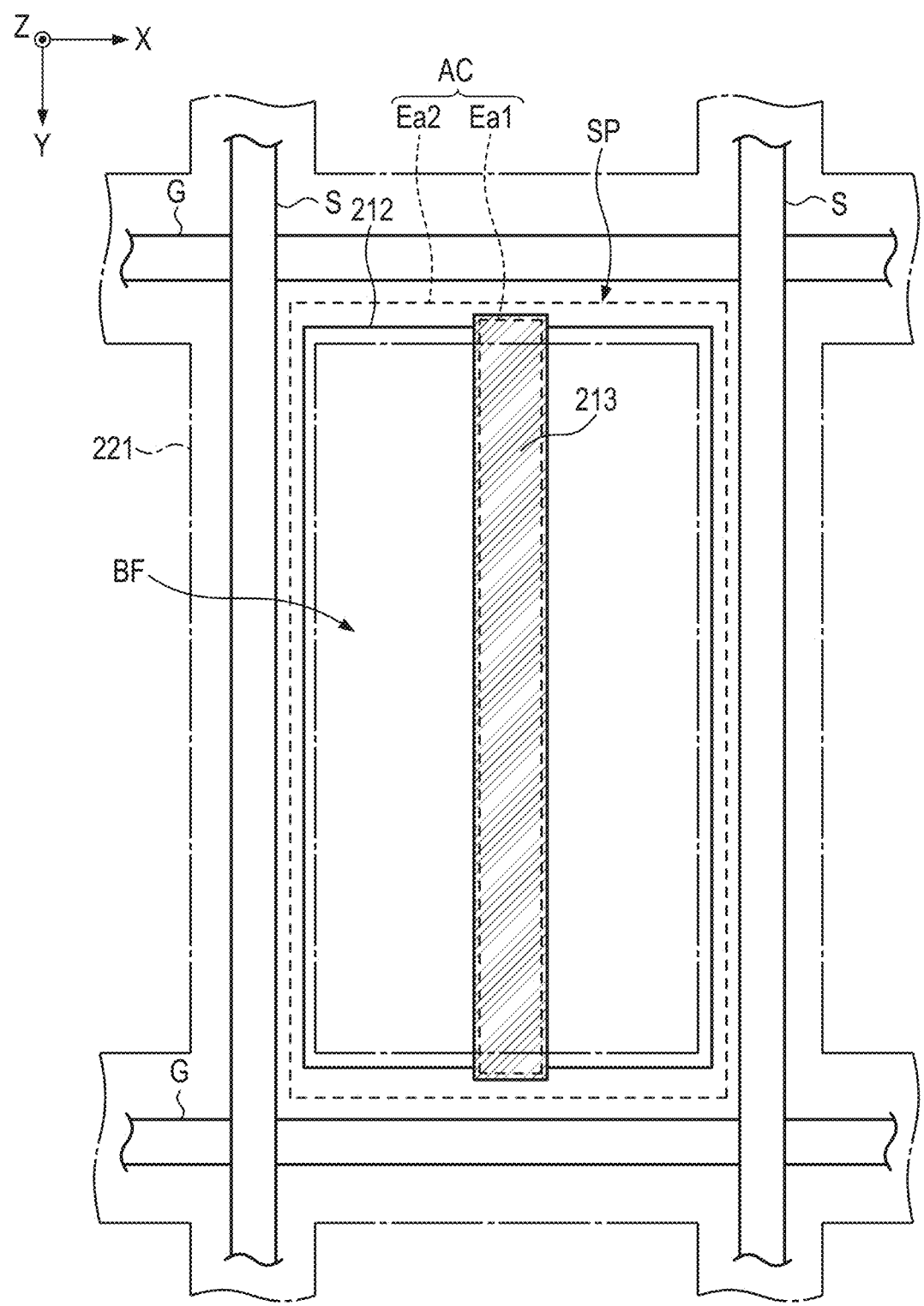
FIG. 41 is a plan view showing an example of a configuration applicable to a sub-pixel in a 20th embodiment.

FIG. 41 is a plan view showing an example of a configuration that can be applied to a sub-pixel SP in the present embodiment. The shapes of a scanning line G, a signal line S, a high refractive index layer 212, a first light-shielding layer 213, and a second light-shielding layer 221 are the same as those in the example in FIG. 27. In the present embodiment, the actuator AC comprises a first electrode Ea1 and a second electrode Ea2. The shapes of these electrodes Ea1 and Ea2 are the same as those in the example in FIG. 22.

Figure 42:
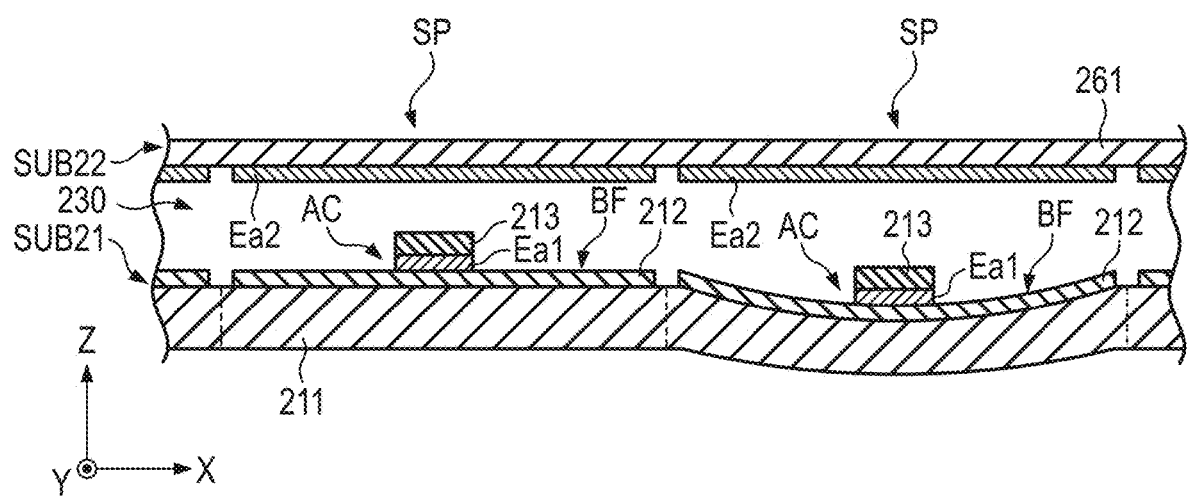
FIG. 42 is a schematic cross-sectional view of an actuator in the 20th embodiment.

FIG. 42 is a schematic cross-sectional view of the actuator AC along an X-Z plane. The first electrode Ea1 is disposed on a first substrate SUB21. The second electrode Ea2 is disposed on a second substrate SUB22. The first electrode Ea1 and the second electrode Ea2 are facing each other through a low refractive index layer 230.

In the example of FIG. 42, the high refractive index layer 212 is disposed on top of a circuit layer 211. An insulating layer may be interposed between the high refractive index layer 212 and the circuit layer 211. The first electrode Ea1 is disposed on top of the high refractive index layer 212. In the example of FIG. 42, a gap is provided between the high refractive index layers 212 of adjacent sub-pixels SP. As another example, the high refractive index layers 212 of adjacent sub-pixels SP may be continuous.

The second substrate SUB22 is further provided with an insulating layer 261. The insulating layer 261 is disposed, for example, under the color filter layer 222 described above. The second electrode Ea2 is disposed on the lower surface of the insulating layer 261. In the example of FIG. 42, the second electrode Ea2 is in contact with the low refractive index layer 230; however, the second electrode Ea2 may also be covered by another insulating layer.

The first electrode Ea1 is electrically connected to the relay electrode RE shown in FIG. 3. Therefore, to the first electrode Ea1, a voltage of a video signal supplied to the signal line S is applied via a switching element SW. To the second electrode Ea2 of each sub-pixel SP, the same voltage as the corresponding first electrode Ea1 is applied. The second substrate SUB22 may include a plurality of signal lines, a plurality of scanning lines, and a plurality of switching elements for controlling the voltage applied to the second electrode Ea2. For these signal lines, scanning lines, and switching elements, the same configuration as that of the signal lines S, scanning lines G, and switching elements SW shown in FIG. 24, etc., can be applied.

In the sub-pixel SP shown on the left side in FIG. 42, no potential difference is formed between the first electrode Ea1 and the second electrode Ea2. For example, the voltages of the first and second electrodes Ea1 and Ea2 are both 0 V. In this case, the high refractive index layer 212 is flat, and the boundary surface BF is also a flat first shape.

On the other hand, in the sub-pixel SP shown on the right side in FIG. 42, a strong voltage of, for example, 10 V is applied to both the first and second electrodes Ea1 and Ea2. This causes an electrostatic repulsion between the first and second electrodes Ea1 and Ea2, and the first electrode Ea1 is pulled away from the second electrode Ea2. As a result, the high refractive index layer 212 is curved, and the boundary surface BF becomes a concave second shape accordingly.

Even in the configuration of the present embodiment, a boundary surface BF of the second shape curved in the same manner as in FIG. 29 can be obtained. For example, by making the first electrode Ea1 a circle that is superposed near the center of the sub-pixel SP, a boundary surface BF that descends toward the vicinity of the center can be realized as in FIG. 38.

21st Embodiment

In a 21st embodiment, a lens array 300 capable of switching optical characteristics is disclosed. Elements identical or similar to those of the above-mentioned embodiments may be indicated with the same symbol, and explanations thereof may be omitted.

Figure 43:
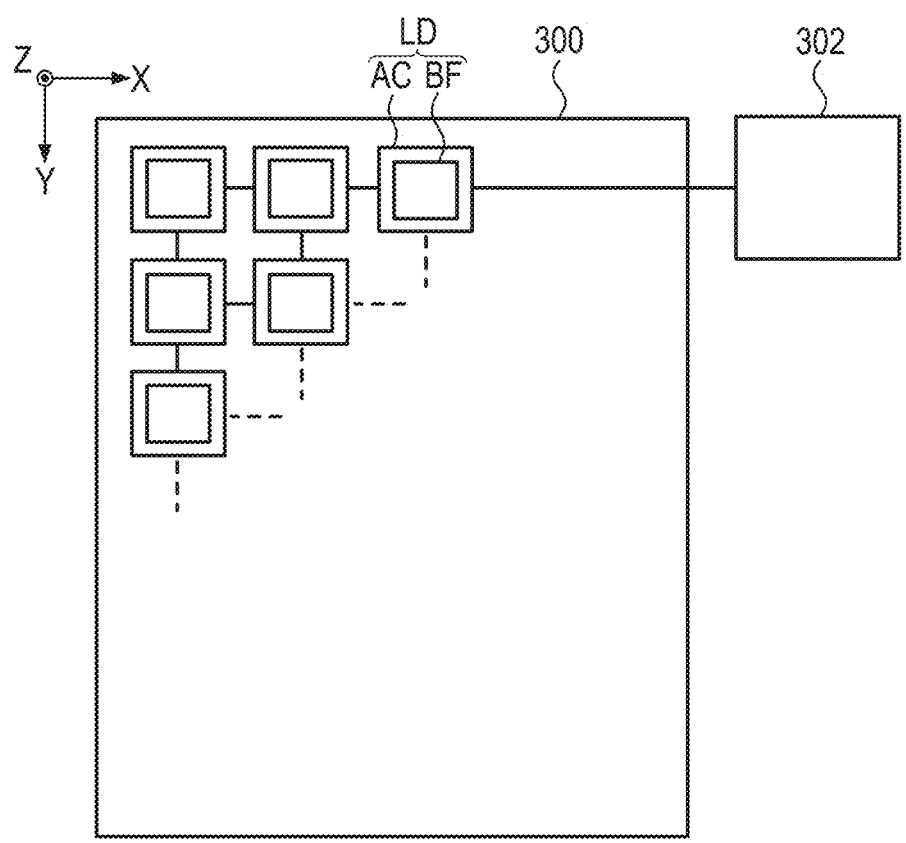
FIG. 43 shows a schematic configuration of a lens array according to a 21st embodiment.

FIG. 43 shows a schematic configuration of a lens array 300 of the 21st embodiment. As in each of the embodiments described above, X, Y, and Z directions are defined. Hereinafter, a view of the lens array 300 in parallel to the Z direction is referred to as a plan view. The lens array 300 is, for example, a rectangular flat plate. However, the lens array 300 may be in other shapes, such as a circle or a polygonal shape other than a rectangle.

The lens array 300 comprises a plurality of lens elements LD. These lens elements LD are arranged in a matrix in the X and Y directions. Each lens element LD includes a boundary surface BF and an actuator AC. The boundary surface BF is an interface between two layers with different refractive indices, such as a high refractive index layer 312 and a low refractive index layer 330 described later. The actuator AC deforms the shape of the boundary surface BF.

The actuator AC of each lens element LD is controlled by a controller 302. The controller 302 may be separately installed from the lens array 300 or may be a part of the lens array 300.

Figure 44:
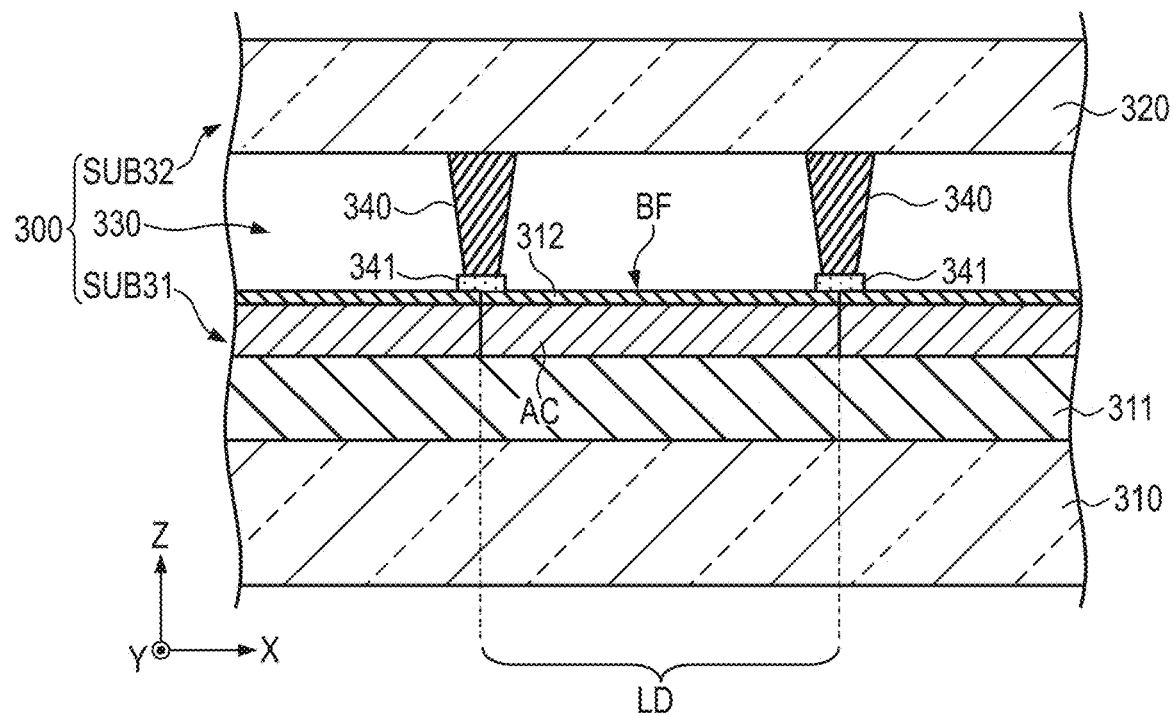
FIG. 44 is a schematic cross-sectional view of the lens array according to the 21st embodiment.

FIG. 44 is a schematic cross-sectional view of the lens array 300. The lens array 300 comprises a first substrate SUB31, a second substrate SUB32 facing the first substrate SUB31, and a low refractive index layer 330 between the first substrate SUB31 and the second substrate SUB32. As an example, the low refractive index layer 330 is a space (air, other gas, or vacuum), but may also contain a liquid or solid with a low refractive index.

The first substrate SUB31 comprises a first insulating substrate 310, a wiring layer 311, an actuator AC, and a high refractive index layer 312. The wiring layer 311 includes, for example, a line for supplying voltage to each actuator AC and one or more insulating layers, which are shown in simplified form in FIG. 44.

The first insulating substrate 310 can be formed, for example, of glass. The wiring layer 311 is translucent and is provided on the upper surface of the first insulating substrate 310 (a surface facing the second substrate SUB32). The actuator AC is translucent and is provided above the wiring layer 311. The high refractive index layer 312 is formed, for example, by a transparent resin material, and covers the actuator AC. The high refractive index layer 312 has a higher refractive index than the low refractive index layer 330. In the example of FIG. 44, the surface of the high refractive index layer 312 (an interface between the high refractive index layer 312 and the low refractive index layer 330) corresponds to the boundary surface BF.

In the example of FIG. 44, the actuators AC of adjacent lens elements LD are in contact with each other. The high refractive index layers 312 of the adjacent lens elements LD are also in contact with each other. The high refractive index layers 312 of the adjacent lens elements LD may be formed integrally and continuously.

The second substrate SUB32 has a second insulating substrate 320. The second insulating substrate 320 can be formed, for example, of glass. In addition to the second insulating substrate 320, the second substrate SUB32 may also include a translucent insulating layer, a conductive layer, and even a light-shielding layer superposed on the boundary of the lens element LD.

The lens array 300 is further provided with a spacer 340 interposed between the first substrate SUB31 and the second substrate SUB32. The spacer 340 extends from the second substrate SUB32 toward the first substrate SUB31. As another example, the spacer 340 may extend from the first substrate SUB31 toward the second substrate SUB32.

In the example of FIG. 44, the distal end of the spacer 340 is bonded to the high refractive index layer 312 by an adhesive layer 341. However, the distal end of the spacer 340 may contact the first substrate SUB31 without the adhesive layer 341. Alternatively, there may be a gap between the distal end of the spacer 340 and the first substrate SUB31. The spacer 340, for example, has transparency, but may also have light-shielding properties.

The lens array 300 in the present embodiment switches the characteristics related to the refraction of light transmitted through the lens array 300 by deforming the boundary surface BF with the actuator AC. Specific examples of the operation of the actuator AC will be described below with reference to FIGS. 44 and 45.

Figure 45:
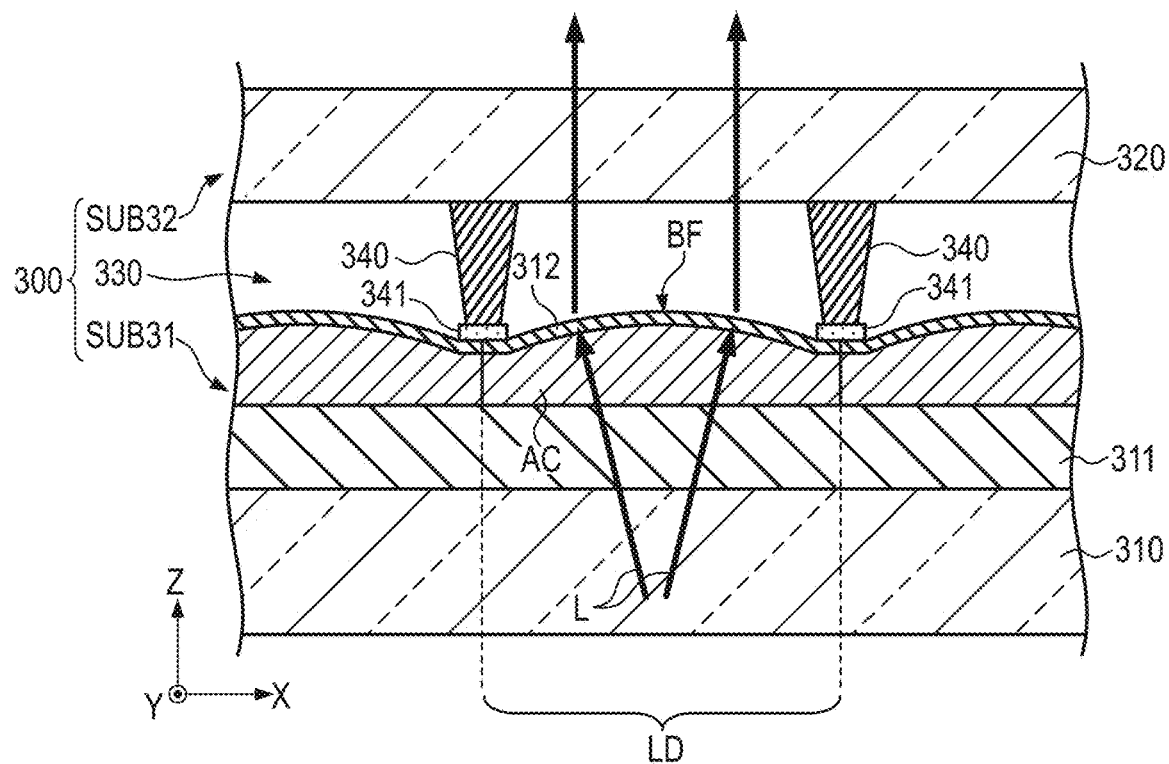
FIG. 45 is a schematic cross-sectional view of the lens array, showing a state in which a boundary surface is deformed from the shape shown in FIG. 44.

FIG. 45 is a schematic cross-sectional view of the lens array 300 showing a state in which the actuator AC of each lens element LD deforms the boundary surface BF from the shape shown in FIG. 44. Hereinafter, the shape of the boundary surface BF in FIG. 44 is referred to as a first shape, and the shape of the boundary surface BF in FIG. 45 is referred to as a second shape.

The first shape shown in FIG. 44 is a plane parallel to the upper surface (X-Y plane) of the first insulating substrate 310. On the other hand, the second shape shown in FIG. 45 is a convex curved surface with the convex facing away from the first insulating substrate 310 that supports the actuator AC.

As shown in FIG. 45, light L inclined with respect to the Z direction and transmitted through the lens array 300 from the first substrate SUB31 to the second substrate SUB32 is given as an example. Such light L is refracted by the boundary surface BF of the second shape so that its inclination with respect to the Z direction becomes smaller. In other words, the boundary surface BF of the second shape can convert diffused light such as light L into light that is substantially parallel to the Z direction (collimated light).

Here, the curvature of the first shape is defined as a first curvature, and the curvature of the second shape is defined as a second curvature. In the present embodiment, the second curvature is larger than the first curvature. When the first shape is a flat surface as shown in FIG. 44, the first curvature is zero. However, the first curvature does not necessarily have to be zero. That is, the first shape may be a more gently curved surface than the second shape.

The curvature of the first and second shapes may change depending on the position. In this case, the first curvature can be defined as an average or maximum value of the curvature at each position of the first shape. Similarly, the second curvature can be defined as an average or maximum value of the curvature at each position of the second shape.

In the case where the boundary surface BF is in the first shape, light transmitted through the lens element LD has a first viewing angle. In the case where the boundary surface BF is in the second shape, light transmitted through the lens element LD has a second viewing angle that is different from the first viewing angle. In a case where the light L, which is diffused light, transmits through the lens element LD as shown in FIG. 45, the first viewing angle is larger than the second viewing angle.

The actuator AC may be capable of changing the curvature of the boundary surface BF in multiple steps. In this case, the degree of diffusion of the light transmitted through the lens array 300 can be varied in multiple steps.

As the actuator AC, various elements capable of deforming the boundary surface BF into at least the first shape and the second shape may be used. As an example, the following assumes an actuator AC using a piezoelectric element (piezoelectric film) that deforms in response to the application of a voltage, and discloses a specific structure of the lens element LD.

Figure 46:
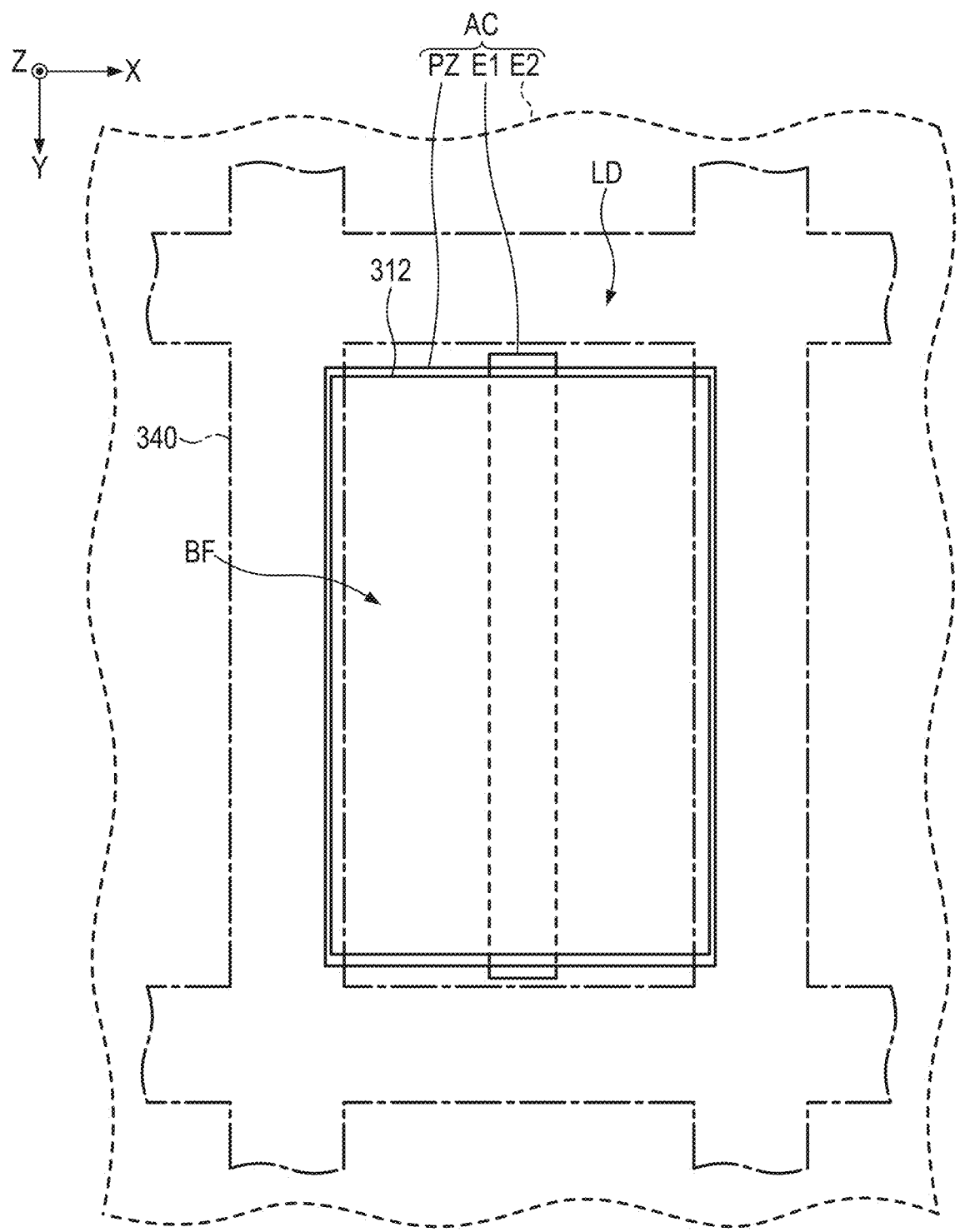
FIG. 46 is a plan view showing an example of a structure applicable to a lens element according to the 21st embodiment.

FIG. 46 is a plan view of an example of a structure that can be applied to the lens element LD. As in the example in FIG. 5, the actuator AC has a translucent piezoelectric element PZ, a first electrode E1, and a second electrode E2. The spacer 340 is a frame shape (grid shape) that surrounds the lens element LD, for example. The spacer 340 may be of other shapes, for example, a linear shape extending in the Y direction.

The first electrode E1 has a linear shape that is superposed on a central part of the lens element LD in the X direction and extends longitudinally in the Y direction. The second electrode E2, for example, has a shape extending over a plurality of lens elements LD and is superposed on the first electrode E1. The first electrode E1 may have a linear shape that extends continuously over a plurality of lens elements LD aligned in the Y direction. The second electrode E2 may be divided into sections for each lens element LD. The first and second electrodes E1 and E2 can be formed of transparent conductive materials such as ITO.

FIG. 47 is a schematic cross-sectional view of the actuator AC along the X-Z plane. The first electrode E1 is in contact with the lower surface of the piezoelectric element PZ (the surface on the first insulating substrate 310 side). The second electrode E2 is in contact with the upper surface of the piezoelectric element PZ (the surface on the second substrate SUB32 side) and is continuously provided over the plurality of lens elements LD. The high refractive index layer 312 is in contact with the upper surface of the second electrode E2.

In the example of FIG. 47, a gap is provided between the piezoelectric elements PZ of adjacent lens elements LD. In this gap, for example, a bank BK formed of an insulating material is disposed. As an example, the bank BK is shaped to enclose the entire perimeter of the piezoelectric element PZ. In the example of FIG. 47, a gap is also provided between the high refractive index layers 312 of the adjacent lens elements LD. The high refractive index layers 312 of the adjacent lens elements LD may be in contact with each other as shown in FIGS. 44 and 45. Similarly, the piezoelectric elements PZ of the adjacent lens elements LD may be in contact with each other.

The first electrode E1 is electrically connected to a line contained in the wiring layer 311. The controller 302 shown in FIG. 43 applies a voltage to the first electrode E1 in a variable manner via this line. In addition, the controller 302 applies a common voltage to the second electrode E2.

In the lens element LD shown in FIG. 47(a), no potential difference is formed between the first and second electrodes E1 and E2. In this case, the piezoelectric element PZ is flat, and the boundary surface BF is in the first shape shown in FIG. 44.

On the other hand, in the lens element LD shown in FIG. 47(b), a potential difference is formed between the first and second electrodes E1 and E2. In this case, the piezoelectric element PZ is curved, and, accordingly, the boundary surface BF becomes the second shape shown in FIG. 45. As another example, the piezoelectric element PZ may be curved when no potential difference is formed between the first and second electrodes E1, and the piezoelectric element PZ may be flat when the said potential difference is formed. The curvature of the boundary surface BF and the piezoelectric element PZ can be controlled by the voltage applied to the first electrode E1 (the potential difference between the first electrode E1 and the second electrode E2).

In the present embodiment, the same voltage is applied to the first electrode E1 of each lens element LD. Therefore, the boundary surface BF of all the lens elements LD has the same shape.

In the example of FIG. 47, a gap (bank BK) is provided between adjacent piezoelectric elements PZ, so that the force associated with the deformation of one piezoelectric element PZ is not easily transferred to the adjacent piezoelectric element PZ. Similarly, since a gap is provided between adjacent high refractive index layers 312, it is difficult for the force associated with the deformation of one high refractive index layer 312 to be transmitted to the adjacent high refractive index layer 312. This allows the interaction of the actuators AC in the adjacent lens elements LD to be suppressed, thereby allowing the second shape of the boundary surface BF in each lens element LD to be stabilized. Furthermore, it is possible to suppress the destruction of the high refractive index layer 312, etc., caused by the operation of the actuator AC at the boundary of the lens elements LD.

FIG. 48 is a schematic perspective view showing an example of the actuator AC and the high refractive index layer 312 in the case where the boundary surface BF is in the second shape. In the case where the first electrode E1 is provided as in the example of FIG. 46, the piezoelectric element PZ is deformed into a shape that extends uniformly in the Y direction, for example, in the cross-sectional shape shown in FIG. 47(b). In other words, the piezoelectric element PZ is convex with its top at a portion where the first electrode E1 and the piezoelectric element PZ superpose. Therefore, as shown in FIG. 48, the boundary surface BF also deforms into the same shape (second shape) with the piezoelectric element PZ.

For example, the second shape of the boundary surface BF shown in FIG. 48 can be regarded as a shape corresponding to a part of a cylindrical surface. However, in the boundary surface BF of the second shape, the curvature of the cross-sectional shape along the X-Z plane may differ depending on the position in the Y direction.

As explained above, in the lens array 300 according to the present embodiment, each of the plurality of lens elements LD is provided with a boundary surface BF and an actuator AC that deforms the boundary surface BF. The shape of the boundary surface BF allows the optical characteristics to be switched for light transmitted through the lens array 300.

The configuration of the lens array 300 is not limited to the examples described with reference to FIGS. 43 to 48. Other embodiments that can be applied to the lens array 300 will be disclosed below. In each embodiment, differences from the 21st embodiment will be mainly explained. For configurations not specifically mentioned in each embodiment, the configurations disclosed in the 21st embodiment or other embodiments can be applied.

22nd Embodiment

Figure 49:
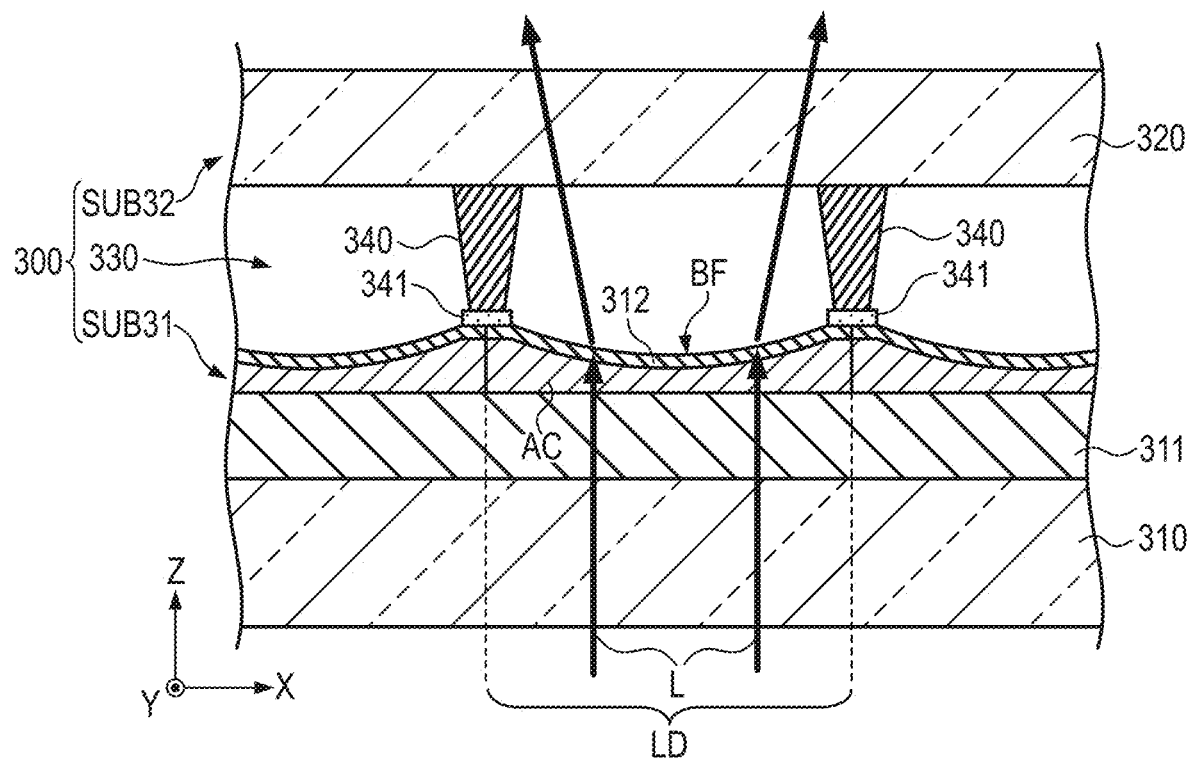
FIG. 49 is a schematic cross-sectional view of a lens array according to the 22nd embodiment.

FIG. 49 is a schematic cross-sectional view of a lens array 300 according to a 22nd embodiment, showing a state in which a boundary surface BF deforms into a second shape as in FIG. 45. While the second shape in FIG. 45 is a convex curved surface with the convex facing away from a first insulating substrate 310, the second shape in FIG. 49 is a concave curved surface concaved toward the first insulating substrate 310.

As shown in FIG. 49, light L parallel to a Z direction and transmitted through the lens array 300 from a first substrate SUB31 to a second substrate SUB32 is given as an example. Such light L is refracted by the boundary surface BF of the second shape in a direction inclined with respect to the Z direction. In other words, in the present embodiment, the boundary surface BF of the second shape can convert collimated light such as light L into diffused light. In this case, a second viewing angle of a lens element LD when the boundary surface BF is in the second shape is larger than a first viewing angle of the lens element LD when the boundary surface BF is in a first shape.

Figure 50:
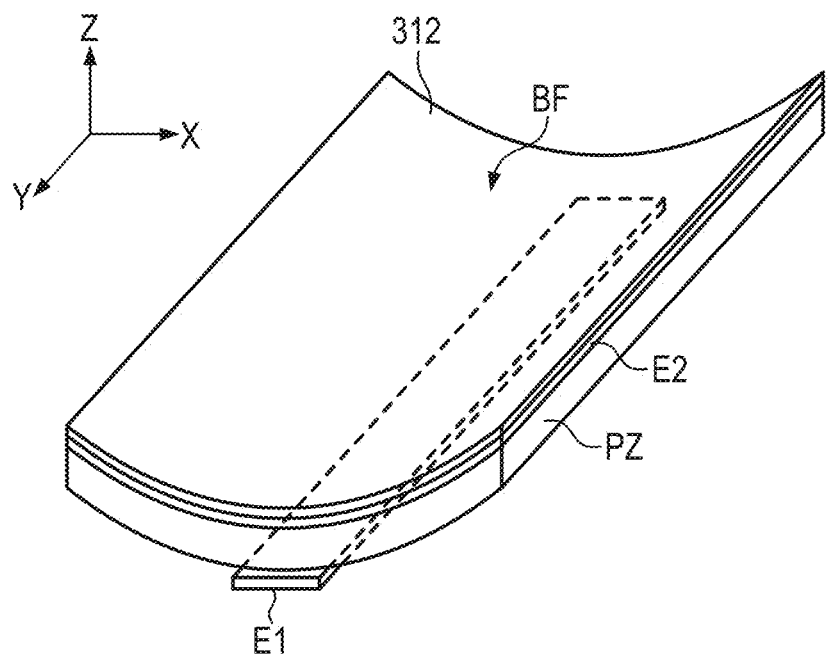
FIG. 50 is a schematic perspective view showing an example of an actuator and a high refractive index layer in a case where the boundary surface is in a second shape according to the 22nd embodiment.

FIG. 50 is a schematic perspective view showing an example of an actuator AC and a high refractive index layer 312 in the case where the boundary surface BF is in the second shape. As the actuator AC, a configuration comprising a piezoelectric element PZ, a first electrode E1, and a second electrode E2 can be applied as in the 21st embodiment. In the present embodiment, for example, the piezoelectric element PZ is deformed concavely with its bottom at a portion where the first electrode E1 and the piezoelectric element PZ superpose. Therefore, as shown in FIG. 50, the boundary surface BF also deforms into a similar shape (second shape) with the piezoelectric element PZ.

Even in the configuration of the present embodiment, the optical characteristics for the light transmitted through the lens array 300 can be switched by the shape of the boundary surface BF.

23rd Embodiment

Figure 51:
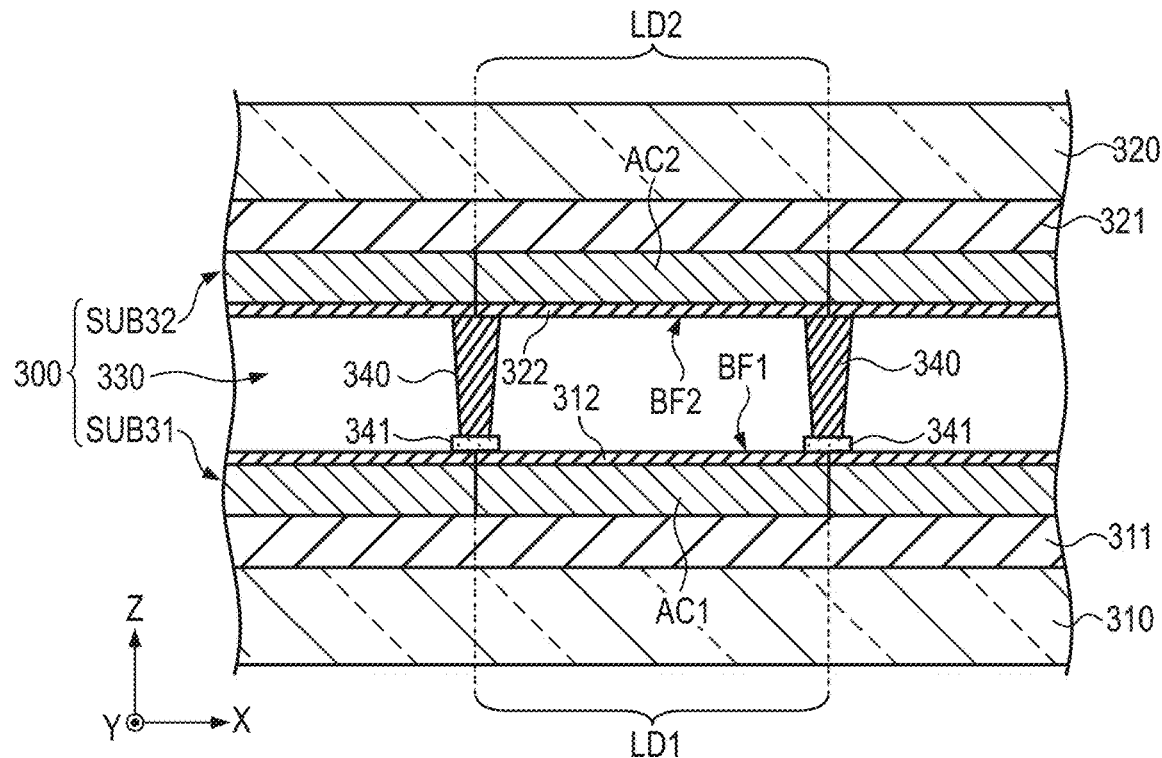
FIG. 51 is a schematic cross-sectional view of a lens array according to a 23rd embodiment.

FIG. 51 is a schematic cross-sectional view of a lens array 300 of a 23rd embodiment. In the present embodiment, not only a first substrate SUB31 but also a second substrate SUB32 comprises a lens element and a wiring layer. The lens element of the second substrate SUB32 includes an actuator, a high refractive index layer, and a boundary surface.

Hereinafter, the lens element, wiring layer, actuator, high refractive index layer, and boundary surface in the first substrate SUB31 are referred to as a first lens element LD1, a first wiring layer 311, a first actuator AC1, a first high refractive index layer 312, and a first boundary surface BF1, respectively. The lens element, wiring layer, actuator, high refractive index layer, and boundary surface in the second substrate SUB32 are referred to as a second lens element LD2, a second wiring layer 321, a second actuator AC2, a second high refractive index layer 322, and a second boundary surface BF2, respectively.

The first lens element LD1 and the second lens element LD2 are, for example, the same size and face each other. However, the first lens element LD1 and the second lens element LD2 may have different sizes. The first high refractive index layer 312, the first actuator AC1, the second high refractive index layer 322, and the second actuator AC2 are located between a first insulating substrate 310 and a second insulating substrate 320.

In the example of FIG. 51, the first high refractive index layer 312 and the second high refractive index layer 322 are facing each other through a low refractive index layer 330. Both the first high refractive index layer 312 and the second high refractive index layer 322 have a higher refractive index than the low refractive index layer 330. The interface between the first high refractive index layer 312 and the low refractive index layer 330 corresponds to the first boundary surface BF1, and the interface between the second high refractive index layer 322 and the low refractive index layer 330 corresponds to the second boundary surface BF2. The first boundary surface BF1 and the second boundary surface BF2 face each other through the low refractive index layer 330.

In FIG. 51, both the first and second boundary surfaces BF1 and BF2 are flat. For example, a configuration including a piezoelectric element PZ, a first electrode E1, and a second electrode E2 as in the 21st embodiment can be applied to the first actuator AC1 and the second actuator AC2.

Figure 52:
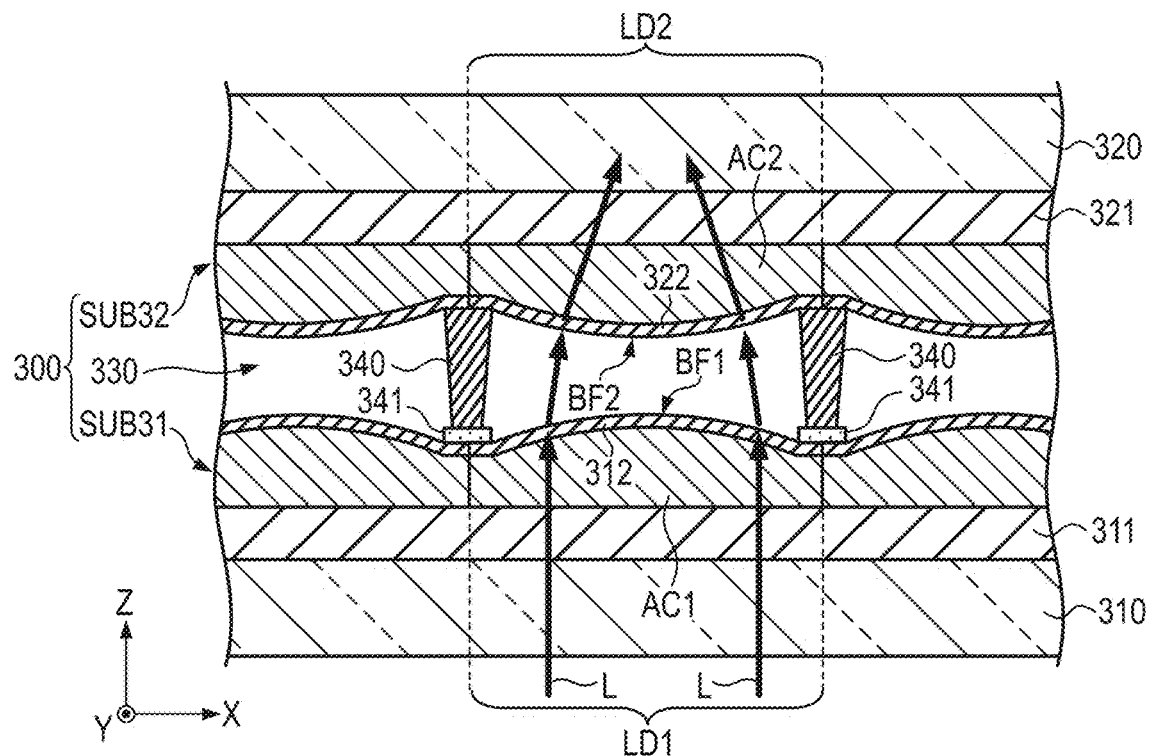
FIG. 52 is a schematic cross-sectional view of the lens array, showing a state in which a boundary surface is deformed from a shape shown in FIG. 51.

FIG. 52 is a schematic cross-sectional view of the lens array 300, showing a state in which the first boundary surface BF1 and the second boundary surface BF2 are deformed. In the present embodiment, the first actuator AC1 deforms the first boundary surface BF1 into a convex curved surface with the convex facing away from the first insulating substrate 310. In addition, the second actuator AC2 deforms the second boundary surface BF2 into a convex curved surface with the convex facing away from the second insulating substrate 320.

Hereinafter, the shape of the first boundary surface BF1 shown in FIG. 51 is referred to as a first shape, the shape of the first boundary surface BF1 shown in FIG. 52 is referred to as a second shape, the shape of the second boundary surface BF2 shown in FIG. 51 is referred to as a third shape, and the shape of the second boundary surface BF2 shown in FIG. 52 as a fourth shape.

The curvatures of the first shape, the second shape, the third shape, and the fourth shape are defined as a first curvature, a second curvature, a third curvature, and a fourth curvature, respectively. In the present embodiment, the second curvature is larger than the first curvature. Also, the fourth curvature is larger than the third curvature.

As shown in FIG. 52, light L parallel to a Z direction and transmitted through the lens array 300 from the first substrate SUB31 to the second substrate SUB32 is given as an example. Such light L is refracted by the first boundary surface BF1 of the second shape in a direction inclined with respect to the Z direction. Furthermore, this light L is refracted by the second boundary surface BF2 so that its inclination with respect to the Z direction is further increased. As a whole, the light L is refracted in such a way that it is focused toward a specific position.

In FIG. 52, a state in which the first boundary surface BF1 is in the second shape and, at the same time, the second boundary surface BF2 is in the fourth shape is exemplified. As another example, the lens array 300 may realize a state in which the first boundary surface BF1 is in the first shape and the second boundary surface BF2 is in the fourth shape. The lens array may also realize a state in which the first boundary surface BF1 is in the second shape and the second boundary surface BF2 is in the third shape.

24th Embodiment

In a 24th embodiment, another example of a configuration in which a first substrate SUB31 is provided with a first lens element LD1 and a second substrate SUB32 is provided with a second lens element LD2 as in the 23rd embodiment is disclosed.

Figure 53:
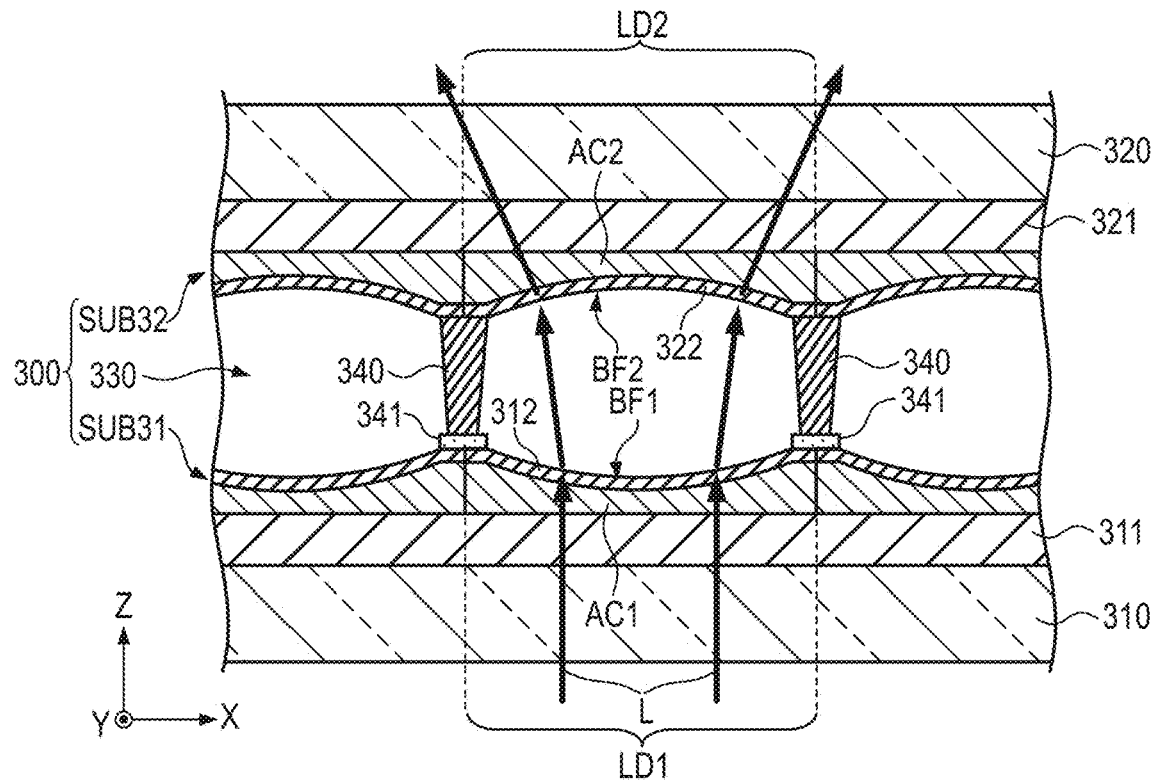
FIG. 53 is a schematic cross-sectional view of a lens array according to a 24th embodiment.

FIG. 53 is a schematic cross-sectional view of a lens array 300 of the 24th embodiment, showing a state in which a first boundary surface BF1 is deformed into a second shape and a second boundary surface BF2 is deformed into a fourth shape as in the manner of FIG. 52. The second shape in the present embodiment is a concave curved surface concaved toward a first insulating substrate 310. Also, the fourth shape in the present embodiment is a concave curved surface concaved toward a second insulating substrate 320.

As shown in FIG. 53, light L parallel to a Z direction and transmitted through the lens array 300 from the first substrate SUB31 to the second substrate SUB32 is given as an example. Such light L is refracted by the first boundary surface BF1 of the second shape in a direction inclined with respect to the Z direction. Furthermore, this light L is refracted by the second boundary surface BF2 in such a way that the inclination with respect to the Z direction is further increased. As a whole, the light L is diffused by the first and second lens elements LD1 and LD2.

In FIG. 53, a state in which the first boundary surface BF1 is in the second shape and, at the same time, the second boundary surface BF2 is in the fourth shape is exemplified. As another example, the lens array 300 may realize a state in which the first boundary surface BF1 is in a first shape and the second boundary surface BF2 is in the fourth shape. The lens array may also realize a state in which the first boundary surface BF1 is in the second shape and the second boundary surface BF2 is in a third shape.

25th Embodiment

In a 25th embodiment, another example of a configuration in which a first substrate SUB31 is provided with a first lens element LD1 and a second substrate SUB32 is provided with a second lens element LD2 as in the 23rd embodiment is disclosed.

Figure 54:
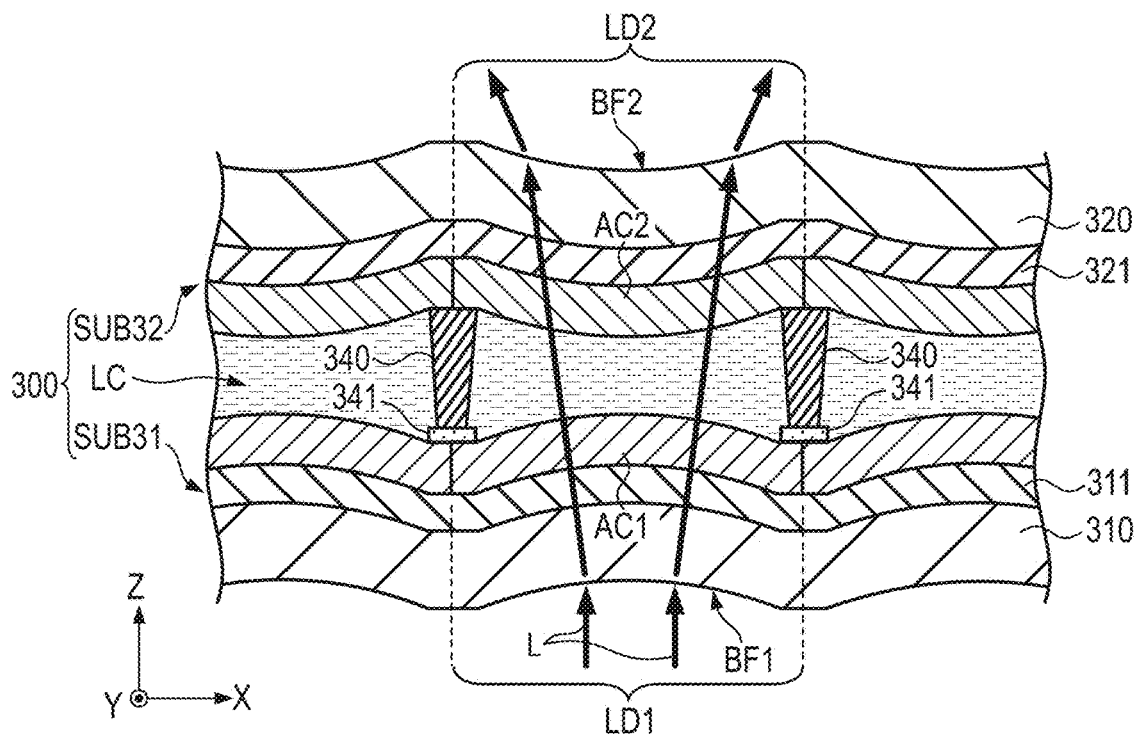
FIG. 54 is a schematic cross-sectional view of a lens array according to a 25th embodiment.

FIG. 54 is a schematic cross-sectional view of a lens array 300 of the 25th embodiment. In the present embodiment, a first insulating substrate 310 and a second insulating substrate 320 are flexible. For example, a resin material such as polyimide can be used as a material for the first insulating substrate 310 and the second insulating substrate 320. In the case where the first insulating substrate 310 and the second insulating substrate 320 are flexible, a lens array 300 that can be bent into any shape can be realized.

In the example of FIG. 54, along with the deformation of a first actuator AC1, a first wiring layer 311 and the first insulating substrate 310 are deformed. Furthermore, along with the deformation of a second actuator AC2, a second wiring layer 321 and the second insulating substrate 320 are deformed.

The lens array 300 shown in FIG. 54 is not provided with a first high refractive index layer 312 and a second high refractive index layer 322. Furthermore, a space between the first substrate SUB31 and the second substrate SUB32 is filled with liquid crystal LC. The liquid crystal LC has the same refractive index as, for example, the first actuator AC1 and the second actuator AC2. Therefore, light is hardly refracted at the interface between the liquid crystal LC and the first actuator AC1, and at the interface between the liquid crystal LC and the second actuator AC2.

On the other hand, the lower surface of the first insulating substrate 310 (a surface on a side not facing the second substrate SUB32) is in contact with the atmosphere of a space such as air where the lens array 300 is disposed. In the present embodiment, the said lower surface of the first insulating substrate 310 corresponds to a first boundary surface BF1. In this case, the first insulating substrate 310 is a first high refractive index layer, and the atmosphere of the space in which the lens array 300 is disposed is a low refractive index layer.

The upper surface of the second insulating substrate 320 (a surface on a side not facing the first substrate SUB31) is also in contact with the atmosphere of the space where the lens array 300 is disposed. In the present embodiment, the said upper surface of the second insulating substrate 320 corresponds to a second boundary surface BF2. In this case, the second insulating substrate 320 is a second high refractive index layer and the atmosphere of the space in which the lens array 300 is disposed is the low refractive index layer.

In the example of FIG. 54, the first actuator AC1 is convex toward the second substrate SUB32, and the second actuator AC2 is convex toward the first substrate SUB31. In this case, the first boundary surface BF1 is a concave curved surface (a second shape) concaved toward the second substrate SUB32, and the second boundary surface BF2 is a concave curved surface (a fourth shape) concaved toward the first substrate SUB31. In the case where the first actuator AC1 is not deformed, the first boundary surface BF1 is flat (a first shape). Similarly, in the case where the second actuator AC2 is not deformed, the second boundary surface BF2 is flat (a third shape).

As shown in FIG. 54, light L parallel to a Z direction and transmitted through the lens array 300 from the first substrate SUB31 to the second substrate SUB32 is given as an example. Such light L is refracted by the first boundary surface BF1 of the second shape in a direction inclined with respect to the Z direction. Furthermore, this light L is refracted by the second boundary surface BF2 in such a way that the inclination toward the Z direction is further increased. As a whole, the light L is diffused by the first and second lens elements LD1 and LD2.

In FIG. 54, a state in which the first boundary surface BF1 is in the second shape and, at the same time, the second boundary surface BF2 is in the fourth shape is exemplified. As another example, the lens array 300 may realize a state in which the first boundary surface BF1 is in the first shape and the second boundary surface BF2 is in the fourth shape. The lens array may also realize a state in which the first boundary surface BF1 is in the second shape and the second boundary surface BF2 is in the third shape.

26th Embodiment

In a 26th embodiment, other shapes that may be applied to first and second boundary surfaces BF1 and BF2 are disclosed in the same configuration as in the 25th embodiment.

Figure 55:
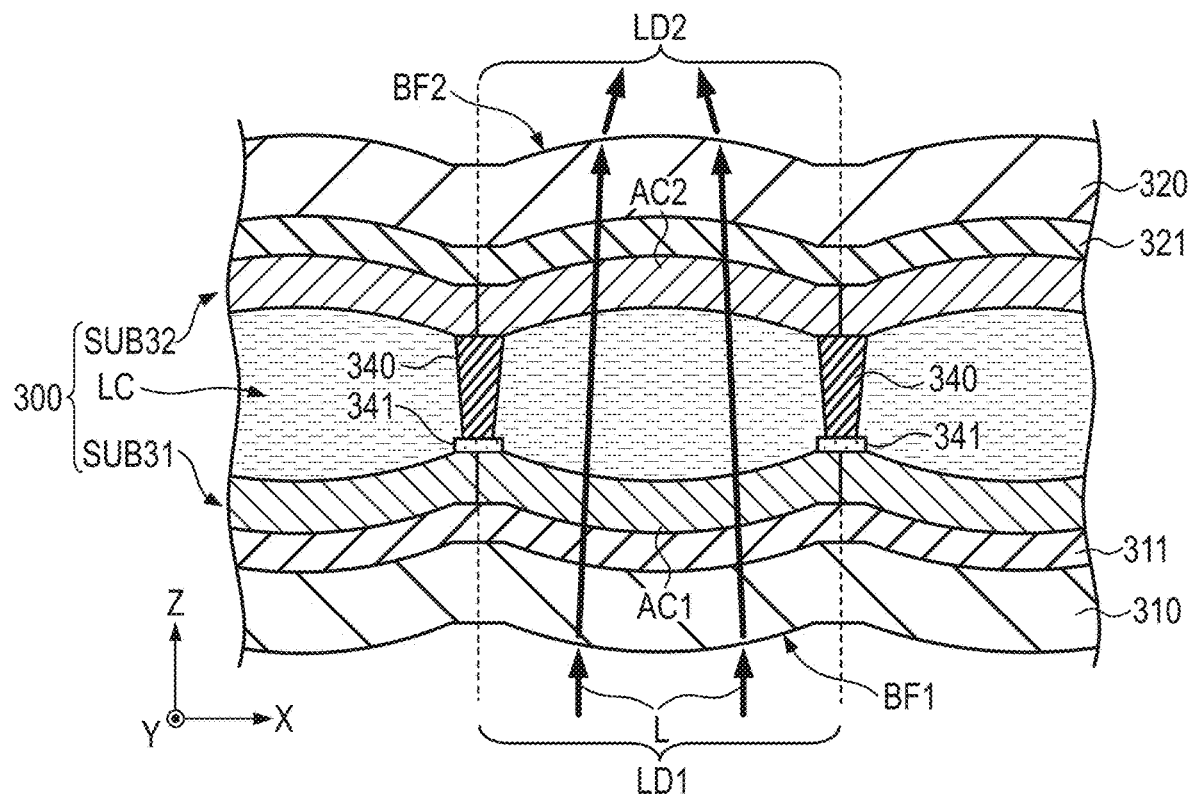
FIG. 55 is a schematic cross-sectional view of a lens array according to a 26th embodiment.

FIG. 55 is a schematic cross-sectional view of a lens array 300 of the 26th embodiment, showing a state in which the first boundary surface BF1 is deformed into a second shape and the second boundary surface BF2 deformed into a fourth shape as in FIG. 54. The second shape of the first boundary surface BF1 in the present embodiment is a convex curved surface with the convex facing away from the second substrate SUB32. Also, the fourth shape in the present embodiment is a convex curved surface with the convex facing away from the first substrate SUB31.

As shown in FIG. 55, light L parallel to a Z direction and transmitted through the lens array 300 from the first substrate SUB31 to the second substrate SUB32 is given as an example. Such light L is refracted by the first boundary surface BF1 of the second shape in a direction inclined with respect to the Z direction. Furthermore, this light L is refracted by the second boundary surface BF2 so that its inclination with respect to the Z direction is further increased. As a whole, the light L is refracted in such a way that it is focused toward a specific position.

In FIG. 55, a state in which the first boundary surface BF1 is in the second shape and, at the same time, the second boundary surface BF2 is in the fourth shape is exemplified. As another example, the lens array 300 may realize a state in which the first boundary surface BF1 is in a first shape and the second boundary surface BF2 is in the fourth shape. The lens array may also realize a state in which the first boundary surface BF1 is in the second shape and the second boundary surface BF2 is in a third shape.

27th Embodiment

A second shape of a boundary surface BF is not limited to the ones shown in FIGS. 48 and 50. In the present embodiment, other examples of the second shape are disclosed.

Figure 56:
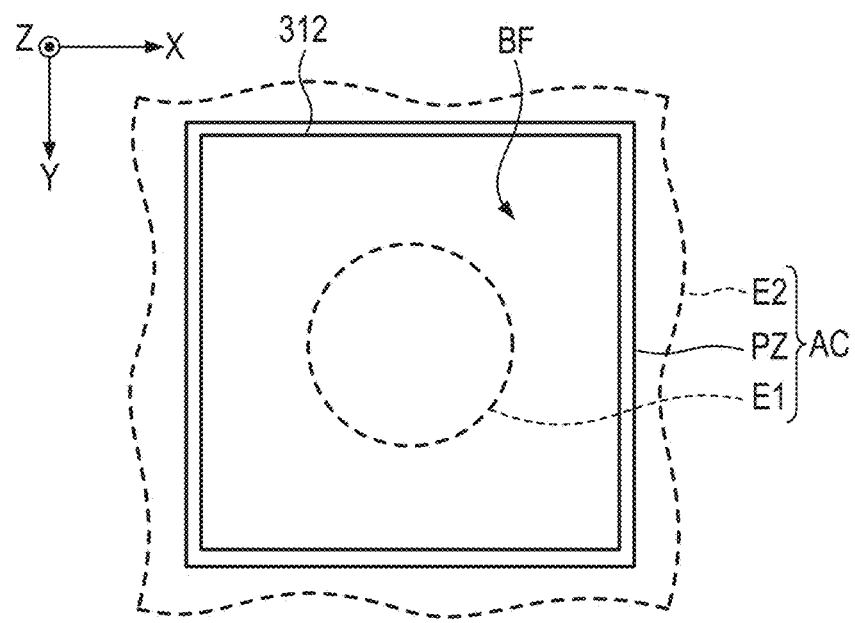
FIG. 56 is a schematic plan view of an actuator according to a 27th embodiment.

FIG. 56 is a schematic plan view of an actuator AC according to a 27th embodiment. This actuator AC, as in the 21st embodiment, comprises a piezoelectric element PZ, a first electrode E1, and a second electrode E2. The first electrode E1, piezoelectric element PZ, and second electrode E2 are stacked in this order in a Z direction. A high refractive index layer 312 having a boundary surface BF is disposed on top of the second electrode E2.

In the present embodiment, the first electrode E1 is a regular circle superposed near the center of the piezoelectric element PZ. Note that the first electrode E1 may be of other shapes such as oval or polygonal.

Figure 57:
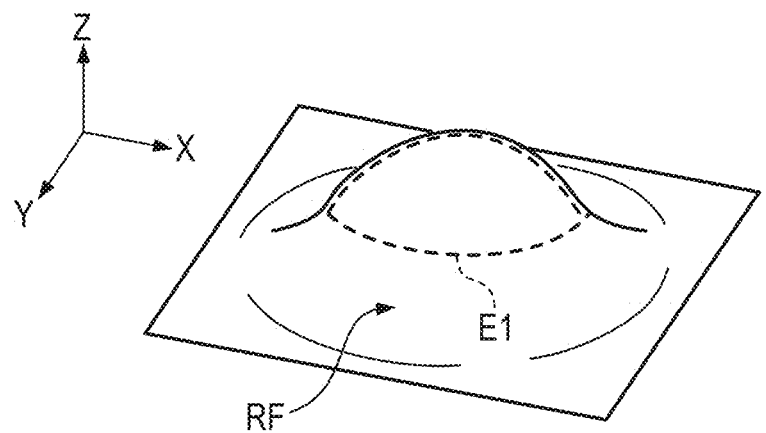
FIG. 57 is a schematic perspective view showing an example of a boundary surface of a second shape according to the 27th embodiment.

FIG. 57 is a schematic perspective view showing an example of the boundary surface BF of the second shape in the present embodiment. In this example, when a potential difference is formed between the first and second electrodes E1 and E2, the boundary surface BF deforms into a convex curved surface that rises toward the vicinity of the center. The top of the convex curved surface faces the first electrode E1.

Figure 58:
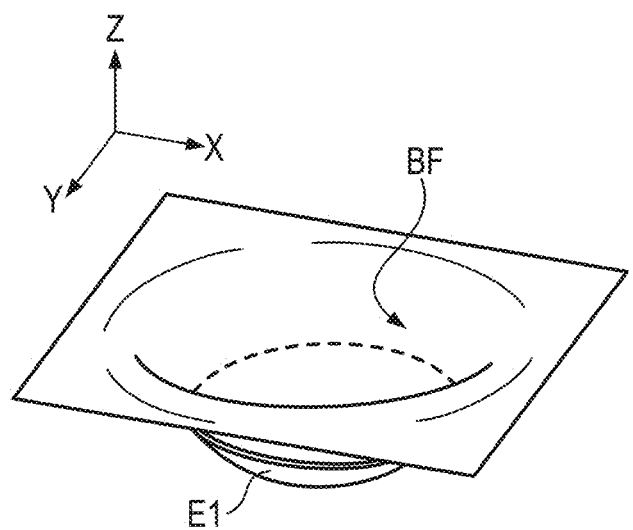
FIG. 58 is a schematic perspective view showing another example of the boundary surface of the second shape according to the 27th embodiment.

FIG. 58 is a schematic perspective view showing another example of the boundary surface BF of the second shape in the present embodiment. In this example, when a potential difference is formed between the first and second electrodes E1 and E2, the boundary surface BF deforms into a concave curved surface that descends toward the vicinity of the center. The bottom of the concave curved surface faces the first electrode E1.

Even in the configuration of the present embodiment, as in the first embodiment, the optical characteristics for light transmitted through a lens array 300 can be switched by the shape of the boundary surface BF. In the present embodiment, an example in which the surface of the high refractive index layer 312 is the boundary surface BF is disclosed, but the same second shape (fourth shape) as in FIGS. 57 and 58 can also be applied when the surface of a first insulating substrate 310 or a second insulating substrate 320 is the boundary surface BF (first boundary surface BF1 and second boundary surface BF2) as in the 25th and 26th embodiments.

28th Embodiment

The configuration of an actuator AC is not limited to using a piezoelectric element PZ. In the present embodiment, other examples of the actuator AC are disclosed.

Figure 59:
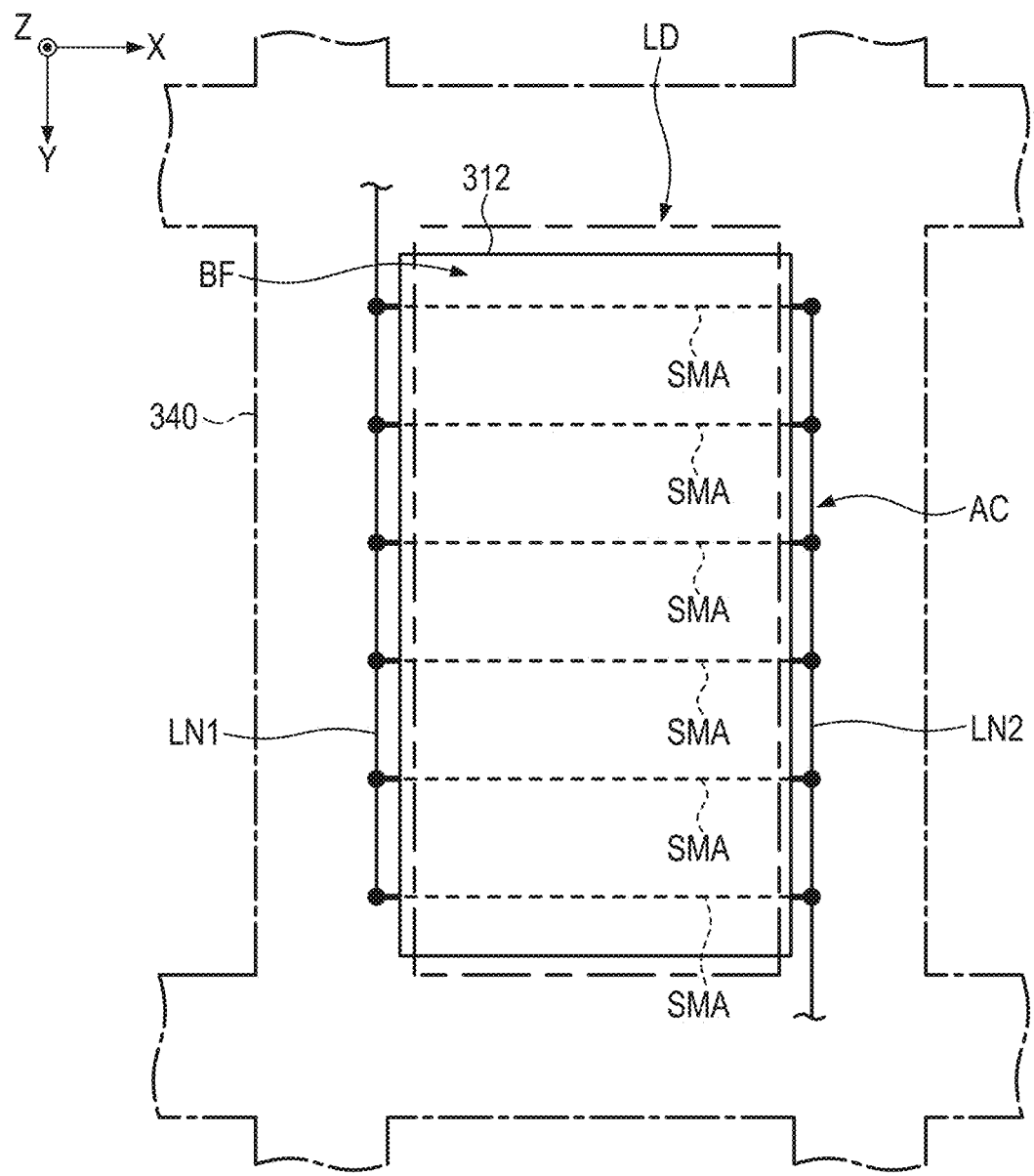
FIG. 59 is a plan view showing an example of a configuration applicable to a lens element according to a 28th embodiment.

FIG. 59 is a plan view showing an example of a configuration that can be applied to a lens element LD according to the present embodiment. The shape of a spacer 340 is the same as the example in FIG. 46. In the present embodiment, as in the example of FIG. 20, the actuator AC comprises a plurality of shape memory alloys SMA, a first line LN1, and a second line LN2. A high refractive index layer 312 is superposed on the plurality of shape memory alloys SMA. Although six shape memory alloys SMA are shown in FIG. 59, the actuator AC may be provided with a larger or smaller number of shape memory alloys SMA.

Figure 60:
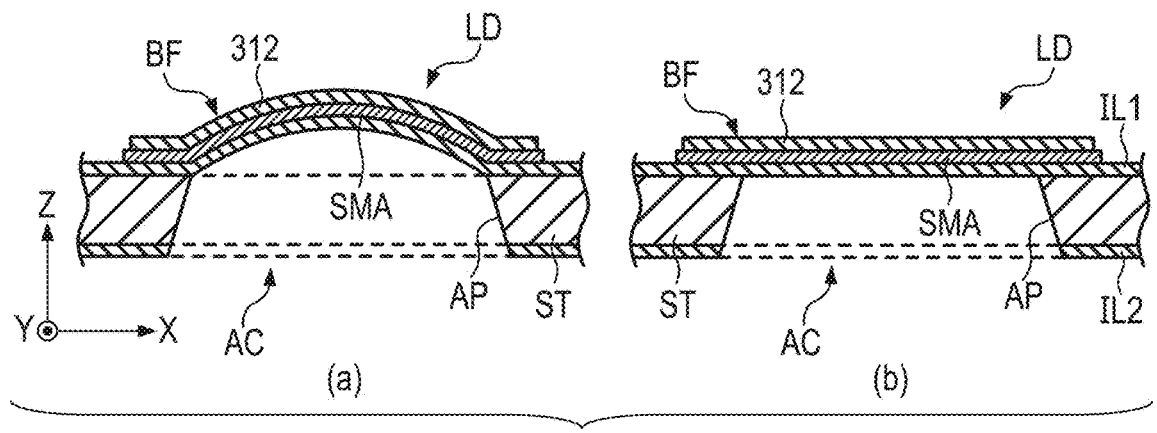
FIG. 60 is a schematic cross-sectional view of an actuator shown in FIG. 59.

FIG. 60 is a schematic cross-sectional view of the actuator AC along a X-Z plane. Similar to the example in FIG. 21, the actuator AC is further provided with a support substrate ST, a first insulating layer IL1, and a second insulating layer IL2. The support substrate ST has an opening AP in each lens element LD. The planar shape of the opening AP is, for example, a rectangular shape similar to the planar shape of the high refractive index layer 312, but is not limited thereto. Each shape memory alloy SMA intersects the opening AP.

For example, when the actuator AC is at a low temperature, about room temperature, the shape memory alloys SMA are raised convexly as in the lens element LD shown in FIG. 60(*a*). Accordingly, a boundary surface BF also becomes a convex curved surface (i.e., the second or fourth shape).

When an electric current is supplied to a circuit including the first line LN1, each shape memory alloy SMA, and the second line LN2, the shape memory alloy SMA is heated up by Joule heat. At this time, the shape memory alloy SMA recovers its shape and becomes flat as shown in FIG. 60(*b*). Accordingly, the boundary surface BF also becomes flat or gently curved (i.e., the first or third shape).

When the shape memory alloy SMA is at a low temperature again, the shape memory alloy SMA deforms convexly due to the bias force caused by the difference in thermal expansion coefficients of the shape memory alloy SMA, the first insulating layer IL1, and the support substrate ST.

Even with the configuration of the present embodiment, a curved boundary surface BF can be obtained in the same manner as in FIG. 48 or FIG. 50. For example, the shape memory alloy SMA may be made in the form of a film covering the opening AP instead of a line, to realize a boundary surface BF raised toward the vicinity of the center as in FIG. 57 or a boundary surface BF lowered toward the vicinity of the center as in FIG. 58.

In addition to piezoelectric elements and shape memory alloys, for example, various elements whose shape can be electrically controlled, such as dielectric elastomers, can be used as the actuator AC. In other words, the configuration of the actuator AC is not particularly limited as long as it can deform the boundary surface BF.

29th Embodiment

Actuators AC of a plurality of lens elements LD need not be controlled so that each boundary surface BF is deformed into a first or second shape simultaneously, but may be controlled individually. In the present embodiment, an example of a configuration in which the actuator AC of each lens element LD can be controlled individually is disclosed.

Figure 61:
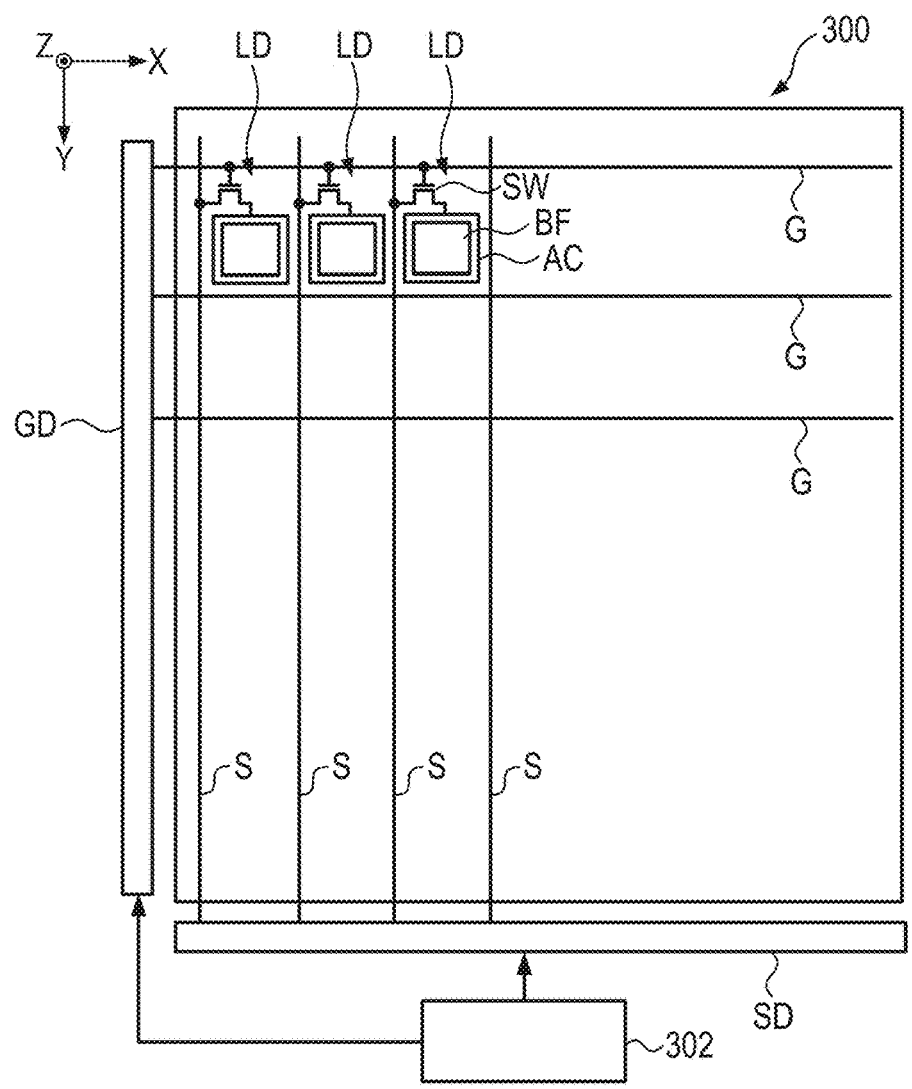
FIG. 61 shows a schematic configuration of a lens array according to a 29th embodiment.

FIG. 61 shows a schematic configuration of a lens array 300 of the present embodiment. The lens array 300 comprises a plurality of lens elements LD, a plurality of scanning lines G, a plurality of signal lines S, a scanning driver GD, and a signal driver SD. The plurality of scanning lines G extend in an X direction and are aligned in a Y direction. The plurality of signal lines S extend in the Y direction and are aligned in the X direction. The scanning driver GD supplies scanning signals to the plurality of scanning lines G. The signal driver SD supplies drive signals to the plurality of signal lines S. The lens element LD corresponds, for example, to an area divided by the scanning line G and the signal line S.

In addition, the lens array 300 comprises a switching element SW arranged in each lens element LD. The switching element SW is connected to the scanning line G and the signal line S. When a scanning signal is supplied to the scanning line G, the switching element SW supplies the drive signal of the signal line S to the actuator AC. The actuator AC deforms the shape of a boundary surface BF in accordance with the drive signal supplied through the switching element SW.

With such a configuration, it is possible to control the boundary surface BF of some of the lens elements LD to be the first shape and the boundary surface BF of the remaining lens elements LD to be the second shape. Such control is performed, for example, by a controller 302.

The same structure as in FIG. 3 can be applied to the switching element SW. In a case where the actuator AC is configured to include a shape memory alloy SMA, either one of a first line LN1 and a second line LN2 may contact the relay electrode RE shown in FIG. 3.

The scanning line G, the signal line S, the relay electrode RE, the semiconductor layer SC, and the insulating layers 114 to 117 in FIG. 3 are included in the wiring layer 311 shown in, for example, FIG. 44. In a configuration where a second lens element LD2 is disposed on a second substrate SUB32 as shown in FIG. 51, etc., the scanning line G, the signal line S, the relay electrode RE, the semiconductor layer SC, and the insulating layers 114 to 117 are included in a wiring layer 321.

With the configuration of the present embodiment, optical characteristics can be varied for each area of the lens array 300 by controlling the plurality of lens elements LD individually.

30th Embodiment

In the present embodiment, as yet another example of an actuator AC, an electrostatic actuator is disclosed.

Figure 62:
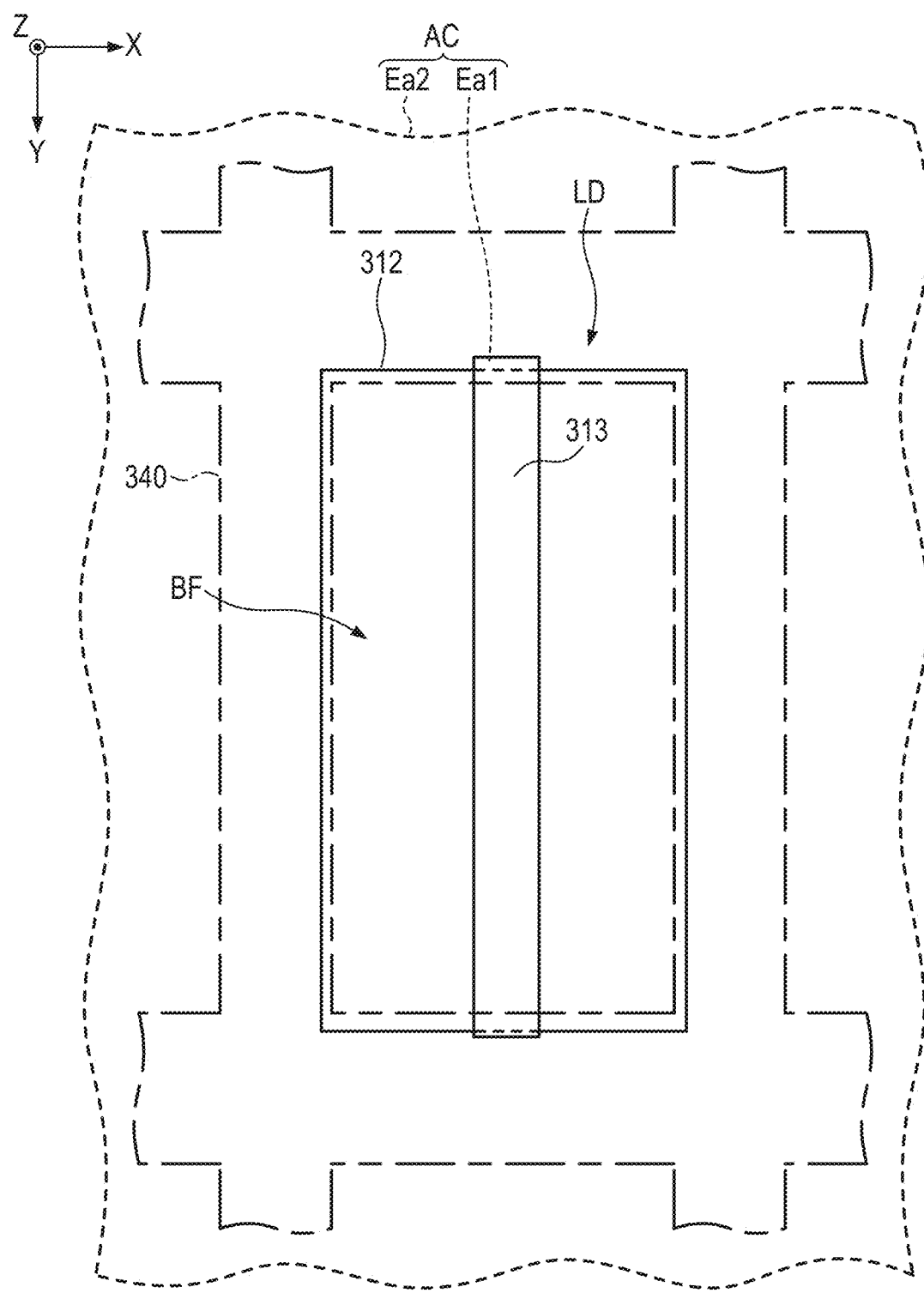
FIG. 62 is a plan view showing an example of a configuration applicable to a lens element according to a 30th embodiment.

FIG. 62 is a plan view showing an example of a configuration that can be applied to a lens element LD in the present embodiment. The shape of a high refractive index layer 312 and a spacer 340 is the same as the example in FIG. 46. In the present embodiment, the actuator AC comprises a first electrode Ea1 and a second electrode Ea2.

The first electrode Ea1 has a linear shape that is superposed on a central part of the lens element LD in an X direction and extends longitudinally in a Y direction. The second electrode Ea2, for example, has a shape that extends over a plurality of lens elements LD and is superposed on the first electrode Ea1. The first electrode Ea1 may have a linear shape that extends continuously over a plurality of lens elements LD aligned in the Y direction. The second electrode Ea2 may also be divided into sections for each lens element LD. The first and second electrodes Ea1 and Ea2 may be formed of, for example, a transparent conductive material such as ITO.

Figure 63:
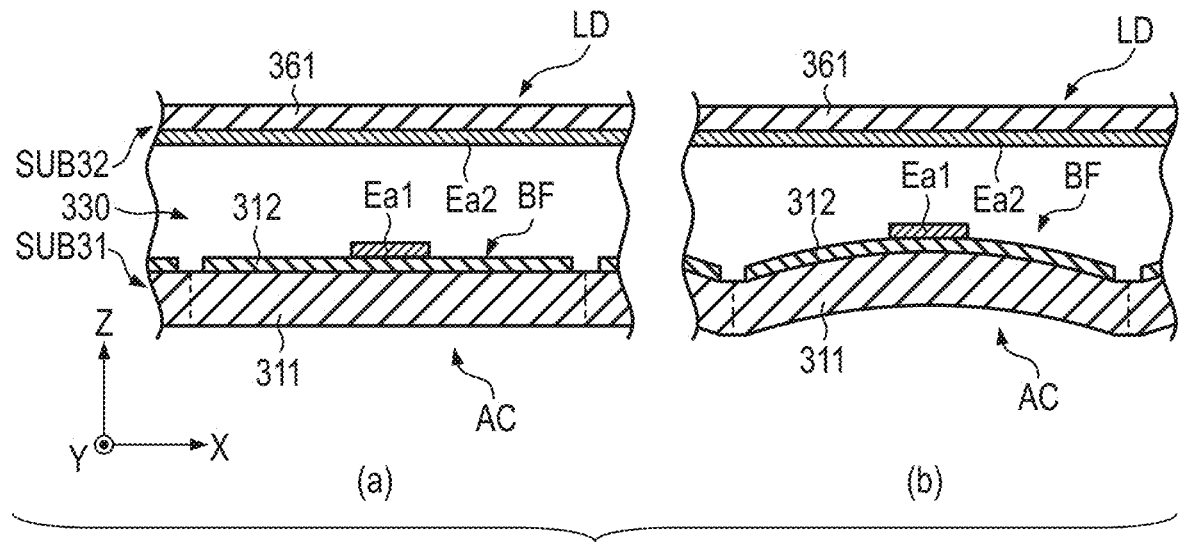
FIG. 63 is a schematic cross-sectional view of an actuator shown in FIG. 62.

FIG. 63 is a schematic cross-sectional view of the actuator AC along a X-Z plane. The first electrode Ea1 is disposed on a first substrate SUB31. The second electrode Ea2 is disposed on a second substrate SUB32. The first electrode Ea1 and the second electrode Ea2 are facing each other through a low refractive index layer 330.

In the example of FIG. 63, the high refractive index layer 312 is disposed above a wiring layer 311. An insulating layer may be interposed between the high refractive index layer 312 and the wiring layer 311. The first electrode Ea1 is disposed on top of the high refractive index layer 312. In the example of FIG. 63, a gap is provided between the high refractive index layers 312 of adjacent lens elements LD. As another example, the high refractive index layers 312 of adjacent lens elements LD may be continuous.

The second substrate SUB32 is further provided with an insulating layer 361. The insulating layer 361 is disposed, for example, under the second insulating substrate 320 described above. The second electrode Ea2 covers the lower surface of the insulating layer 361. In the example of FIG. 63, the second electrode Ea2 is in contact with the low refractive index layer 330, but the second electrode Ea2 may be covered by another insulating layer.

The first electrode Ea1 is electrically connected to a line contained in the wiring layer 311. The controller 302 shown in FIG. 43 applies a voltage to the first electrode Ea1 in a variable manner via this line. The controller 302 also applies a common voltage, which is 0 V, to the second electrode Ea2.

In the lens element LD shown in FIG. 63(a), no potential difference is formed between the first and second electrodes Ea1 and Ea2. In other words, the voltage of the first electrode Ea1 is 0 V, which is the same as the common voltage. In this case, the high refractive index layer 312 is flat, and a boundary surface BF is also a flat first shape.

On the other hand, in the lens element LD shown in FIG. 63(b), a potential difference is formed between the first electrode Ea1 and the second electrode Ea2. For example, the voltage of the first electrode Ea1 is a few V. In this case, the electrostatic attraction (Coulomb force) attracts the first electrode Ea1 to the second electrode Ea2. As a result, the high refractive index layer 312 is curved, and the boundary surface BF becomes a convex second shape accordingly.

Figure 64:
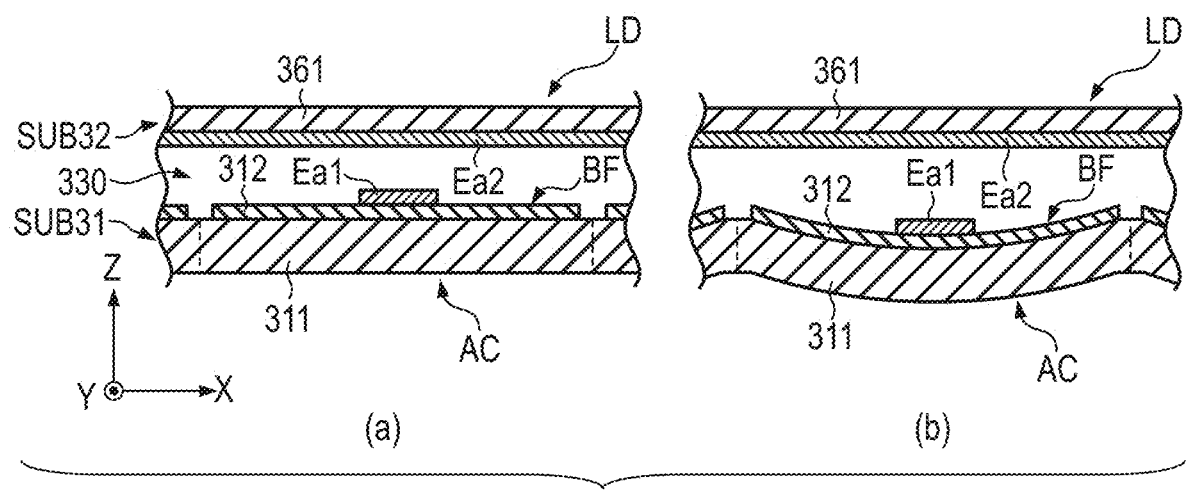
FIG. 64 is a schematic cross-sectional view of another example of the actuator shown in FIG. 62.

A concave second shape can also be realized by generating electrostatic repulsion between the first and second electrodes Ea1 and Ea2. FIG. 64 is a schematic cross-sectional view of the actuator AC along the X-Z plane in the case where the concave second shape is realized.

The electrostatic repulsion between the first electrode Ea1 and the second electrode Ea2 is inversely proportional to the square of the distance between these electrodes. Therefore, in the case of realizing the concave second shape, it is preferable to make the distance between the first and second electrodes Ea1 and Ea2 as small as possible. In FIG. 64(a), the thickness of the low refractive index layer 330 is thinner than in FIG. 63(a) because said distance is made small.

In the lens element LD shown in FIG. 64(a), the voltage of both the first and second electrodes Ea1 and Ea2 is 0 V. In this case, electrostatic attraction and repulsion do not work; therefore, the high refractive index layer 312 is flat, and the boundary surface BF is also a flat first shape.

On the other hand, in the lens element LD shown in FIG. 64(b), a strong voltage of, for example, 10 V is applied to both the first and second electrodes Ea1 and Ea2. This causes an electrostatic repulsion between the first and second electrodes Ea1 and Ea2, and the first electrode Ea1 is pulled away from the second electrode Ea2. As a result, the high refractive index layer 312 is curved, and the boundary surface BF becomes a concave second shape accordingly.

Even in the configuration of the present embodiment, a curved second shape boundary surface BF can be obtained in the same manner as in FIGS. 48 and 50. For example, by making the first electrode Ea1 a circle superposed near the center of the lens element LD, a boundary surface BF raised toward the vicinity of the center as in FIG. 57, or a boundary surface BF lowered toward the vicinity of the center as in FIG. 58 may be realized.

APPLICATION EXAMPLES

The lens array 300 disclosed in the 21st to 30th embodiments can be used in various applications. Some application examples of the lens array 300 are disclosed below.

Figure 65:
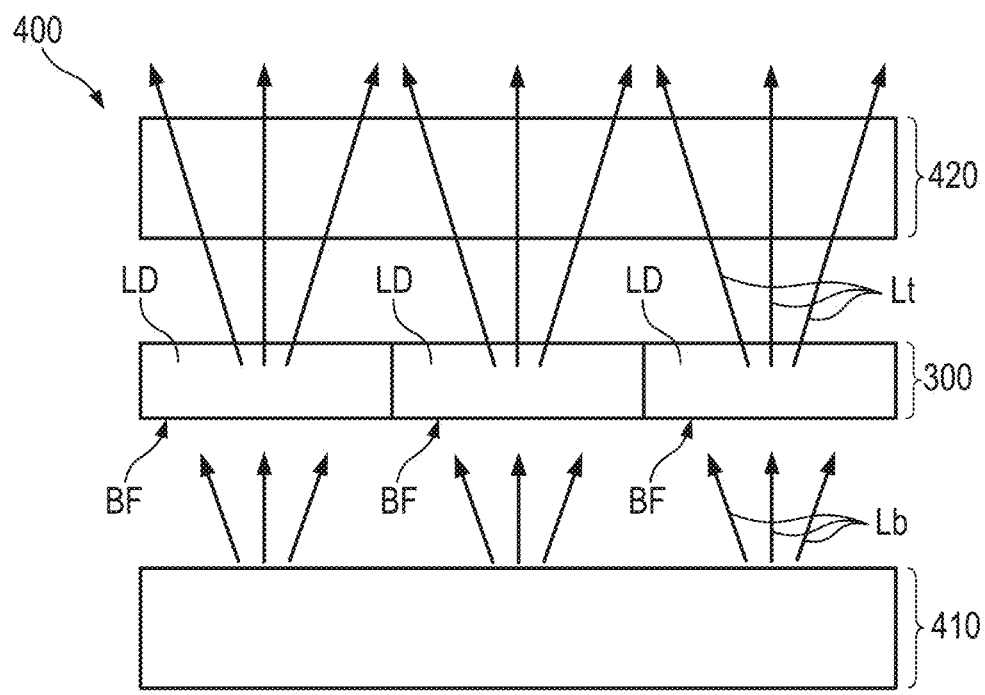
FIG. 65 shows a schematic configuration of a display device according to a first application example.
Figure 66:
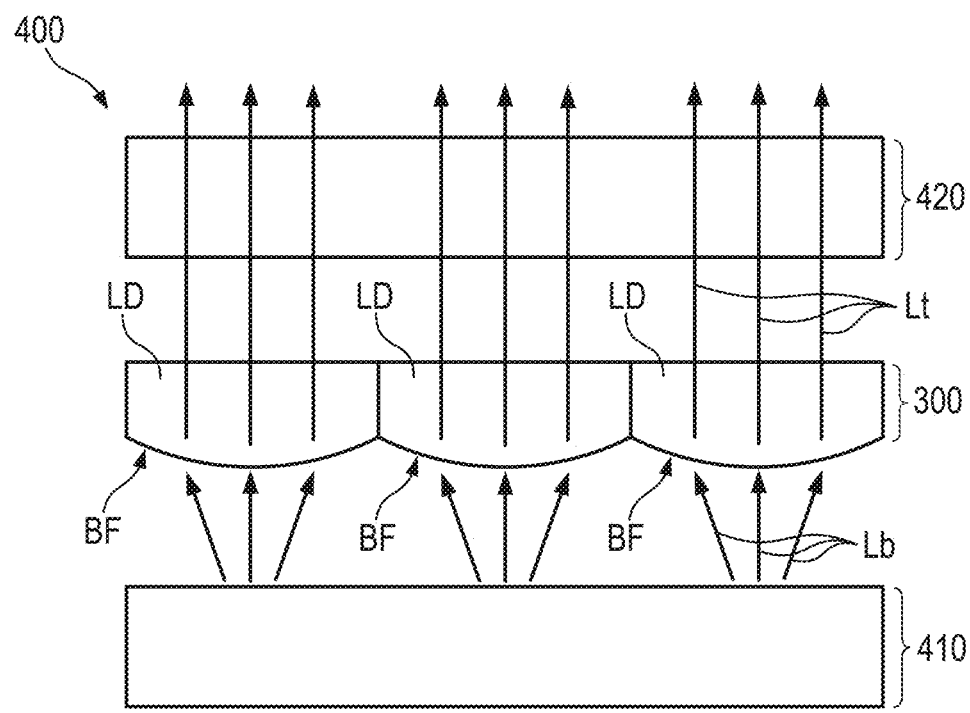
FIG. 66 shows a schematic configuration of the display device for the first application example.

FIGS. 65 and 66 show a schematic configuration of a display device 400 according to a first application example of the lens array 300. The display device 400 comprises a backlight 410, a display panel 420, and a lens array 300. The lens array 300 is interposed between the backlight 410 and the display panel 420.

The backlight 410 is a surface light source, for example, and comprises a light guide plate and a light source facing the side of the light guide plate. The backlight 410 emits light Lb, which is diffused light, toward the lens array 300. The display panel 420 is, for example, a transmissive liquid crystal display device that displays an image using light from the backlight 410, and is provided with a pair of polarizing plates, a pair of substrates interposed between these polarizing plates, and a liquid crystal layer interposed between these substrates.

The lens array 300 has the configuration shown in FIGS. 44 and 45, for example, and is disposed so that a boundary surface BF faces the backlight 410. In FIG. 65, the boundary surface BF is a flat first shape. In this case, light Lt transmitted through the lens array 300 toward the display panel 420 is the diffused light similar to the light Lb emitted by the backlight 410. This kind of light Lt can expand the viewing angle of the image displayed by the display panel 420.

On the other hand, in FIG. 66, the boundary surface BF is deformed into a convex curved surface toward the backlight 410, i.e., a second shape. In this case, the light Lt transmitted through the lens array 300 toward the display panel 420 becomes collimated light that is substantially parallel to the stacking direction of the backlight 410, the lens array 300, and the display panel 420. This kind of light Lt can narrow the viewing angle of the image displayed by the display panel 420.

Figure 67:
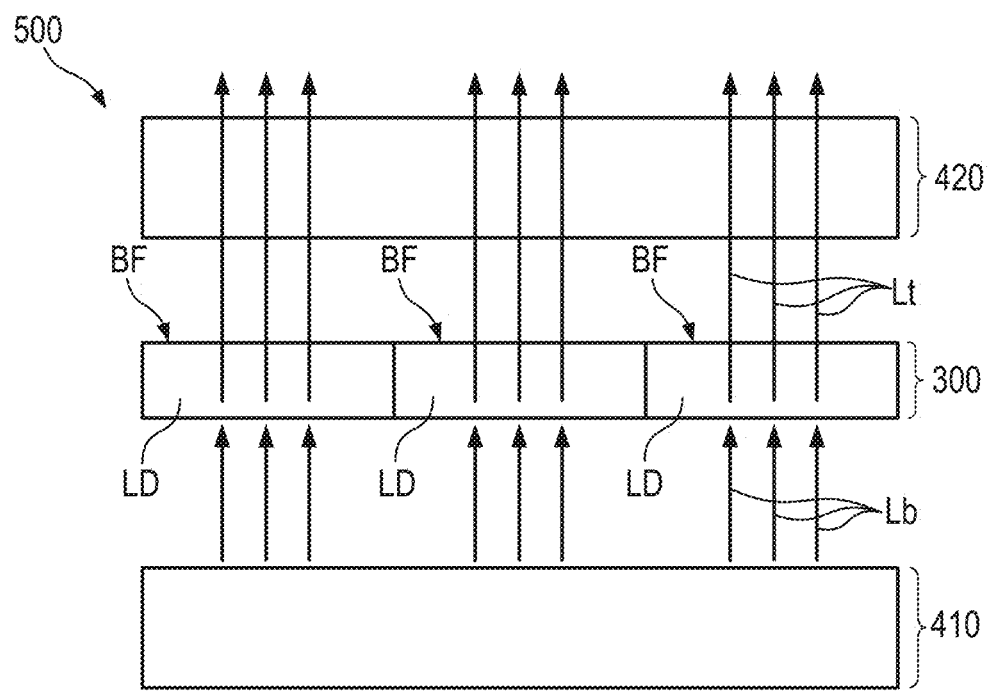
FIG. 67 shows a schematic configuration of a display device according to a second application example.
Figure 68:
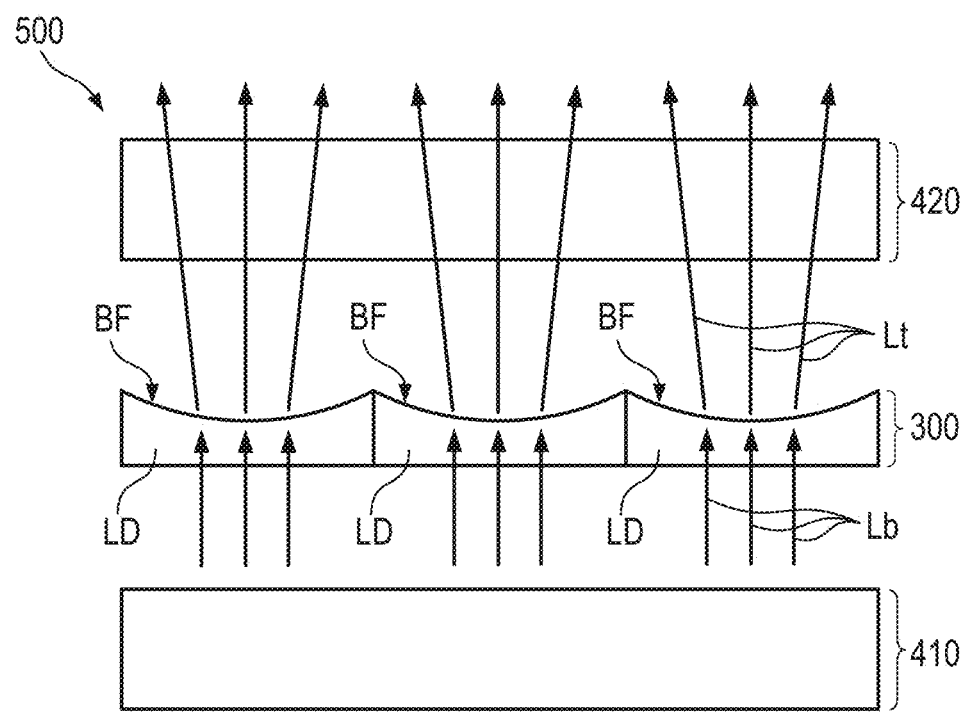
FIG. 68 shows a schematic configuration of the display device according to the second application example.

FIGS. 67 and 68 show a schematic configuration of a display device 500 according to a second application example of the lens array 300. The display device 500, in a manner similar to the display device 400 described above, comprises a backlight 410, a display panel 420, and a lens array 300. However, light Lb emitted by the backlight 410 is collimated light that is substantially parallel to the stacking direction. Furthermore, the lens array 300 has the configuration shown in FIG. 49, for example, and is disposed so that a boundary surface BF faces the display panel 420.

In FIG. 67, the boundary surface BF is a flat first shape. In this case, light Lt transmitted through the lens array 300 toward the display panel 420 is collimated light, which is the same as the light Lb emitted by the backlight 410. On the other hand, in FIG. 68, the boundary surface BF is deformed into a concave curved surface concaved toward the backlight 410, i.e., the second shape. In this case, the light Lt that passes through the lens array 300 toward the display panel 420 becomes diffused light with many components that are tilted with respect to the stacking direction. Therefore, even with the configuration of the second application example, the viewing angle of the image can be switched.

Figure 69:
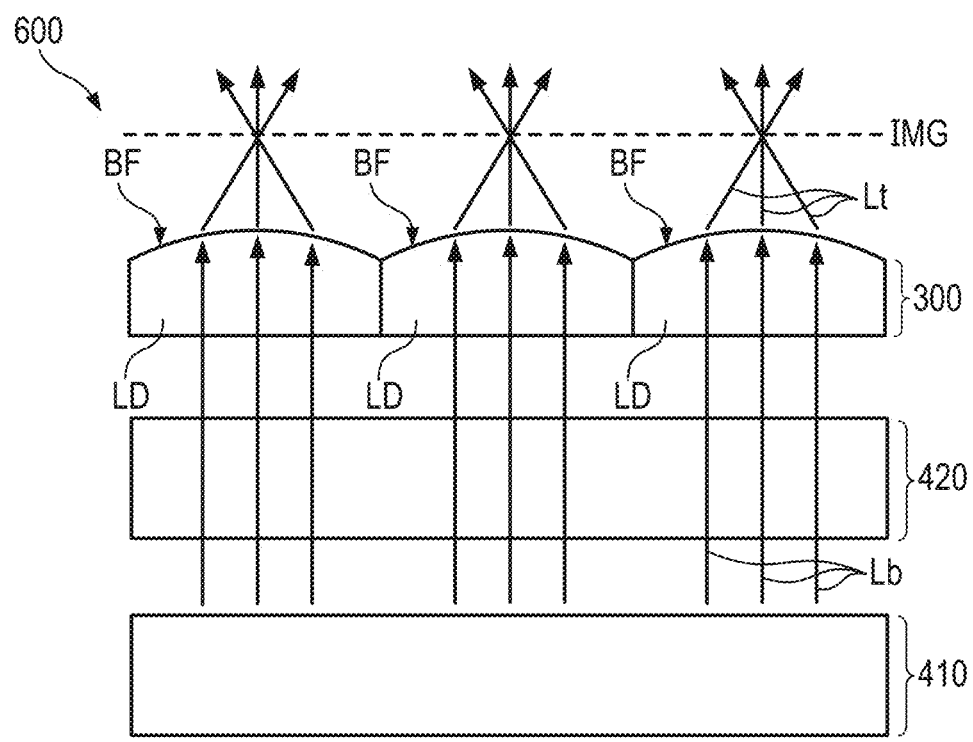
FIG. 69 shows a schematic configuration of a display device according to a third application example.

FIG. 69 shows a schematic configuration of a display device 600 according to a third application example of the lens array 300. The display device 600, in a manner similar to the display device 400 described above, comprises a backlight 410, a display panel 420, and a lens array 300. However, the display panel 420 is interposed between the lens array 300 and the backlight 410.

The lens array 300 has the configuration shown in FIGS. 44 and 45, for example, and is disposed so that a boundary surface BF faces the opposite side of the display panel 420. Light Lb emitted by the backlight 410 is collimated light substantially parallel to the stacking direction. The light Lb passes through the display panel 420 and is subsequently incident on the lens array 300.

In FIG. 69, the boundary surface BF is a convex second shape. In this case, the light Lb is refracted by the boundary surface BF of each lens element LD and is combined at a coupling surface IMG. To a user of the display device 600, it appears as if an image is displayed on the coupling surface IMG. In a case where the boundary surface BF of each lens element LD is deformed into a flat first shape, the user can see the image at the position of the display panel 420 as usual.

Figure 70:
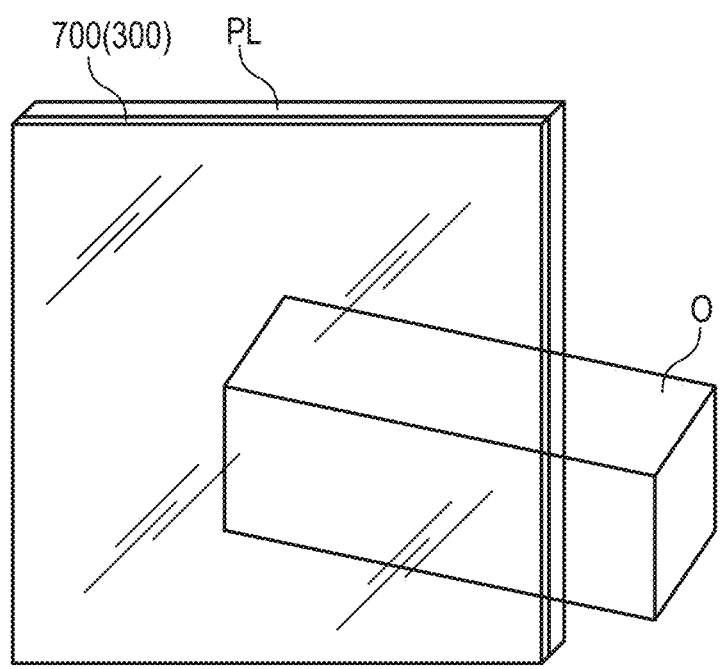
FIG. 70 shows a schematic configuration of a dimming panel according to a fourth application example.

FIGS. 70 and 71 show a dimming panel 700 according to a fourth application of the lens array 300. The dimming panel 700 includes at least one of the lens arrays 300 disclosed in the 21st to 30th embodiments. The dimming panel 700 may include a plurality of stacked lens arrays 300.

By controlling the shape of the boundary surface BF included in the lens array 300, the dimming panel 700 is capable of switching between a transparent state in which light is transmitted with little refraction and a scattering state in which light is greatly refracted.

Such a dimming panel 700 may be attached to a transparent plate P L, such as window glass, for example, as shown in FIGS. 70 and 71. In FIG. 70, the dimming panel 700 is in the transparent state. In this case, an object O therebehind can be seen through the dimming panel 700. On the other hand, in FIG. 71, the dimming panel 700 is in the scattering state. In this case, the dimming panel 700 appears cloudy, for example, and the object O therebehind cannot be seen through the dimming panel 700, or appears blurred.

The applications of the lens array 300 disclosed in each embodiment are not limited to the first to fourth application examples described above. In addition, the lens array 300 disclosed in each embodiment can be used in various other applications.

In each embodiment, as an example of the actuator AC, a configuration in which a piezoelectric element, a shape memory alloy, or an electrostatic actuator is used is exemplified. In addition, the actuator AC can use various other elements whose shape can be controlled electrically, such as a dielectric elastomer. In other words, the configuration of the actuator AC is not particularly limited as long as it can deform the reflective surface RF and the boundary surface BF.

In the 11th to 20th embodiments, a configuration in which the shape of the boundary surface BF is controlled by deforming the high refractive index layer 212 with the actuator AC is exemplified. However, the actuator AC may also control the shape of the boundary surface BF by, for example, deforming a low refractive index layer formed of a transparent resin material.

In the 11th to 20th embodiments, a configuration in which the boundary surface BF is located between the actuator AC and the second substrate SUB22 is exemplified. However, the boundary surface BF may be located between the actuator AC and the first insulating substrate 210. In addition, an element existing inside the actuator AC may also serve as at least one of a high refractive index layer and a low refractive index layer.

All display devices, lens arrays, or dimming panels that may be designed and modified by those skilled in the art based on the display devices, lens arrays, or dimming panels described as embodiments of the present invention also belong to the scope of the present invention as long as they encompass the gist of the present invention.

Within the scope of the idea of the present invention, those skilled in the art may come up with various variations, and these variations are also understood to belong to the scope of the present invention. For example, a person skilled in the art may add, delete, or change the design of components, or add, omit, or change the conditions of a process, to the above-mentioned embodiments as appropriate, as long as they have the gist of the invention, they are included in the scope of the invention.

In addition, it is understood that other effects brought about by the above-described embodiments that are obvious from the description herein, or that can be appropriately conceived by a person skilled in the art, are naturally brought about by the present invention.

For example, based on the first to tenth embodiments, a display device according to the following A1 to A20 can be obtained.

[A1] A display device comprising a plurality of pixels, wherein
each of the plurality of pixels comprising:
a reflective surface that reflects light;
an actuator that configured to deform the reflective surface; and
a non-reflective part that is located in a central part of the pixel in a first direction and is superposed on the reflective surface.

[A2] The display device of A1 above, wherein
the actuator deforms the reflective surface into a first shape and a second shape, and
each of the plurality of pixels has a first reflectance in a case where the reflective surface is in the first shape, and has a second reflectance that is smaller than the first reflectance in a case where the reflective surface is in the second shape.

[A3] The display device of A2 above, wherein
the first shape has a first curvature, and
the second shape has a second curvature that is larger than the first curvature.

[A4] The display device of A3 above further comprising an insulating substrate supporting the actuator, wherein
the second shape is convex toward a direction away from the insulating substrate, or concave toward the insulating substrate.

[A5] The display device of A4 above further comprising a first light-shielding layer superposed on a top part of the convex reflective surface or a bottom part of the concave reflective surface, wherein
the non-reflective part includes the first light-shielding layer.

[A6] The display device of one of A1 to A5 above further comprising:
a first substrate including the reflective surface and the actuator;
a second substrate facing the first substrate; and
a spacer between the first substrate and the second substrate.

[A7] The display device of A6 above, wherein the first substrate or the second substrate further includes a color filter superposed on the reflective surface and a second light-shielding layer superposed on a boundary of adjacent said pixels.

[A8] The display device of A6 above, wherein the spacer is in a form of a grid superposed on a boundary of adjacent said pixels.

[A9] The display device of A8 above, wherein the spacer has a light-shielding property.

[A10] The display device of one of A6 to A9 above, wherein
the first substrate further comprises a metal layer located between the actuator and the second substrate, and
the reflective surface is a metal layer surface.

[A11] The display device of one of A6 to A9 above, wherein
the first substrate includes a plurality of wires aligned in a cycle included in a wavelength range of visible light between the actuator and the second substrate, and
the reflective surface is configured by the plurality of wires.

[A12] The display device of one of A1 to A11 above, wherein a gap is provided between reflective surfaces of adjacent said pixels.

[A13] The display device of A1 above, wherein
the actuator comprises a first electrode, a second electrode, and a piezoelectric element that deforms in response to a voltage between the first and second electrodes, and
the reflective surface deforms together with the piezoelectric element.

[A14] The display device of A13 above, wherein
the first electrode is superposed on a part of the piezoelectric element, and
in a case where a voltage is applied between the first electrode and the second electrode, the piezoelectric element is deformed convexly with its top at a portion where the first electrode and the piezoelectric element superpose, or concavely with its bottom at the portion where the first electrode and the piezoelectric element superpose.

[A15] The display device of A14 above, wherein the first electrode has a linear shape that is superposed on the central part of the pixel in the first direction and extends in a second direction intersecting the first direction.

[A16] The display device of A14 or A15 above further comprising a first light-shielding layer superposed on the first electrode, wherein
the non-reflective part includes the first light-shielding layer.

[A17] The display device of A14 or A15 above, wherein
the reflective surface has a slit or an opening superposed on the top part or the bottom part, and
the non-reflective part includes the slit or opening.

[A18] The display device of one of A13 to A17 above, wherein a gap is provided between the piezoelectric elements of adjacent said pixels.

[A19] The display device of A1 above, wherein
the actuator comprises a shape memory alloy that deforms due to heat generated when energized, and
the reflective surface deforms together with the shape memory alloy.

[A20] The display device of A19 above, wherein
the shape memory alloy has a linear shape extending in the first direction, and
the actuator includes a plurality of said shape memory alloys aligned in a second direction that intersects the first direction.

Also, based on the 11th to 20th embodiments, a display device of, for example, the following B1 to B20 can be obtained.

[B1] A display device comprising a plurality of pixels, wherein
each of the plurality of pixels comprises:
a high refractive index layer;
a low refractive index layer with a lower refractive index than the high refractive index layer; and
an actuator configured to deform a boundary surface between the high refractive index layer and the low refractive index layer.

[B2] The display device of B1 above, wherein
the actuator deforms the boundary surface into a first shape and a second shape, and
the pixel has a first transmittance in a case where the boundary surface has the first shape, and a second transmittance that is smaller than the first transmittance in a case where the boundary surface has the second shape.

[B3] The display device of B2 above, wherein
the first shape has a first curvature, and
the second shape has a second curvature that is larger than the first curvature.

[B4] The display device of B3 above further comprising an insulating substrate that supports the actuator, wherein
the second shape is concaved toward the insulating substrate.

[B5] The display device of B4 above, wherein
the high refractive index layer is located between the insulating substrate and the low refractive index layer.

[B6] The display device of B4 or B5 above, wherein
the actuator is located between the insulating substrate and the high refractive index layer.

[B7] The display device of one of B4 to B6 above further comprising a backlight facing the insulating substrate.

[B8] The display device of one of B4 to B7 above further comprising a first light-shielding layer superposed on a bottom part of the concave boundary surface.

[B9] The display device of one of B1 to B8 above further comprising:
a first substrate including the high refractive index layer and the actuator;
a second substrate facing the first substrate; and
a spacer between the first substrate and the second substrate.

[B10] The display device of B9 above, wherein the first substrate or the second substrate further includes:
a color filter superposed on the boundary surface; and
a second light-shielding layer superposed on a boundary of adjacent said pixels.

[B11] The display device of B9 above, wherein the spacer is in a form of a grid superposed on a boundary of adjacent said pixels.

[B12] The display device of B11 above, wherein the spacer has a light-shielding property.

[B13] The display device of one of B1 to B12 above, wherein a gap is provided between the high refractive index layers of adjacent said pixels.

[B14] The display device of B1 above, wherein
the actuator comprises a first electrode, a second electrode, and a piezoelectric element that deforms in response to a voltage between the first and second electrodes, and
the boundary surface deforms together with the piezoelectric element.

[B15] The display device of B14 above, wherein
the first electrode is superposed on a part of the piezoelectric element, and
in a case where a voltage is applied between the first electrode and the second electrode, the piezoelectric element deforms concavely with its bottom at a portion where the first electrode and the piezoelectric element superpose.

[B16] The display device of B15 above, wherein
the first electrode has a linear shape that is superposed on a central part of the pixel in a first direction and extends in a second direction intersecting the first direction.

[B17] The display device of B15 or B16 above further comprising a first light-shielding layer superposed on the first electrode.

[B18] The display device of one of B14 to B17 above, wherein a gap is provided between the piezoelectric elements of adjacent said pixels.

[B19] The display device of B1 above, wherein
the actuator comprises a shape memory alloy that deforms due to heat generated when energized, and
the boundary surface deforms together with the shape memory alloy.

[B20] The display device of B19 above, wherein
the shape memory alloy has a linear shape extending in a first direction, and
the actuator includes a plurality of said shape memory alloys aligned in a second direction intersecting the first direction.

Also, based on the 21st to 30th embodiments and the first to fourth application examples, a lens array and a display device of, for example, the following C1 to C20 can be obtained.

[C1] A lens array comprising a plurality of lens elements, wherein
each of the plurality of lens elements comprises:
a boundary surface of two layers with different refractive indices; and
an actuator configured to deform the boundary surface.

[C2] The lens array of C1 above, wherein
the actuator deforms the boundary surface into a first shape and a second shape, and
light transmitted through the lens element has a first viewing angle in a case where the boundary surface of the lens element has the first shape, and a second viewing angle different from the first viewing angle in a case where the boundary surface of the lens element has the second shape.

[C3] The lens array of C2 above, wherein
the first shape has a first curvature, and
the second shape has a second curvature that is greater than the first curvature.

[C4] The lens array of C2 above further comprising:
a high refractive index layer;
a low refractive index layer having a lower refractive index than the high refractive index layer; and
an insulating substrate supporting the actuator, the high refractive index layer, and the low refractive index layer,
wherein the boundary surface is an interface between the high refractive index layer and the low refractive index layer.

[C5] The lens array of C4 above, wherein the second shape is convex toward a direction away from the insulating substrate, or concave toward the insulating substrate.

[C6] The lens array of C4 above, wherein the high refractive index layer is located between the insulating substrate and the low refractive index layer.

[C7] The lens array of C4 above, wherein the actuator is located between the insulating substrate and the high refractive index layer.

[C8] The lens array of C1 above, wherein
the actuator comprises a first electrode, a second electrode, and a piezoelectric element that deforms in response to a voltage between the first electrode and the second electrode, and
the boundary surface deforms together with the piezoelectric element.

[C9] The lens array of C8 above, wherein
the first electrode is superposed on a part of the piezoelectric element, and
in a case where a voltage is applied between the first electrode and the second electrode, the piezoelectric element deforms convexly with its top at a portion where the first electrode and the piezoelectric element superpose, or concavely with its bottom at a portion where the first electrode and the piezoelectric element superpose.

[C10] The lens array of C9 above, wherein the first electrode has a linear shape that is superposed on a central part of the lens element in a first direction and extends in a second direction intersecting the first direction.

[C11] The lens array of C1 above, wherein
the actuator comprises a shape memory alloy that deforms due to heat generated when energized, and
the boundary surface deforms together with the shape memory alloy.

[C12] The lens array of C11 above, wherein
the shape memory alloy has a linear shape extending in a first direction, and
the actuator includes a plurality of said shape memory alloys aligned in a second direction intersecting the first direction.

[C13] A lens array comprising:
a first lens element including a first boundary surface of two layers with different refractive indices and a first actuator configured to deform the first boundary surface; and
a second lens element including a second boundary surface of two layers with different refractive indices facing the first boundary surface and a second actuator configured to deform the second boundary surface.

[C14] The lens array of C13 above further comprising a low refractive index layer, wherein
the first lens element includes a first high refractive index layer having a higher refractive index than the low refractive index layer, the second lens element includes a second high refractive index layer having a higher refractive index than the low refractive index layer, the first high refractive index layer and the second high refractive index layer face each other through the low refractive index layer, the first boundary surface is an interface between the first high refractive index layer and the low refractive index layer, and the second boundary surface is an interface between the second high refractive index layer and the low refractive index layer.

[C15] The lens array of C14 above further comprising:
a first substrate including the first high refractive index layer and the first actuator;
a second substrate including the second high refractive index layer and the second actuator and facing the first substrate; and
a spacer between the first substrate and the second substrate.

[C16] The lens array of C15 above, wherein the low refractive index layer is a space between the first substrate and the second substrate.

[C17] The lens array of C15 above, wherein
the first substrate further comprises a first insulating substrate that supports the first high refractive index layer and the first actuator,
the second substrate further comprises a second insulating substrate that supports the second high refractive index layer and the second actuator, and
the first high refractive index layer, the first actuator, the second high refractive index layer, and the second actuator are located between the first insulating substrate and the second insulating substrate.

[C18] The lens array of C17 above, wherein
the first actuator deforms the first boundary surface into a first shape having a first curvature and a second shape having a second curvature that is larger than the first curvature, and
the second actuator deforms the second boundary surface into a third shape having a third curvature and a fourth shape having a fourth curvature that is larger than the third curvature.

[C19] The lens array of C18 above, wherein
the second shape is concave toward the first insulating substrate or convex toward the second insulating substrate, and
the fourth shape is concave toward the second insulating substrate or convex toward first insulating substrate.

[C20] A display device comprising:
a backlight;
a display panel for displaying an image using light from the backlight; and
the lens array of C1 above, interposed between the backlight and the display panel.

What is claimed is:

1. A lens array comprising a plurality of lens elements, wherein
each of the plurality of lens elements comprises:
a boundary surface of two layers with different refractive indices, and
an actuator configured to deform the boundary surface, wherein
the actuator comprises a first electrode, a second electrode, and a piezoelectric element that deforms in response to a voltage between the first electrode and the second electrode, and
the boundary surface deforms together with the piezoelectric element.

2. The lens array of claim 1, wherein
the first electrode is superposed on a part of the piezoelectric element, and
in a case where a voltage is applied between the first electrode and the second electrode, the piezoelectric element deforms convexly with its top at a portion where the first electrode and the piezoelectric element superpose, or concavely with its bottom at a portion where the first electrode and the piezoelectric element superpose.

3. The lens array of claim 2, wherein the first electrode has a linear shape that is superposed on a central part of the lens element in a first direction and extends in a second direction intersecting the first direction.

4. A lens array comprising a plurality of lens elements, wherein
each of the plurality of lens elements comprises:
a boundary surface of two layers with different refractive indices; and
an actuator configured to deform the boundary surface, wherein
the actuator comprises a shape memory alloy that deforms due to heat generated when energized, and
the boundary surface deforms together with the shape memory alloy.

5. The lens array of claim 4, wherein
the shape memory alloy has a linear shape extending in a first direction, and
the actuator includes a plurality of said shape memory alloys aligned in a second direction intersecting the first direction.

* * * * *